(12) United States Patent
Aoki et al.

(10) Patent No.: US 8,107,556 B2
(45) Date of Patent: *Jan. 31, 2012

(54) OFDM SIGNAL TRANSMISSION METHOD AND APPARATUS

(75) Inventors: Tsuguhide Aoki, Kawasaki (JP); Ichiro Seto, Fuchu (JP); Daisuke Takeda, Kawasaki (JP); Takehiko Toyoda, Tokyo (JP); Ren Sakata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/604,712

(22) Filed: Oct. 23, 2009

(65) Prior Publication Data

US 2010/0040167 A1 Feb. 18, 2010

Related U.S. Application Data

(63) Continuation of application No. 11/076,051, filed on Mar. 10, 2005, now Pat. No. 7,742,533.

(30) Foreign Application Priority Data

| Mar. 12, 2004 | (JP) | ................... 2004-071732 |
| Jun. 14, 2004 | (JP) | ................... 2004-176096 |
| Aug. 12, 2004 | (JP) | ................... 2004-235349 |
| Sep. 2, 2004 | (JP) | ................... 2004-256247 |
| Feb. 28, 2005 | (JP) | ................... 2005-052949 |

(51) Int. Cl.
*H04L 27/04* (2006.01)
*H04L 27/20* (2006.01)

(52) U.S. Cl. .................. 375/299; 375/260; 375/285

(58) Field of Classification Search .................. 375/260, 375/261, 267, 326, 344; 370/335, 342
See application file for complete search history.

(56) References Cited

U.S. PATENT DOCUMENTS

| 7,263,133 B1 | 8/2007 | Mia |
| 2002/0136176 A1* | 9/2002 | Abeta et al. ................... 370/335 |
| 2003/0016621 A1 | 1/2003 | Li |
| 2005/0152314 A1 | 7/2005 | Sun et al. |
| 2007/0237262 A1 | 10/2007 | Hwang et al. |

FOREIGN PATENT DOCUMENTS

JP 2002-374224 12/2002

(Continued)

OTHER PUBLICATIONS

Bingham, J.A.C.; "Multicarrier modulation for data transmission; an idea whose time has come", Communications Magazine, IEEE vol. 28, Issue 5, May 1990 pp. 5-14.

(Continued)

*Primary Examiner* — Khanh C Tran
*Assistant Examiner* — Qutbuddin Ghulamali
(74) *Attorney, Agent, or Firm* — Oblon, Spivak, McClelland, Maier & Neustadt, L.L.P.

(57) ABSTRACT

An orthogonal frequency division multiplexing (OFDM) signal transmission apparatus which transmits OFDM signals by using a plurality of transmission antennas includes a subcarrier setting device which sets signals for subcarriers so as to use some of the subcarriers of the OFDM signals as pilot subcarriers to transmit pilot signals and use the remaining subcarriers as data subcarriers to transmit data signals, the subcarrier setting device changing polarities of signals for the pilot subcarriers for each transmission antenna.

25 Claims, 36 Drawing Sheets

FOREIGN PATENT DOCUMENTS

| | | |
|---|---|---|
| JP | 2003-283441 | 10/2003 |
| JP | 2003-304215 | 10/2003 |
| JP | 2003-304216 | 10/2003 |
| JP | 2004-173258 | 6/2004 |
| JP | 2004/328464 | 11/2004 |
| WO | 2004/039022 | 5/2004 |

OTHER PUBLICATIONS

Enright, M.A.; Kuo, C.-C.J.; "Fast linearized energy allocation for multimedia loading on multicarrier systems", Selected Areas in Communications, IEEE Journal on vol. 24, Issue 3, Mar. 2006 pp. 470-480.

Won Gi Jeon, et al., "Two-Dimensional MMSE Channel Estimation for OFDM Systems with Transmitter Diversity", Vehicular Technology Conference. 2001. VTC 2001 Fall. IEEE VTS 54th, Oct. 2001 pp. 1682-1685.

Dae-Ki Hong, et al., "Robust Frequency Offset Estimation for Pilot Symbol Assisted Packet CDMA With MIMO Antenna Systems", IEEE Communications Letters, vol. 6, No. 6, Jun. 2002, pp. 262-264.

Lucent Technologies, Increasing MIMO throughput with per-antenna rate control, 3GPP TSGR #21 R1-01-0879, Aug. 28, 2001, pp. 1 to 4, URL.

Peter Hoeher, et al., "Two-Dimensional Pilot-Symbol-Aided Channel Estimation", ISIT '97, Jun. 29, 1997, p. 123.

Hemanth Sampahth, et al., "Pros and Cons of Circular Delay Diversity Scheme for MIMO-OFDM System", IEEE802.11-04/0075r0, Jan. 2004, pp. 1-13.

Myeongchoel Shin, et al., "Enhanced Channel-Estimation Technique for MIMO-OFDM Systems", IEEE Transactions on Vehicular Technology, vol. 53, No. 1, Jan. 2004, pp. 261-265.

Office Action, mailed Sep. 30, 2008, in Japanese Patent Application 2005-052949.

* cited by examiner

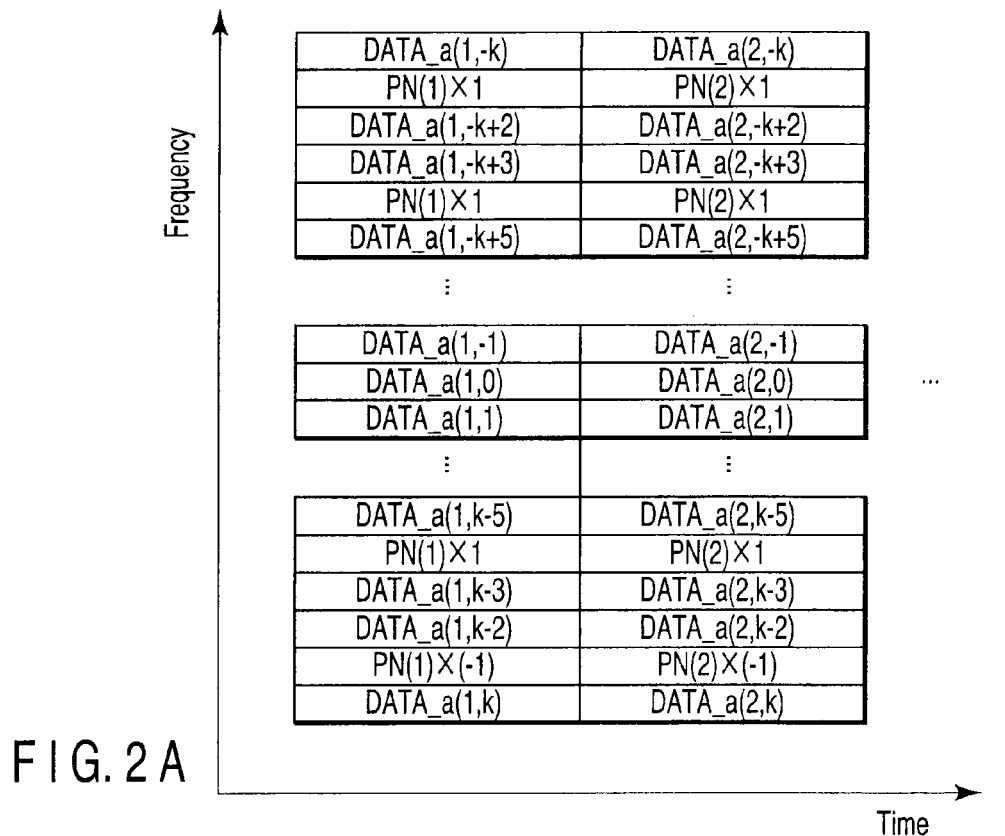
F I G. 2A
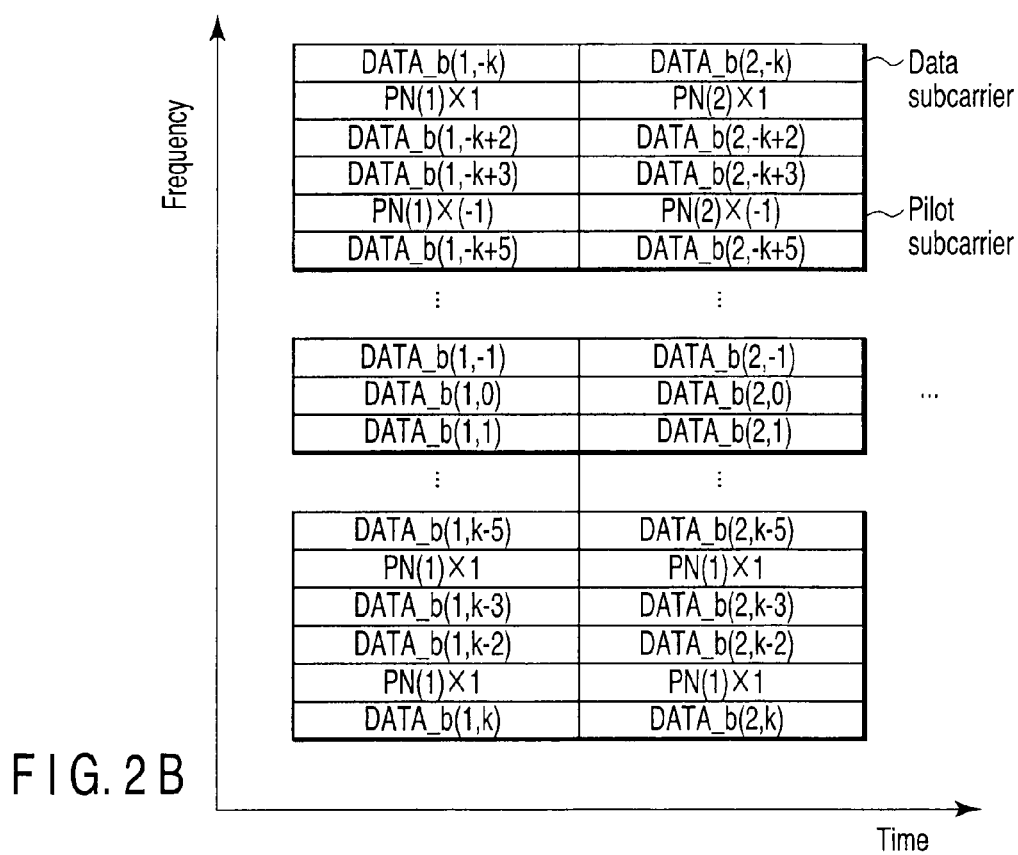
F I G. 2B

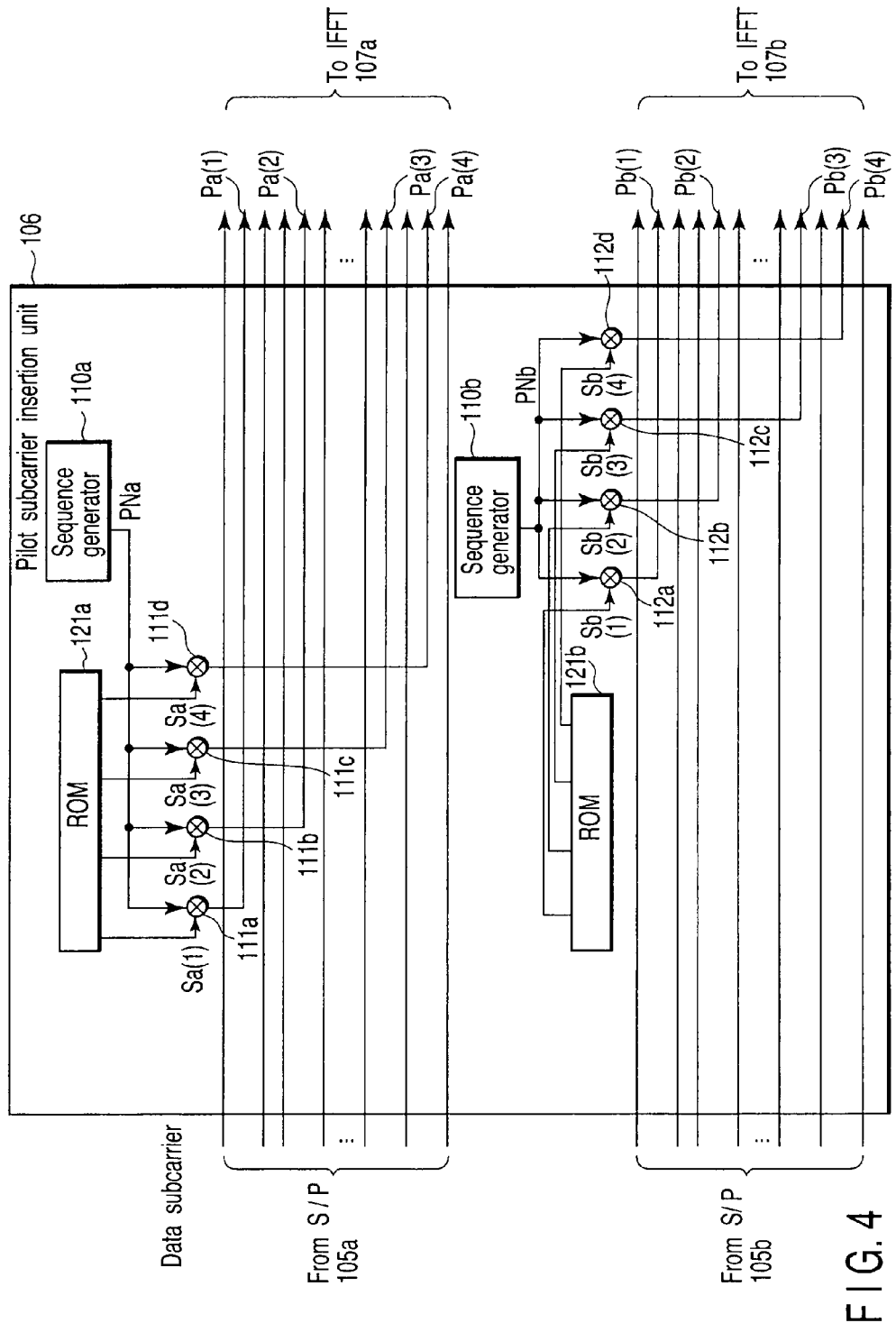
F I G. 4

| Polarity 1 when four transmit antennas are used | S(1) | S(2) | S(3) | S(4) |
|---|---|---|---|---|
| First antenna Sa(j) | 1 | 1 | 1 | -1 |
| Second antenna Sb(j) | 1 | -1 | 1 | 1 |
| Third antenna Sc(j) | 1 | -1 | -1 | -1 |
| Fourth antenna Sd(j) | 1 | 1 | -1 | 1 |

FIG.11A

| Polarity 2 when four transmit antennas are used | S(1) | S(2) | S(3) | S(4) |
|---|---|---|---|---|
| First antenna Sa(j) | 1 | 1 | 1 | -1 |
| Second antenna Sb(j) | 1 | -j | -1 | -j |
| Third antenna Sc(j) | 1 | -1 | 1 | 1 |
| Fourth antenna Sd(j) | 1 | j | -1 | -j |

FIG.11B

| Polarity 1 when three transmit antennas are used | S(1) | S(2) | S(3) | S(4) |
|---|---|---|---|---|
| First antenna Sa(j) | 1 | 1 | 1 | -1 |
| Second antenna Sb(j) | 1 | -1 | 1 | 1 |
| Third antenna Sc(j) | 1 | -1 | -1 | -1 |

FIG.11C

| Polarity 2 when three transmit antennas are used | S(1) | S(2) | S(3) | S(4) |
|---|---|---|---|---|
| First antenna Sa(j) | 1 | 1 | 1 | -1 |
| Second antenna Sb(j) | 1 | -j | -1 | -j |
| Third antenna Sc(j) | 1 | -1 | 1 | 1 |

| | Data in ROM 3071 | | | | Data in ROM 3072 | | | |
|---|---|---|---|---|---|---|---|---|
| | Sa(1) | Sa(2) | Sa(3) | Sa(4) | Sb(1) | Sb(2) | Sb(3) | Sb(4) |
| Pattern A | 1 | 1 | 1 | -1 | 1 | -1 | 1 | 1 |
| Pattern B | 1 | 1 | 1 | -1 | -1 | 1 | 1 | 1 |
| Pattern C | 1 | 1 | 1 | -1 | 1 | -j | -1 | -j | j is imaginary unit

FIG. 15

| Unique word | Transmission source | Transmission destination | Retransmission | Error detection | Data symbol | Data symbol | Data symbol | Data symbol | Data symbol |
|---|---|---|---|---|---|---|---|---|---|

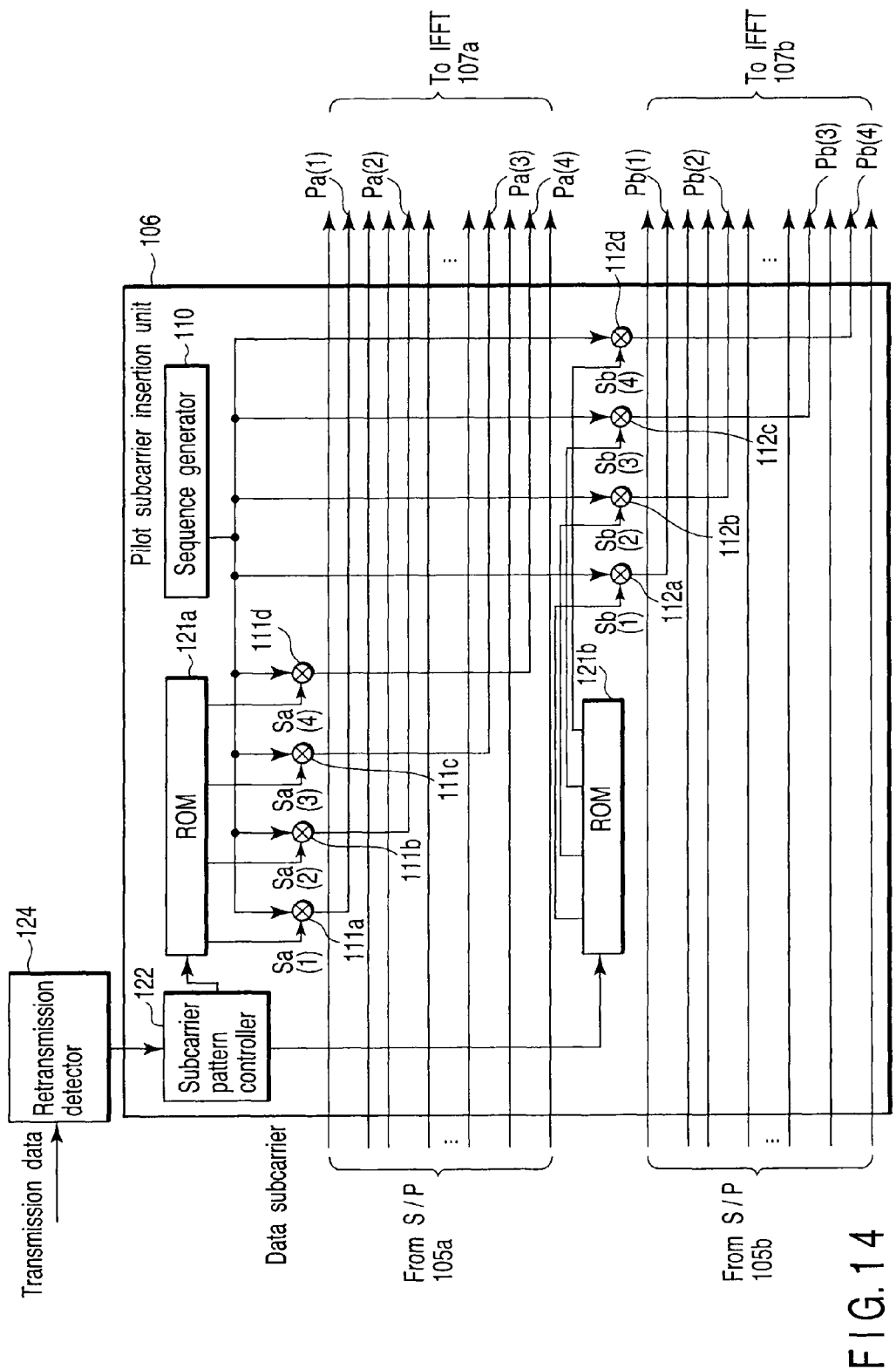
F I G. 14

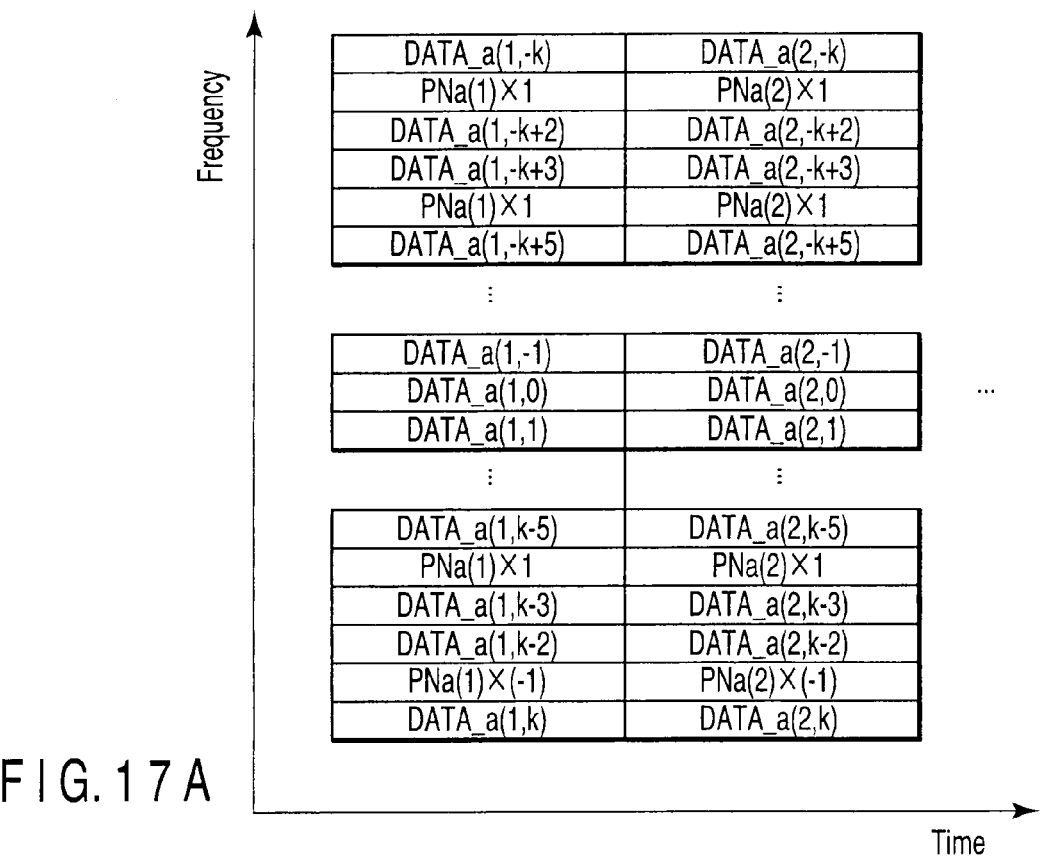
F I G. 17A
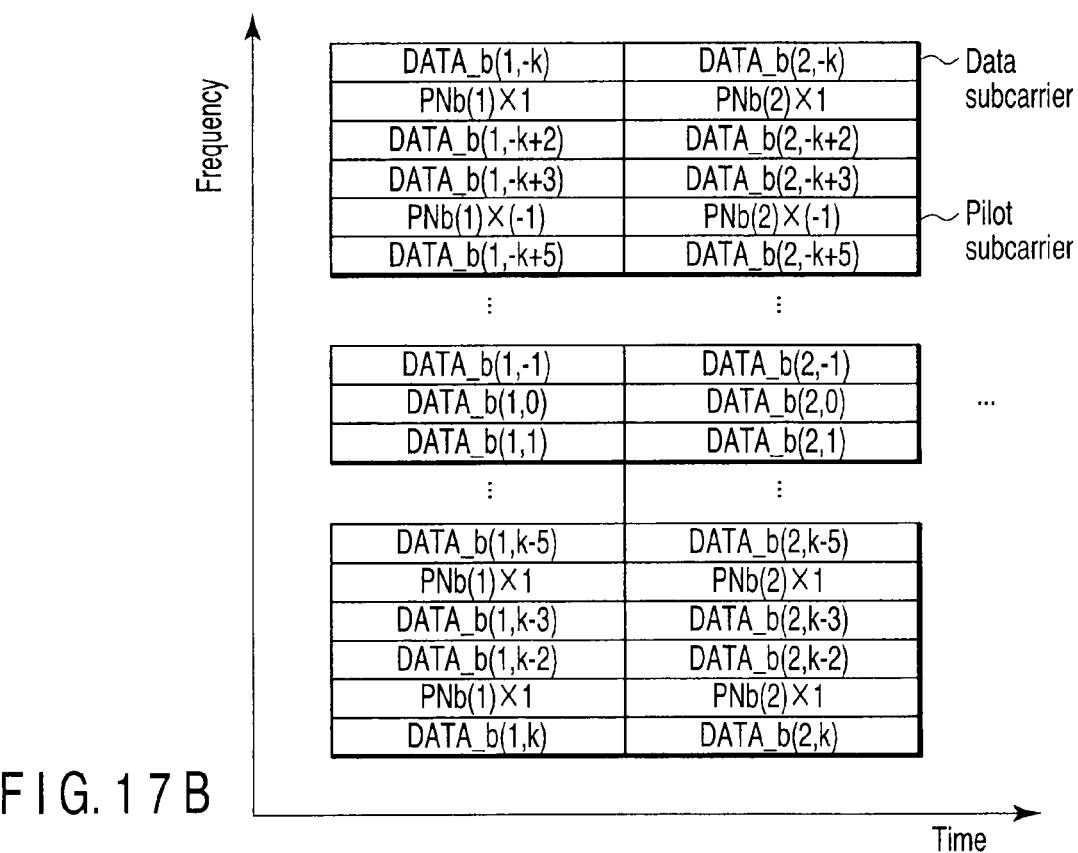
F I G. 17B

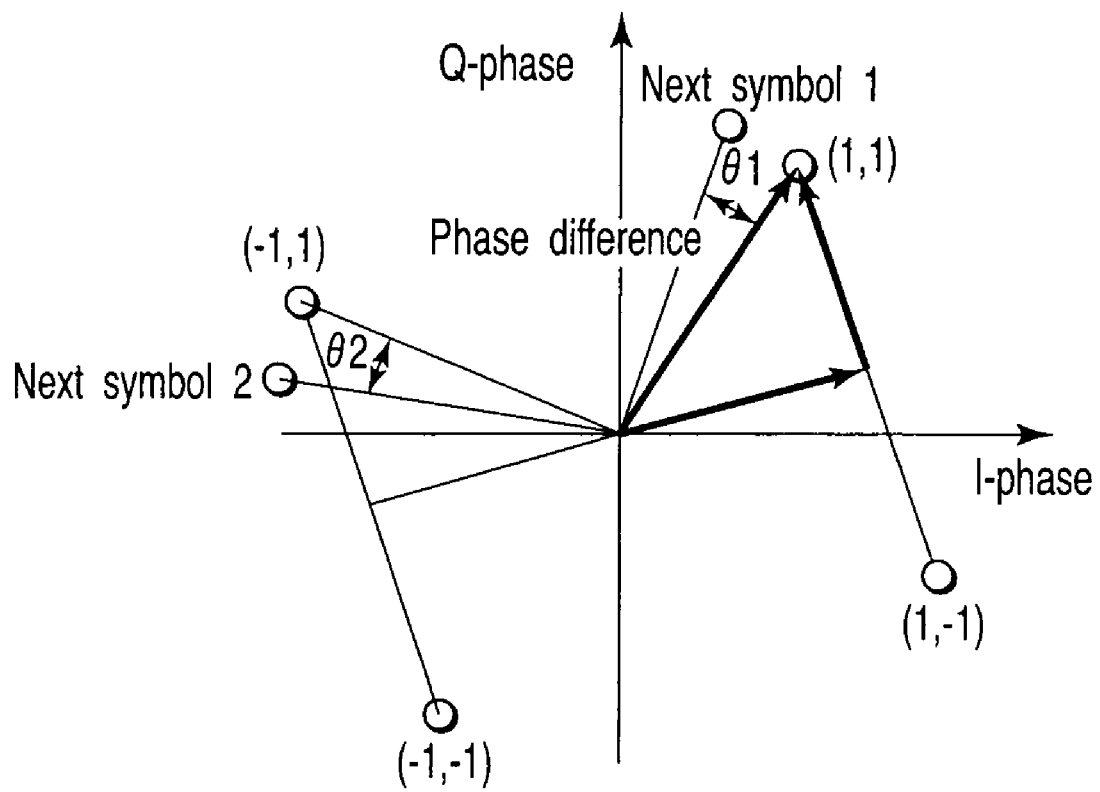
F I G. 18

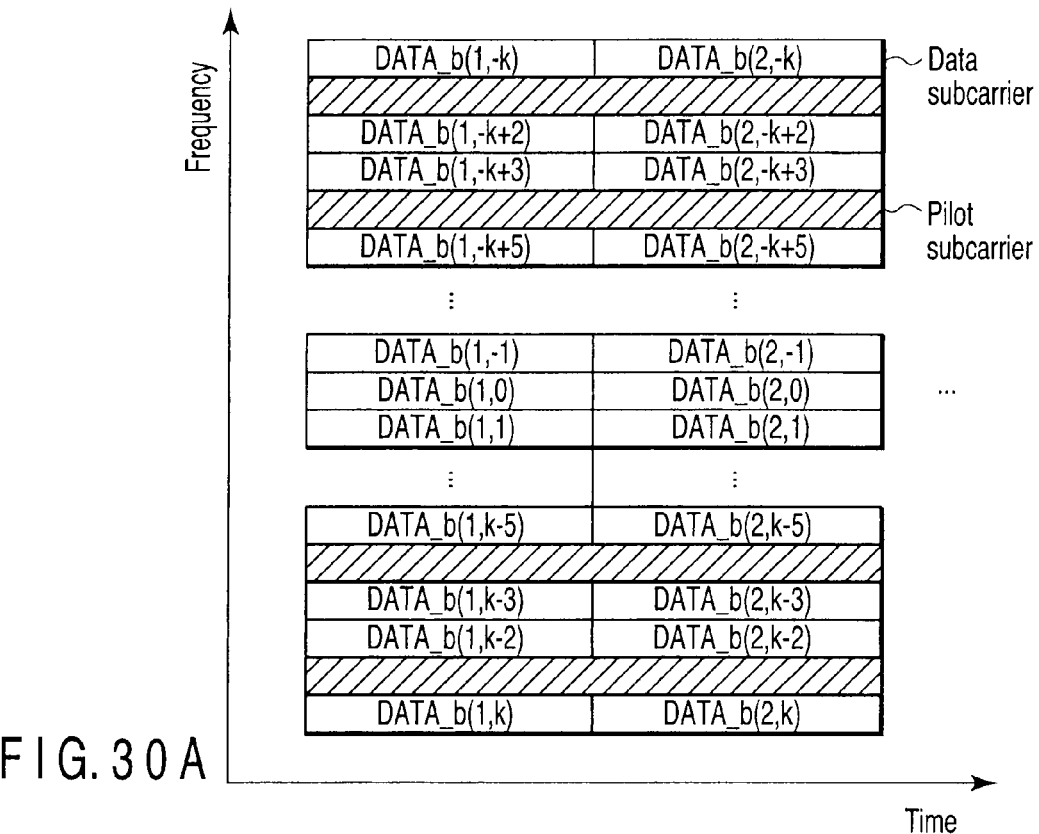
F I G. 30 A
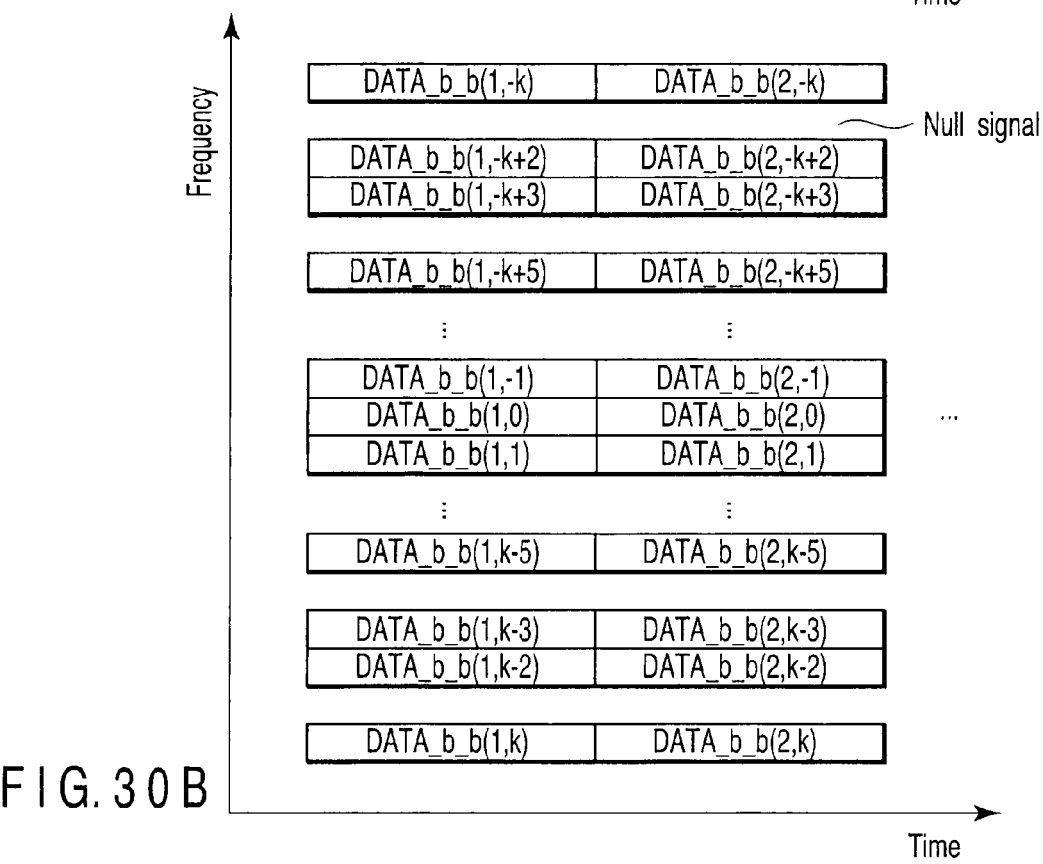
F I G. 30 B

| Subcarrier number | -26 | ... | -21 | ... | -7 | ... | 0 | ... | 7 | ... | 21 | ... | 26 |
|---|---|---|---|---|---|---|---|---|---|---|---|---|---|
| DATA 1 | | | 1 | | | | | | 1 | | 1 | | |
| DATA 2 | | | -1 | | -1 | | | | -1 | | -1 | | |
| DATA 3 | | | 1 | | 1 | | | | 1 | | 1 | | |
| DATA 4 | | | -1 | | 1 | | | | -1 | | -1 | | |
| DATA 5 | | | | | -1 | | | | 1 | | | | |
| DATA 6 | | | | | 1 | | | | -1 | | 1 | | 1 |
| DATA 7 | | | | | -1 | | | | 1 | | -1 | | -1 |
| DATA 8 | | | | | 1 | | | | -1 | | -1 | | -1 |
| DATA 9 | | | | | | | -1 | | | | | | 1 |
| DATA 10 | | | | | | | 1 | | | | | | -1 |
| DATA 11 | | | | | | | -1 | | | | | | 1 |
| DATA 12 | | | | | | | 1 | | | | | | -1 |

FIG. 35

| $P_{pos}(k,t)$ | | t=1 | t=2 | t=3 | t=4 | t=5 | t=6 | t=7 | t=8 |
|---|---|---|---|---|---|---|---|---|---|
| Antenna number | k=1 | 1 | 1 | 1 | 1 | 1 | 1 | 1 | 1 |
| | k=2 | 1 | j | -1 | -j | 1 | j | -1 | -j |
| | k=3 | 1 | -1 | 1 | -1 | 1 | -1 | 1 | -1 |
| | k=4 | 1 | -j | -1 | j | 1 | -j | -1 | -j |

FIG.36

| $P_{pos}(k,t)$ | | t=1 | t=2 | t=3 | t=4 | t=5 | t=6 | t=7 | t=8 |
|---|---|---|---|---|---|---|---|---|---|
| Antenna number | k=1 | 1 | 1 | 1 | 1 | 1 | 1 | 1 | 1 |
| | k=2 | 1 | -1 | 1 | -1 | 1 | -1 | 1 | -1 |
| | k=3 | 1 | 1 | -1 | -1 | 1 | 1 | -1 | -1 |
| | k=4 | 1 | -1 | -1 | 1 | 1 | -1 | -1 | 1 |

FIG.37

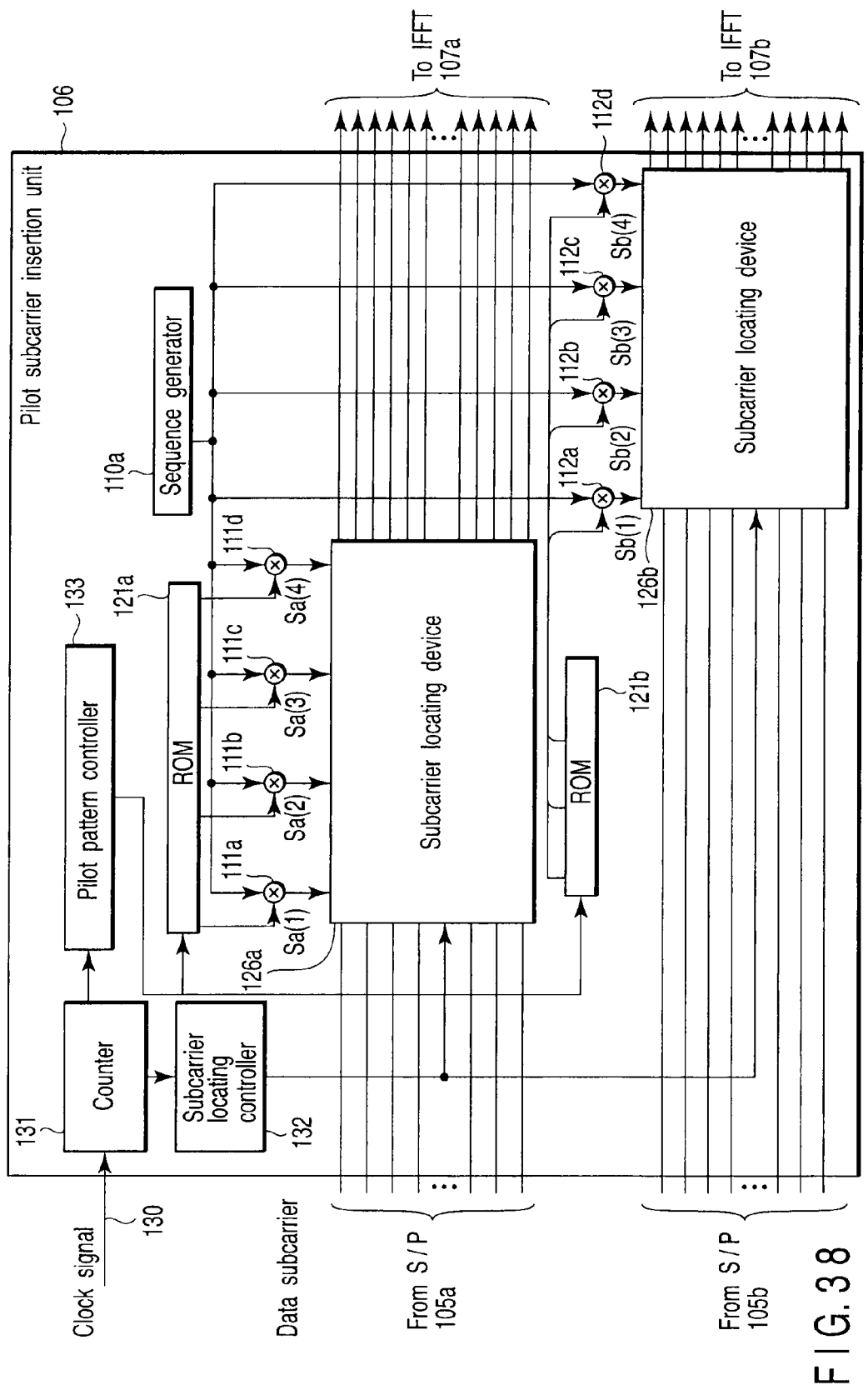
F I G. 38

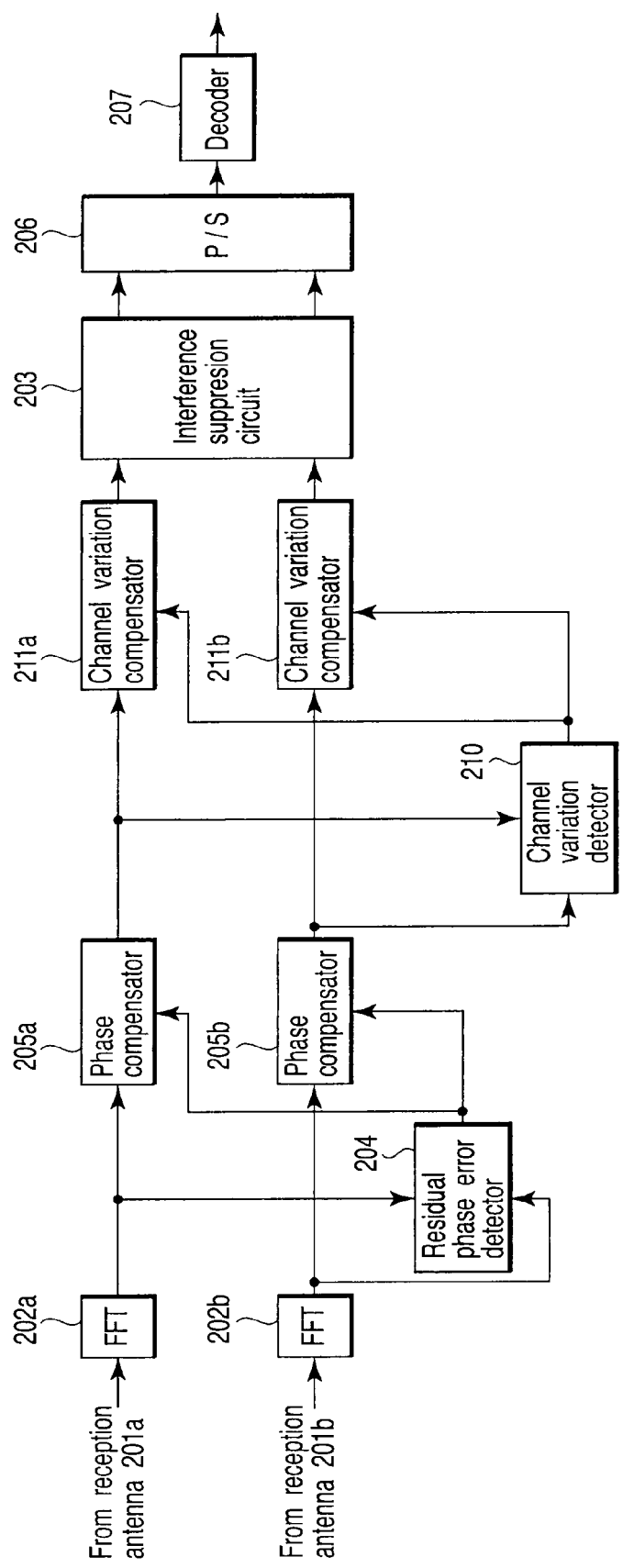
F I G. 40

OFDM SIGNAL TRANSMISSION METHOD AND APPARATUS

CROSS-REFERENCE TO RELATED APPLICATIONS

This application is a continuation of Ser. No. 11/076,051, filed Mar. 10, 2005 and is based upon and claims the benefit of priority from prior Japanese Patent Applications No. 2004-071732, filed Mar. 12, 2004, No. 2004-176096, filed Jun. 14, 2004, No. 2004-235349, filed Aug. 12, 2004, No. 2004-256247, filed Sep. 2, 2004; and No. 2005-052949, filed Feb. 28, 2005, the entire contents of all of which are incorporated herein by reference.

BACKGROUND OF THE INVENTION

1. Field of the Invention

The present invention relates to an orthogonal frequency division multiplexing (OFDM) signal transmission method and apparatus using a plurality of transmission antennas.

2. Description of the Related Art

Of OFDM signal transmission apparatuses, especially, a system which transmits different data simultaneously through a plurality of transmission antennas can transmit data at high transmission. On the other hand, the data error rate characteristic readily degrades. A method is known, in which on the transmitter side, a signal known to receiver, called a pilot symbol is superposed on one or a plurality of specific subcarriers to form pilot subcarriers. On the receiver side, channel equalization or frequency offset compensation is done for each subcarrier on the basis of the pilot subcarriers, thereby obtaining a decoded signal with an improved data error rate performance.

When a single known signal is transmitted from a plurality of transmission antennas by using pilot subcarriers of the same frequency, as described above, the transmission signals of the respective pilot subcarriers interfere with each other to form directional beams. In the IEEE 802.11a standard, there are 52 subcarrier populated and four of them are assigned as pilot subcarrier. However, the directional beam of all the pilot subcarriers are directed in almost the same direction because the interval (about 4.4 MHz) between the pilot subcarriers is smaller than the carrier frequency (5 GHz). In this case, the null points at which the electric fields of the respective directional beams abruptly decrease are also directed in the same direction. For this reason, it is almost impossible to receive the pilot subcarrier in the direction of the null points, and the reception performance drastically degrades.

To cope with this problem, Jpn. Pat. Appln. KOKAI Publication No. 2003-304216 discloses a technique, in which a pilot subcarrier is transmitted from only one transmission antenna, and null signals in the frequency band of the pilot subcarrier are transmitted from the remaining transmission antennas. According to this technique, the problem of mutual interference between pilot subcarriers, which occurs when pilot subcarriers are transmitted from a plurality of transmission antennas, is avoided. Hence, any degradation in reception performance due to directional beam formation can be prevented.

In the method of transmitting a pilot subcarrier from a single transmission antenna, like Jpn. Pat. Appln. KOKAI Publication No. 2003-304216, the total transmission power of the pilot subcarrier is low as compared to a system which transmits pilot subcarriers from a plurality of transmission antennas. This degrades the reception performance of the receiver.

When the transmission power of the pilot subcarrier from the single transmission antenna is made higher than that of the data subcarrier from each transmission antenna, the total transmission power of the pilot subcarrier can be increased, and the reception performance improves. However, when the transmission power of the pilot subcarrier from the single transmission antenna is increased, a variation in transmission power occurs in the frequency band of the OFDM signal. This may result in composite triple beat (CTB) or increase the dynamic range of the transmission signal to make the specifications (especially input dynamic range) of a digital to analog (D/A) converter of the receiver strict.

BRIEF SUMMARY OF THE INVENTION

It is an object of the present invention to provide an OFDM signal transmission apparatus which decreases the composite triple beat without decreasing the transmission power of a pilot subcarrier. It is another object of the present invention to increase the area where high-quality reception is possible.

The first aspect of the present invention provides an orthogonal frequency division multiplexing (OFDM) signal transmission apparatus which transmits OFDM signals by using a plurality of transmission antennas, comprising: a subcarrier setting device configured to set some of subcarriers of the OFDM signals to pilot subcarriers for transmitting pilot signals, and remaining subcarriers thereof to data subcarriers for transmitting a data signal, polarities of the pilot subcarriers differing among the transmission antennas.

BRIEF DESCRIPTION OF THE SEVERAL VIEWS OF THE DRAWING

FIGS. 2A and 2B are views showing the subcarrier location in OFDM signals transmitted from two transmission antennas according to the first embodiment of the present invention;

FIG. 4 is a block diagram of a pilot subcarrier insertion unit according to the first embodiment of the present invention;

FIGS. 11A to 11D are views showing the polarity patterns of pilot subcarriers transmitted from the respective transmission antennas when the first embodiment of the present invention is extended to an OFDM apparatus having four transmission antennas;

FIG. 13 is a view showing various polarity patterns of pilot subcarriers transmitted from the respective transmission antennas according to the second embodiment of the present invention;

FIG. 14 is a block diagram of a pilot subcarrier insertion unit according to the third embodiment of the present invention;

FIG. 15 is a view showing an example of the structure of a wireless packet of an OFDM signal;

FIGS. 17A and 17B are views showing the subcarrier location in OFDM signals transmitted from two transmission antennas according to the fourth embodiment of the present invention;

FIG. 18 is a view for explaining the residual phase error detection principle according to the fourth embodiment of the present invention;

FIGS. 30A and 30B are views showing the subcarrier location in OFDM signals transmitted from two transmission antennas according to a prior art;

FIG. 32 is a view showing the pilot subcarrier location in an OFDM signal transmitted from the first transmission antenna according to the 10th embodiment of the present invention;

FIG. 33 is a view showing the pilot subcarrier location in an OFDM signal transmitted from the second transmission antenna according to the 10th embodiment of the present invention;

FIG. 34 is a view showing the pilot subcarrier location in an OFDM signal transmitted from the third transmission antenna according to the 10th embodiment of the present invention;

FIG. 35 is a view showing the pilot subcarrier location in an OFDM signal transmitted from the fourth transmission antenna according to the 10th embodiment of the present invention;

FIG. 36 is a view showing an example of polarity data of the pilot subcarrier according to the 10th embodiment of the present invention;

FIG. 37 is a view showing another example of polarity data of the pilot subcarrier according to the 10th embodiment of the present invention;

FIG. 38 is a block diagram of a pilot subcarrier insertion unit according to the 10th embodiment of the present invention;

FIG. 40 is a block diagram of a modification of the OFDM signal reception apparatus according to the 10th embodiment of the present invention.

DETAILED DESCRIPTION OF THE INVENTION

The embodiments of the present invention will be described below with reference to the accompanying drawing.

First Embodiment

Figure 1:
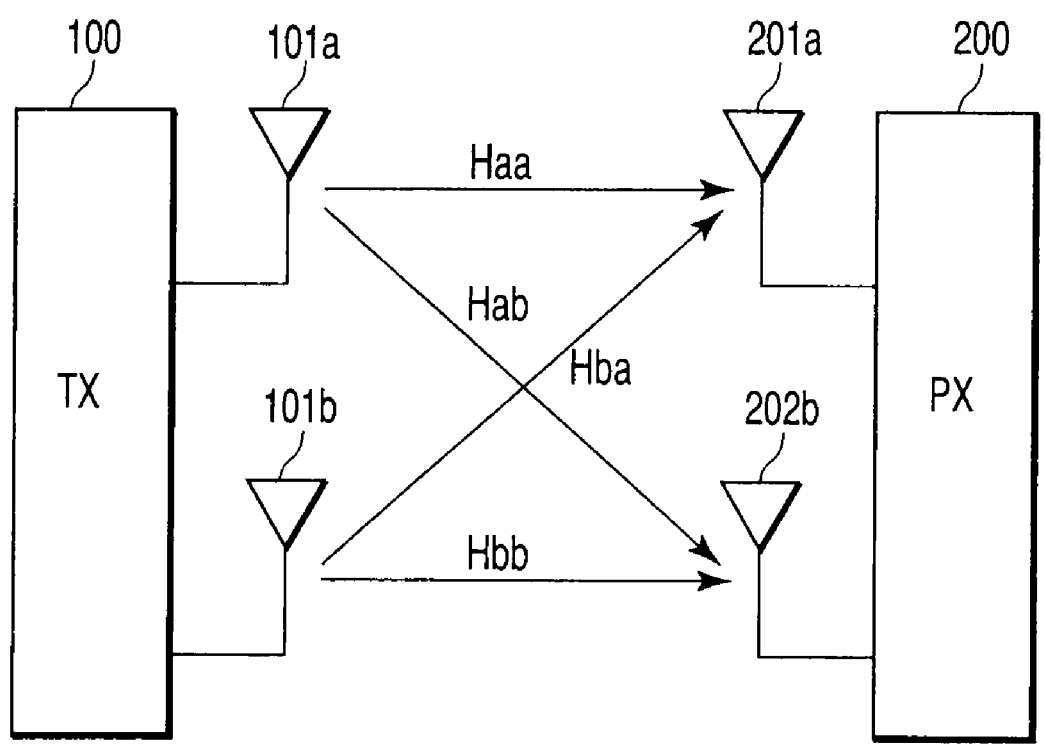
FIG. 1 is a block diagram of an OFDM communication system according to an embodiment of the present invention.

As shown in FIG. 1, in an OFDM system according to the first embodiment of the present invention, OFDM signals are transmitted for an OFDM signal transmission apparatus 100 having a plurality of transmission antennas 101a and 101b. The transmitted OFDM signals are received by an OFDM signal reception apparatus 200 having a plurality of reception antennas 201a and 201b. In the system to be described here, the OFDM signal transmission apparatus 100 has the two transmission antennas 101a and 101b and the OFDM signal reception apparatus 200 has the two reception antennas 201a and 201b. However, the present invention is not limited to this and is also effective in a system having three or more transmission antennas and reception antennas.

In this embodiment, as schematically shown in FIGS. 2A and 2B, the OFDM signal transmission apparatus 100 forms two OFDM signals from two different transmission data and transmits the OFDM signals from the different transmission antennas 101a and 101b. In the first OFDM signal shown in FIG. 2A, transmission data DATA_a (N, K) is superposed.

In the second OFDM signal shown in FIG. 2B, transmission data DATA_b (N, K) is superposed. DATA_a (N, K) indicates data transmitted from the transmission antenna 101a and, more particularly, a signal transmitted by K subcarriers of the Nth symbol. DATA_b (N, K) indicates data transmitted from the transmission antenna 101b and, more particularly, a signal transmitted by K subcarriers of the Nth symbol. A pilot subcarrier will be described later.

Let Haa be the transfer function of the channel (the transfer function of the channel will be referred to as a channel response value hereinafter) from the transmission antenna 101a to the reception antenna 201a, Hab be the channel response value from the transmission antenna 101a to the reception antenna 201b, Hba be the channel response value from the transmission antenna 101b to the reception antenna 201a, and Hbb be the channel response value from the transmission antenna 101b to the reception antenna 201b. A reception signal RXa of the reception antenna 201a and a reception signal RXb of the reception antenna 201b are expressed by $$\begin{bmatrix} RXa \\ RXb \end{bmatrix} = \begin{bmatrix} H_{aa} & H_{ba} \\ H_{ab} & H_{bb} \end{bmatrix} \begin{bmatrix} TXa \\ TXb \end{bmatrix} \quad (1)$$

where TXa and TXb are transmission signals from the transmission antennas 101a and 101b, respectively. When the reception signals RXa and RXb are multiplied by the inverse matrix of the matrix formed by the channel response values Haa, Hab, Hba, and Hbb, the transmission signals TXa and TXb can be demodulated.

In the first embodiment, a pilot subcarrier to transmit a known signal to be used to compensate for the residual phase error of a frequency offset or clock offset is used independently of a data subcarrier to transmit data. More specifically, in the reception mode, the residual phase error is detected and compensated by using the known signal transmitted by the pilot subcarrier.

A description will be made here for comparison. Jpn. Pat. Appln. KOKAI Publication No. 2003-304216, an OFDM signal shown in FIG. 30A is transmitted from the first transmission antenna, and an OFDM signal shown in FIG. 30B is transmitted from the second transmission antenna. That is, the pilot subcarrier indicated by a hatched portion is transmitted from only the first transmission antenna, as shown in FIG. 30A. No pilot subcarrier is transmitted from the second transmission antenna, as shown in FIG. 30B. At the frequency corresponding to the pilot subcarrier, a null signal indicated by a blank portion is transmitted. Since the pilot subcarriers are transmitted without any interference, the reception characteristic does not degrade due to a directional beam. However, the total transmission power of the pilot subcarriers becomes low.

According to the first embodiment, a satisfactory reception characteristic can be obtained while sufficiently ensuring the total transmission power of pilot subcarriers by transmitting them from the two transmission antennas 101a and 101b.

The OFDM signal transmission apparatus 100 shown in FIG. 1 will be described next with reference to FIG. 3. The OFDM signal transmission apparatus 100 comprises an encoder 102, serial-parallel converter 103, modulators 104a and 104b, serial-parallel converters 105a and 105b, pilot subcarrier insertion unit 106, and inverse fast fourier transform (IFFT) units 107a and 107b.

Input transmission data is a wireless packet having a structure to be described later. The transmission data is encoded by the encoder 102. The encoded data is subjected to serial-parallel conversion by the serial-parallel converter 103 and divided into first transmission data corresponding to the transmission antenna 101a and second transmission data corresponding to the transmission antenna 101b. The first and second transmission data are subcarrier-modulated by the modulators 104a and 104b, respectively. As the modulation method of the modulators 104a and 104b, for example, binary phase shift keying (BPSK), quadrature phase shift keying (QPSK), 16 quadrature amplitude modulation (QAM), or 64QAM is used, although the present invention is not limited to these methods.

The modulated data output from the modulator 104a is divided into a plurality of first data subcarriers by the serial-parallel converter 105a. The modulated data output from the modulator 104b is divided into a plurality of second data subcarriers by the serial-parallel converter 105b.

The modulated data (to be referred to as first data subcarriers and second data subcarriers hereinafter) allocated to the first and second data subcarriers are input to the pilot subcarrier insertion unit 106. In the pilot subcarrier insertion unit 106, some of the subcarriers of OFDM signals are allocated to pilot subcarriers to transmit pilot signals, and the remaining subcarriers are allocated to data subcarriers to transmit data signals.

More specifically, the pilot subcarrier insertion unit 106 inserts pilot signals (to be referred to as first pilot subcarriers hereinafter in this specification) to be transmitted by at least one first pilot subcarrier between the first data subcarriers. In addition, the pilot subcarrier insertion unit 106 inserts pilot signals (to be referred to as second pilot subcarriers hereinafter in this specification) to be transmitted by at least one second pilot subcarrier between the second data subcarriers. A set of first data subcarriers and first pilot subcarriers will be referred to as a first subcarrier signal. A set of second data subcarriers and second pilot subcarriers will be referred to as a second subcarrier signal.

The first and second subcarrier signals output from the pilot subcarrier insertion unit 106 are subjected to inverse fast Fourier transform by the IFFT units 107a and 107b, respectively. As a result of inverse fast Fourier transform, the first and second subcarrier signals are multiplexed as they are converted from the signals on the frequency axis to signals on the time axis. Hence, a first OFDM signal a and second OFDM signal b as shown in FIGS. 2A and 2B are generated. The OFDM signals a and b are sent to the transmission antennas 101a and 101b through radio transmission units (not shown) and transmitted from the transmission antennas 101a and 101b, respectively.

The pilot subcarrier insertion unit 106 will be described next with reference to FIG. 4.

In the pilot subcarrier insertion unit 106, the first data subcarriers from the serial-parallel converter 105a and the second data subcarriers from the serial-parallel converter 105b are directly output to the IFFT units 107a and 107b. At this time, first pilot subcarriers are inserted between the first data subcarriers, and second pilot subcarriers are inserted between the second data subcarriers.

In this embodiment, four first pilot subcarriers and four second pilot subcarriers are present.

A sequence generator 110 generates a pseudorandom noise (PN) sequence like an M sequence. The first pilot subcarriers are generated by causing multiplying units 111a to 111d to obtain the products between a PN sequence PN(i) and polarity data Sa(j) of the first pilot subcarriers, which are stored in a ROM 121a. The second pilot subcarriers are generated by causing multiplying units 112a to 112d to obtain the products between the PN sequence PN(i) and polarity data Sb(j) of the second pilot subcarriers, which are stored in a ROM 121b. A baseband signal Pa(i,j) of the first pilot subcarriers transmitted from the transmission antenna 101a is expressed by the product of PN(i) and Sa(j), which is given by $$Pa(i,j) = PN(i) \times Sa(j) \quad (2)$$

where i is the symbol number in the time domain, and j is the pilot subcarrier number in the frequency domain. Similarly, a baseband signal Pb(i,j) of the pilot subcarriers from the transmission antenna 101*b* is expressed by the product of PN(i) and Sb(j), which is given by $$Pb(i,j)=PN(i) \times Sb(j) \quad (3)$$

In the first embodiment, the number of pilot subcarriers transmitted from each of the transmission antennas 101*a* and 101*b* is four (j=1 to 4). The polarity data Sa(j) and Sb(j)(j=1, 2, 3, 4) of the first and second pilot subcarriers transmitted from the transmission antennas 101*a* and 101*b* are set as follows.

$$Sa(1)=1, Sa(2)=1, Sa(3)=1, Sa(4)=-1 \quad (4)$$

$$Sb(1)=1, Sb(2)=-1, Sb(3)=1, Sa(4)=1 \quad (5)$$

That is, the polarity data Sa(j) to be multiplied by the PN sequence in the first pilot subcarriers output from the transmission antenna 101*a* are different from the polarity data Sb(j) to be multiplied by the PN sequence in the second pilot subcarriers output from the transmission antenna 101*b*. Accordingly, the polarity pattern of the first pilot subcarriers is different from that of the second pilot subcarriers. The polarity pattern of the first pilot subcarriers indicates the pattern of combination of the polarities of the first pilot subcarriers. The polarity pattern of the second pilot subcarriers indicates the pattern of combination of the polarities of the second pilot subcarriers. The effect obtained by using different polarity patterns for the first and second pilot subcarriers will be described later in detail. The polarity data of each pilot subcarrier and the PN sequence are expressed by real numbers.

Instead, polarity data represented by a complex number or a PN sequence represented by a complex number can also be used.

The OFDM signal reception apparatus 200 shown in FIG. 1 will be described next with reference to FIG. 5. The OFDM signal reception apparatus 200 comprises fast Fourier transform (FFT) units 202*a* and 202*b*, interference suppression circuit 203, residual phase error detector 204, phase compensation units 205*a* and 205*b*, serial-parallel converter 206, and decoder 207.

The OFDM signal received by the reception antenna 201*a* is input to the FFT unit 202*a* through a wireless reception unit (not shown). The signal is divided into subcarrier signals by Fourier transform. The OFDM signal received by the reception antenna 201*b* is also subjected to Fourier transform by the FFT unit 202*b* and divided into subcarrier signals.

As shown in FIG. 1, in the signal received by the reception antenna 201*a*, the OFDM signals transmitted from the transmission antennas 101*a* and 101*b* are superposed. In the signal received by the reception antenna 201*b* as well, the OFDM signals transmitted from the transmission antennas 101*a* and 101*b* are superposed. The interference suppression circuit 203 suppresses interference to demultiplex and receive the OFDM signals from the transmission antennas 101*a* and 101*b*. The interference suppression system for this is a known technique. In this example, a system which multiplies the received signal by the inverse matrix of the matrix formed by channel responses represented by equation (1) will be described. The inverse matrix of the matrix formed by channel responses represented by equation (1) can be rewritten to $$\begin{bmatrix} H_{aa} & H_{ba} \\ H_{ab} & H_{bb} \end{bmatrix}^{-1} = \frac{1}{|H_{aa}H_{bb} - H_{ba}H_{ab}|} \begin{bmatrix} H_{bb} & -H_{ba} \\ -H_{ab} & H_{aa} \end{bmatrix} \quad (6)$$

$$= \begin{bmatrix} A & B \\ C & D \end{bmatrix}$$

When the inverse matrix represented by equation (6) is multiplied by received signal vectors generated from the received signals output from the reception antennas 201*a* and 201*b*, the OFDM signals from the transmission antennas 101*a* and 101*b* are demultiplexed. In a multipath environment, the channel response value changes between the subcarriers. As a result, derivation of the coefficient of the inverse matrix and multiplication of the inverse matrix are executed for each subcarrier. The signals demultiplexed by the interference suppression circuit 203 are sent to the residual phase error detector 204.

The residual phase error detector 204 detects a residual component such as a frequency offset or clock offset compensated by using the preamble of a wireless packet (not shown). The residual phase error detector 204 also detects the residual phase error of the received signals RXa and RXb by using the known signal transmitted by the subcarrier and sends the residual phase error to the phase compensation units 205*a* and 205*b*.

Figure 6:
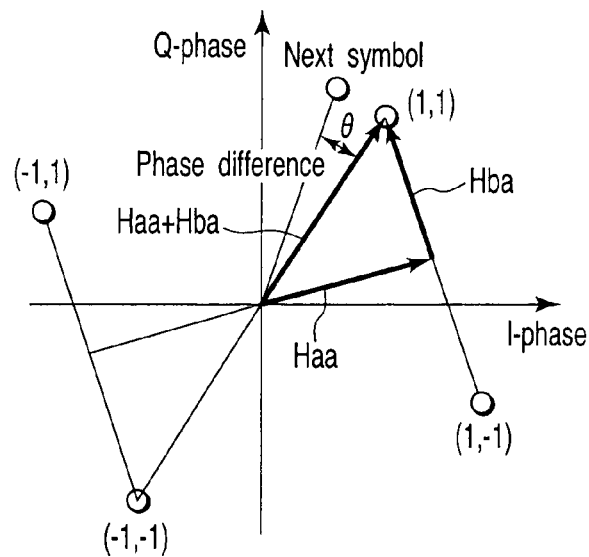
FIG. 6 is a view for explaining the residual phase error detection principle according to the first embodiment of the present invention.

FIG. 6 shows the detection principle of the residual phase error detector 204. An example will be described here in which residual phase error detection is applied to a signal without interference suppression. For a pilot subcarrier, the weight matrix (right-hand component of equation (6)) represented by equation (6) is expressed by a unit matrix or a matrix obtained by weighting and combining the outputs from the FFT units 202*a* and 202*b* to maximize the S/N ratio, i.e., a maximum ratio combining (MRC) matrix. When pilot subcarriers of two values generated from PN sequences of two values are transmitted by using the two transmission antennas 101*a* and 101*b*, $2^2=4$ candidate received signal points (1,1), (1,−1), (−1,1), and (−1,−1) are present in the OFDM signal reception apparatus before interference suppression, as shown in FIG. 6. For example, (1,−1) represents that a modulated signal "1" is transmitted at a subcarrier from the transmission antenna 101*a*, and a modulated signal "−1" is transmitted at a subcarrier from the transmission antenna 101*b*.

As in the first embodiment, when the first and second pilot subcarriers generated from the common PN sequence are transmitted from the transmission antennas 101*a* and 101*b*, the combination of reception signal points is (1,1) and (−1,−1), or (1,−1) and (−1,1). This combination does not change during wireless packet reception. For example, when the combination of reception signal points is (1,−1) and (−1,1), it looks for the OFDM signal reception apparatus as if a BPSK signal were transmitted from a single transmission antenna.

A case in which a residual phase error is detected by using pilot subcarriers Pa(1) and Pb(1) transmitted by the (−k+1)th subcarrier will be described next. Only the FFT unit 202*a* connected to the reception antenna 201*a* is taken into consideration. Let Haa be the channel response value from the transmission antenna 101*a* to the reception antenna 201*a* in the (−k+1)th subcarrier. Let Hba be the channel response value from the transmission antenna 101*b* to the reception antenna 201*a*. When the polarities of the pilot subcarriers are represented by equations (4) and (5), polarities corresponding to the (−k+1)th pilot subcarrier are Sa(1)=1 and Sb(1)=1.

Since the pilot signal in which the signals from the two transmission antennas are multiplexed is multiplied by the channel response value Haa+Hba, the two points (1,1) and (−1,−1) are received. Hence, the residual phase error detector calculates the channel response value Haa+Hba by using the channel response values Haa and Hba and creates the reference signal points (1,1) and (−1,−1).

Assume that (1,1) is transmitted by the next OFDM symbol, and the received signal point at this time is "next symbol" in FIG. 6. At this time, the residual phase error detector 204 can detect, as the residual phase error, a phase difference θ between the next symbol and the current reception signal point (1,1). The residual phase error value can be obtained from both of the plurality of outputs, i.e., the output from the system of the reception antenna 201a and the output from the system of the reception antenna 201b. In this case, the average value or weighed average value of the two values can be output to the phase compensators 205a and 205b.

In the first embodiment, residual phase error detection using pilot subcarriers is executed without using interference suppression. Instead, the residual phase error may be detected after interference suppression is executed. In this case, the received signal points of pilot subcarriers appear equal in number to the transmission signal points from the transmission antennas 101a and 101b. When residual phase error detection using pilot subcarriers is executed after interference suppression, the S/N ratio of the pilot subcarriers is low. Hence, the estimation accuracy degrades.

The phase compensation units 205a and 205b execute phase rotation for the reception signals in correspondence with the residual phase error, thereby compensating for the phase. The two reception signals after phase compensation are converted into a serial signal by the serial-parallel converter 206 and decoded by the decoder 207 so that a reception signal corresponding to the transmission signal is obtained.

As described above, the pilot subcarriers are used to detect the residual phase error. If the signal to noise ratio of the pilot subcarriers are low, the performance of the residual phase error detection will degrade. In this case, since the phase compensation units 205a and 205b execute phase compensation on the basis of the wrong residual phase error detection result, all data subcarriers are erroneously received at a high probability. Hence, it's no exaggeration to say that the reception power of pilot subcarriers determines the reception performance of the OFDM signal reception apparatus. To solve this problem, in this embodiment, the first pilot subcarrier transmitted from the transmission antenna 101a and the second pilot subcarrier transmitted from the transmission antenna 101b have different polarities, as described above.

Figure 7:
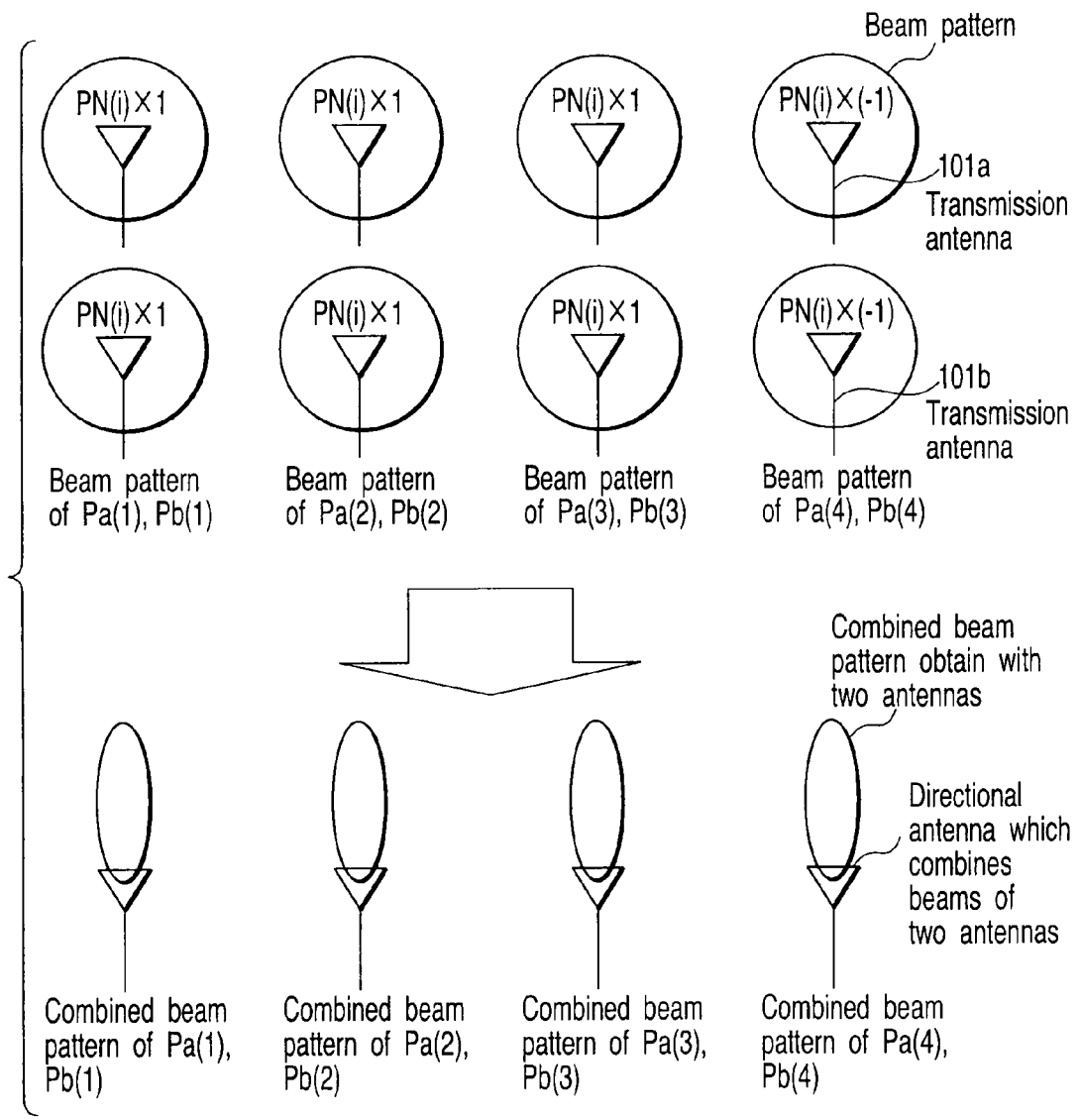
FIG. 7 schematically shows the beam patterns of each of first and second transmission antennas and the beam patterns combined with the first and second transmission antennas when pilot subcarriers having the same polarity pattern are transmitted from the first and second transmission antennas.

FIG. 7 schematically shows the beam patterns of each transmission antenna 101a and 101b and the beam patterns combined with the antennas 101a and 101b when pilot subcarriers having the same polarity pattern are transmitted from the antennas 101a and 101b. The polarity data Sa(1), Sa(2), Sa(3), and Sa(4) of the first pilot subcarriers transmitted from the transmission antenna 101a are represented by equation (4). The polarity data Sb(1), Sb(2), Sb(3), and Sb(4) of the second pilot subcarriers transmitted from the transmission antenna 101b are given by $$Sb(1)=1, Sb(2)=1, Sb(3)=1, Sb(4)=-1 \quad (7)$$

The transmission antennas 101a and 101b are assumed to be omni-directional antennas as shown on the upper side of FIG. 7. When pilot subcarriers of the same polarity are transmitted simultaneously from the antennas 101a and 101b, the transmission signals interfere with each other, and their combined beam patterns form directional beams. On the basis of the IEEE 802.11a standard, the interval (4.4 MHz) between the pilot subcarriers is much smaller than the center frequency (carrier frequency) of 5.5 GHz of the OFDM signal. Hence, the directional beams of the four pilot subcarriers are directed in almost the same direction, as shown on the lower side of FIG. 7. As a result, there will be an area where the received powers of all the four pilot subcarriers largely decrease, i.e., a dead zone where the performance of the OFDM signal reception apparatus degrades.

Figure 8:
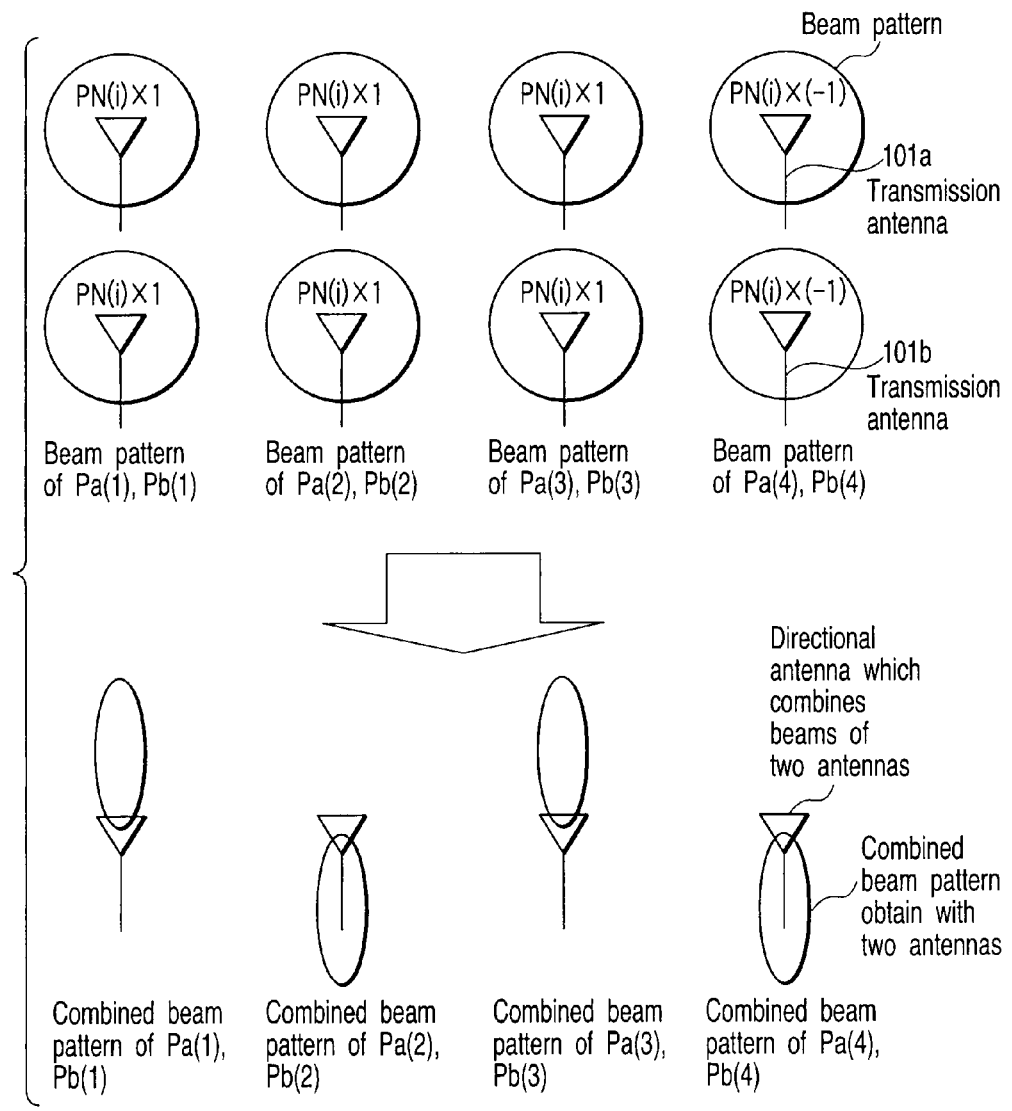
FIG. 8 schematically shows the beam patterns of each of first and second transmission antennas and the beam patterns combined with the first and second transmission antennas when the polarity pattern of the first pilot subcarriers transmitted from the first transmission antenna and that of the second pilot subcarriers transmitted from the second transmission antenna are different according to the first embodiment.

FIG. 8 schematically shows the beam patterns of each transmission antenna 101a and 101b and the beam patterns combined with antennas 101a and 101b when the polarity pattern of the first pilot subcarriers transmitted from the antenna 101a and that of the second pilot subcarriers transmitted from the antenna 101b are different. The polarity data Sa(1), Sa(2), Sa(3), and Sa(4) of the first pilot subcarriers transmitted from the transmission antenna 101a are represented by equation (4). The polarity data Sb(1), Sb(2), Sb(3), and Sb(4) of the second pilot subcarriers transmitted from the transmission antenna 101b are represented by equation (5).

In accordance with equations (4) and (5), for example, the phase difference between the first pilot subcarrier controlled in accordance with the polarity data Sa(1) and the second pilot subcarrier controlled in accordance with the polarity data Sb(1) is 0. To the contrary, the phase difference between the first pilot subcarrier controlled in accordance with the polarity data Sa(2) and the second pilot subcarrier controlled in accordance with the polarity data Sb(2) is 180°. As a result, as shown in, e.g., the lower side of FIG. 8, the directional beam formed by the pilot subcarriers having the polarities Sa(1) and Sb(1) and that formed by the pilot subcarriers having the polarities Sa(2) and Sb(2) are directed in directions different by 180°.

Figure 9:
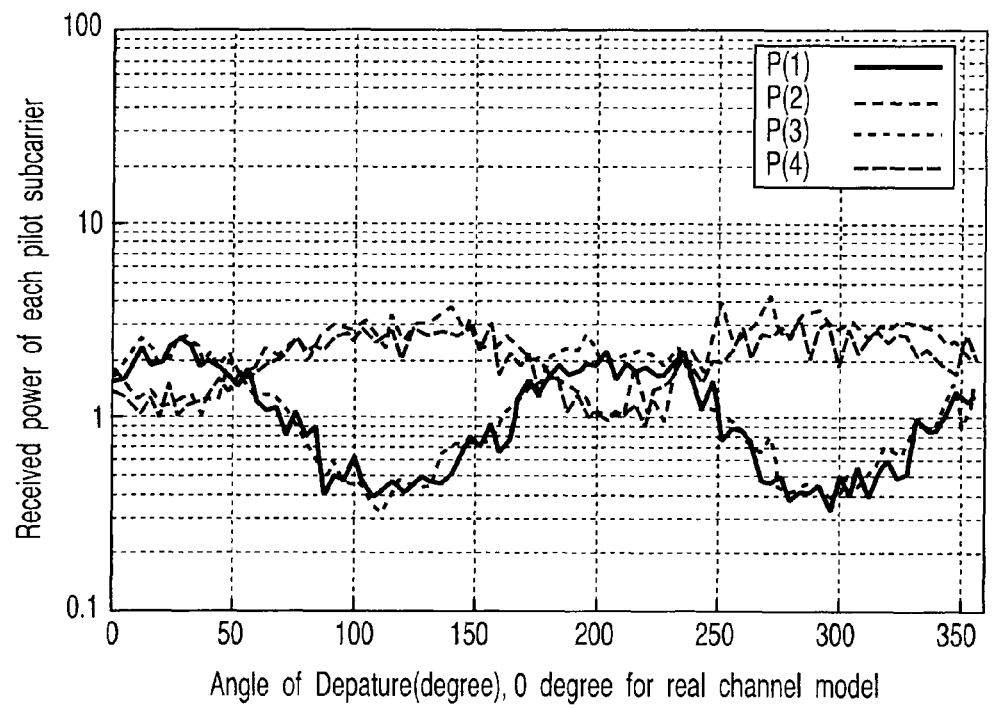
FIG. 9 is a graph showing the average normalized reception level of pilot subcarriers in the reception apparatus when the pilot subcarrier is transmitted by using the embodiment of the present invention.

FIG. 9 shows the average normalized reception level of pilot subcarriers in the receiver when the pilot subcarriers are transmitted by using the embodiment of the present invention. Two transmission antennas are used. Four pilot subcarriers Pa(1), Pa(2), Pa(3), and Pa(4) and four pilot subcarriers Pb(1), Pb(2), Pb(3), and Pb(4) using equations (4) and (5) are used. As for the polarity of each pilot subcarrier, the center frequency of the OFDM signal is 5 GHz, the signal bandwidth is about 20 MHz, the antenna element interval is a half wavelength, and each element is omni-directional. As the channel model, "Channel model D (NLOS)" shown in IEEE 802.11-03-940/rl "TGn Channel model" is used. The X-axis in FIG. 9 represents the angle viewed from the transmission antenna, and the Y-axis represents the received power of four pilot subcarriers corresponding to a certain transmission angle.

As is apparent from FIG. 9, at a certain angle, the power of a pilot subcarrier decreases as compared to other angles. At that point, however, the reception powers of the remaining pilot subcarriers are high. For this reason, the receiver can compensate for the residual phase error by using the pilot subcarriers of high level.

Figure 10:
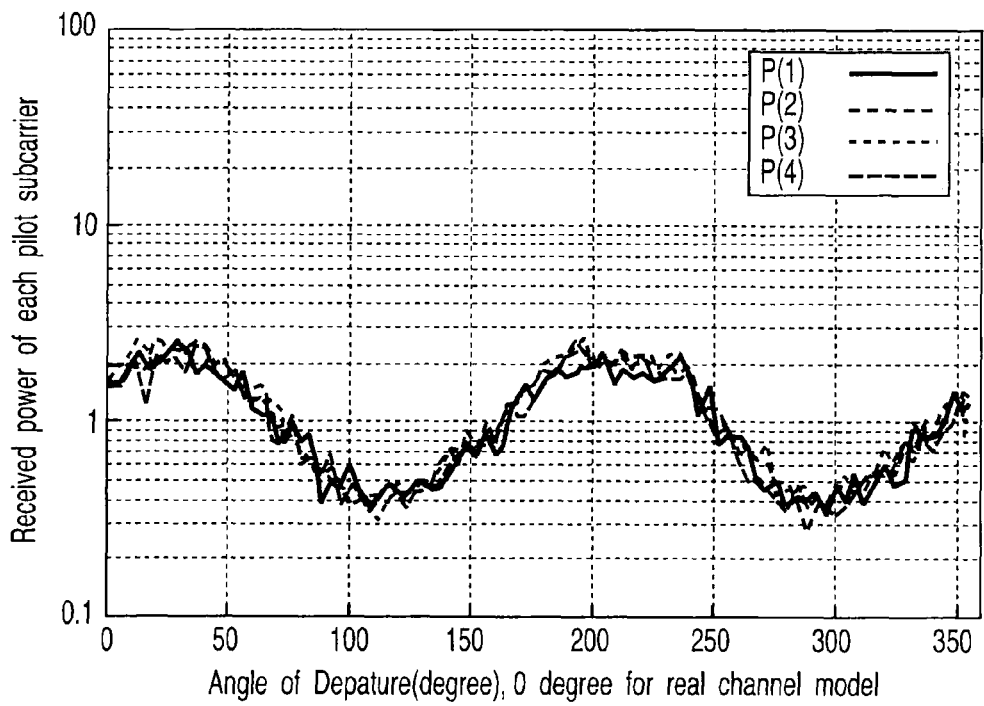
FIG. 10 is a graph showing the reception power when first and second pilot subcarriers are transmitted by using certain polarity data.

FIG. 10 shows the reception power when the pilot subcarriers are transmitted by using equations (4) and (7). That is, FIG. 10 shows the characteristic when pilot signals having the same polarity are used. As is apparent from FIG. 10, at a certain angle, the power of a pilot subcarrier decreases as compared to other angles. The remaining pilot subcarriers also have this tendency. Hence, the powers of all the pilot subcarriers decrease simultaneously. For this reason, it is difficult for a receiver depending on the angle to compensate for the residual phase error by using the pilot subcarriers.

On the receiving side, even when the reception power of one pilot subcarrier is low, the reception powers of the remaining pilot subcarriers are high at a high probability by using the first embodiment. Since the dead zone where the reception powers of all the pilot subcarriers decrease simultaneously can be reduced, the area where high-quality reception is possible widens.

In the first embodiment, it is not necessary to especially increase the transmission powers of subcarriers for all the transmission antennas 101a and 101b since the pilot subcarriers are transmitted from all antennas.

For this reason, the composite triple beat does not increase, and the input dynamic range of the D/A converter need not particularly be widened.

In the above description, the OFDM signal transmission apparatus 100 has the two transmission antennas 101a and 101b. However, the present invention can also be extended to an OFDM apparatus having three or more transmission antennas. FIGS. 11A and 11B show examples of two kinds of polarity patterns of the first to fourth pilot subcarriers which are transmitted from each of four transmission antennas 101a to 101d. FIGS. 11C and 11D show examples of two kinds of polarity patterns of the first to fourth pilot subcarriers which are transmitted from each of three transmission antennas 101a to 101c. Two kinds of pilot subcarrier polarities 1 and 2 are prepared for each of the first to fourth pilot subcarriers. Pilot subcarrier polarity 1 is a polarity pattern when a real number is used. Pilot subcarrier polarity 2 is a polarity pattern when an imaginary number is used. Pilot subcarrier polarity 2 might be generated by using the coefficient of a Fourier matrix.

In pilot subcarrier polarity 1 for the four transmission antennas shown in FIG. 11A, the polarities of the first pilot subcarriers are Sa(1)=1, Sa(2)=1, Sa(3)=1, and Sa(4)=-1. The polarities of the second pilot subcarriers are Sb(1)=1, Sb(2)=-1, Sb(3)=1, and Sb(4)=1. The polarities of the third pilot subcarriers are Sc(1)=1, Sc(2)=-1, Sc(3)=-1, and Sc(4)=-1. The polarities of the fourth pilot subcarriers are Sd(1)=1, Sd(2)=1, Sd(3)=-1, and Sd(4)=1. For the pilot subcarriers transmitted from a certain frequency, consider vectors each having the respective polarities as elements. Four pilot subcarriers are transmitted from each transmission antenna. Since there are four transmission antennas, the four following vectors each having four elements as the polarity data can be defined as the polarity pattern.

$$s(1) = [\ 1,\ \ 1,\ \ 1,\ \ 1\ ] \qquad (8)$$
$$s(2) = [\ 1,\ -1,\ -1,\ \ 1\ ]$$
$$s(3) = [\ 1,\ \ 1,\ -1,\ -1\ ]$$
$$s(4) = [-1,\ \ 1,\ -1,\ \ 1\ ]$$

In this case, s(1) to s(4) are vectors different from each other. For example, the vector s(1) does not change to another vector even when it is multiplied by scalar value. When the vector of a pilot subcarrier transmitted from a certain frequency is different from that of a pilot subcarrier transmitted from another frequency, the directional beams of the respective pilot subcarriers are directed in different directions. Hence, the dead zone can be reduced. Note that s(1) to s(4) are orthogonal to each other. Even when they are not orthogonal to each other, the directional beams can be directed in different directions.

In pilot subcarrier polarity 2 for the four transmission antennas shown in FIG. 11B, the polarities of the first pilot subcarriers are Sa(1)=1, Sa(2)=1, Sa(3)=1, and Sa(4)=-1. The polarities of the second pilot subcarriers are Sb(1)=1, Sb(2)=-j, Sb(3)=-1, and Sb(4)=-j. The polarities of the third pilot subcarriers are Sc(1)=1, Sc(2)=-1, Sc(3)=1, and Sc(4)=1. The polarities of the fourth pilot subcarriers are Sd(1)=1, Sd(2)=j, Sd(3)=-1, and Sd(4)=j, where j is the imaginary unit. In this case as well, for the pilot subcarriers transmitted from a certain frequency, consider vectors each having the respective polarities as elements, as described above. The vectors are different from each other in the complex domain. They are orthogonal to each other in the complex domain. However, they need not always be orthogonal to each other.

In pilot subcarrier polarity 1 for the three transmission antennas shown in FIG. 11C, the polarities of the first pilot subcarriers are Sa(1)=1, Sa(2)=1, Sa(3)=1, and Sa(4)=-1. The polarities of the second pilot subcarriers are Sb(1)=1, Sb(2)=-1, Sb(3)=1, and Sb(4)=1. The polarities of the third pilot subcarriers are Sc(1)=1, Sc(2)=-1, Sc(3)=-1, and Sc(4)=-1. In this case as well, for the pilot subcarriers transmitted from a certain frequency, consider vectors each having the respective polarities as elements, as described above. The vectors are different from each other.

In pilot subcarrier polarity 2 for the three transmission antennas shown in FIG. 11D, the polarities of the first pilot subcarriers are Sa(1)=1, Sa(2)=1, Sa(3)=1, and Sa(4)=-1. The polarities of the second pilot subcarriers are Sb(1)=1, Sb(2)=-j, Sb(3)=-1, and Sb(4)=-j. The polarities of the third pilot subcarriers are Sc(1)=1, Sc(2)=-1, Sc(3)=1, and Sc(4)=1. In this case as well, for the pilot subcarriers transmitted from a certain frequency, consider vectors each having the respective polarities as elements, as described above. The vectors are different from each other. Each vector does not change to another vector even when it is multiplied in the complex domain.

When the locations of pilot subcarriers are determined in this way, the directional beams of the respective pilot subcarriers are directed in different directions. For this reason, the dead zone can be reduced.

In the complex domain, the pilot subcarrier polarities shown in FIGS. 11A to 11D can be given by $$s_k(i) = \exp\left(\frac{j\pi}{2}(k-1)i\right) \qquad (9)$$

where $s_k(i)$ is the polarity of the pilot subcarrier, j is the imaginary unit, i is the number of the pilot subcarrier, and k is the antenna number of the transmission antenna. For example, the first element of k represents the signal transmitted from the transmission antenna 101a, and the second element of k represents the signal transmitted from the transmission antenna 101b.

According to equation (9), the phase difference between the first to fourth pilot subcarriers transmitted from the antenna 101b of k=2 is -90°. The phase difference between the pilot subcarriers transmitted from the antenna 101c of k=3 is -180°. The phase difference between the pilot subcarriers transmitted from the antenna 101d of k=4 is -270°. When the transmission antenna changes, the phase difference between pilot subcarriers of the antenna changes. Hence, as described above, since the directional beams corresponding to the respective pilot subcarriers are directed in different directions, the dead zone can be reduced.

The phase difference of -90° equals the phase difference of 270° and the phase difference of -270° equals the phase difference of 90°. To express FIGS. 11A to 11D faithfully, a minus sign is necessary in the exponential term of equation (9). However, since the same result can be obtained without any minus sign as described above, the sign is omitted in equation (9).

According to FIGS. 11A and 11B, of the pilot subcarriers transmitted from the first transmission antenna 101a, the fourth pilot subcarrier has an inverted polarity, unlike the first to third pilot subcarriers, as represented by $$[S_k(1), S_k(2), S_k(3), S_k(4)] = [s_k(1), s_k(2), s_k(3), -s_k(4)] \quad (10)$$

In other words, the polarities of the first to fourth pilot subcarriers are given by $$s_k(i) = \begin{cases} \exp\left(\frac{j\pi}{2}(k-1)i\right) & i = 0, 1, 2 \\ -\exp\left(\frac{j\pi}{2}(k-1)i\right) & i = 3 \end{cases} \quad (11)$$

More generally, depending on the pilot subcarrier number i, the polarity of a pilot subcarrier is given by $$s_k(i) = \exp\left(\frac{j\pi}{2}(k-1)i\right) \quad (12)$$

or $$s_k(i) = -\exp\left(\frac{j\pi}{2}(k-1)i\right) \quad (13)$$

In the above description, i is the number of a pilot subcarrier. However, i may be changed to the frequency of the pilot subcarrier. More specifically, for example, −21, −7, +7, and 21 are used as the value i. In consideration of the periodicity of the Fourier transform function, the pilot subcarrier polarity can also be expressed by $$s_k(i) = \exp\left(\frac{j2\pi(k-1)i}{N}\right) \quad (14)$$

where $s_k(i)$ is the polarity of the pilot subcarrier, j is the imaginary unit, i is the frequency of the pilot subcarrier, k is the antenna number of the transmission antenna, and N is the number of input points in inverse Fourier transform.

Even in equation (14), when the transmission antenna changes, the phase difference between the pilot subcarriers changes. Hence, the dead zone can be reduced. In consideration of a Fourier transform pair, the expression of equation (14) is equivalent to cyclic shifting the transmission signal sample by sample for each transmission antenna along the time domains.

Other embodiments of the present invention will be described next. The other embodiments to be described below are different from the first embodiment in the pilot subcarrier insertion unit 106 in the OFDM signal transmission apparatus 100.

Second Embodiment

Figure 12:
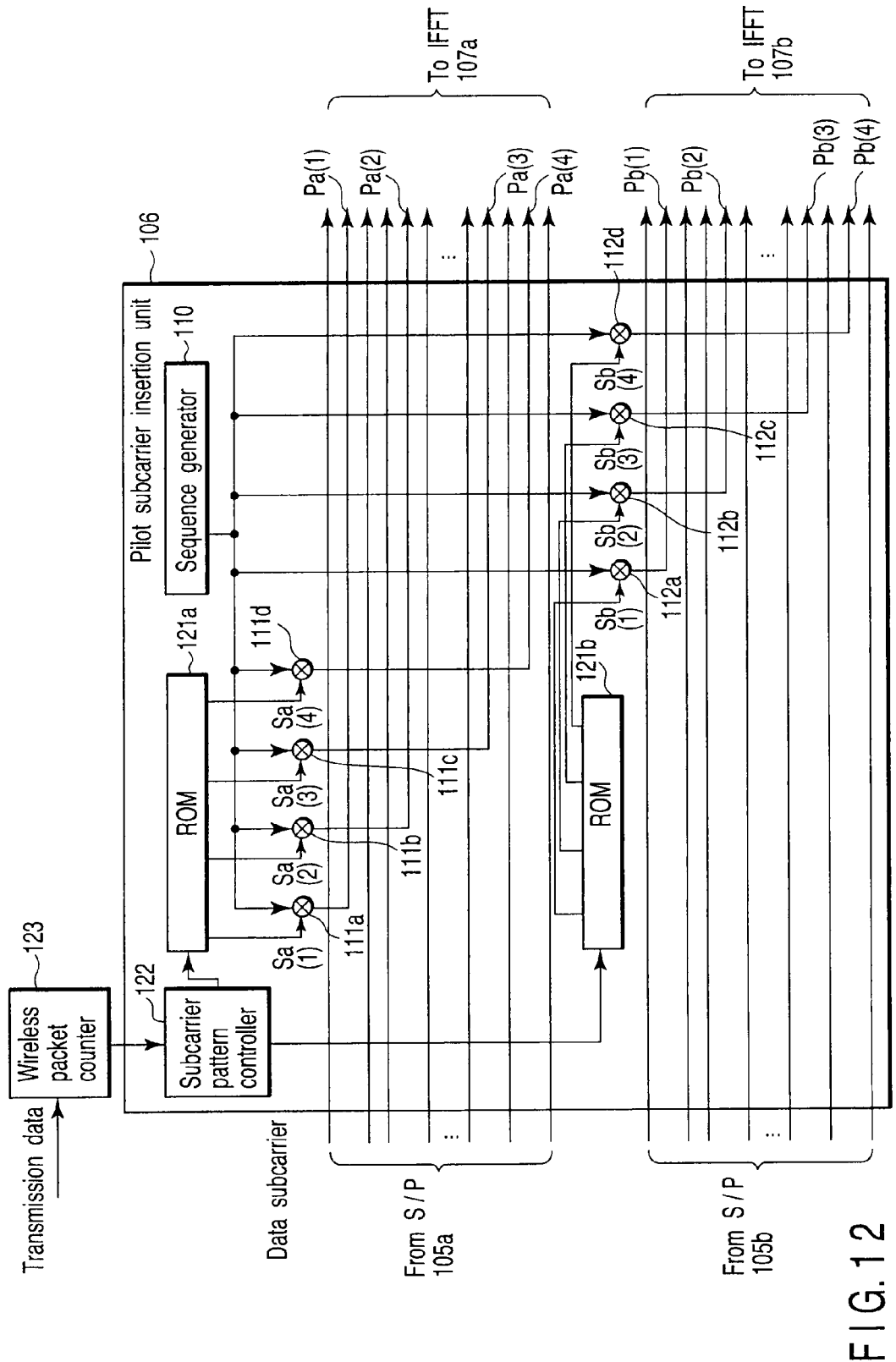
FIG. 12 is a block diagram of a pilot subcarrier insertion unit according to the second embodiment of the present invention.

A pilot subcarrier insertion unit 106 according to the second embodiment has ROMs 121a and 121b which store polarity data for first and second pilot subcarriers, and a subcarrier pattern controller 122, as shown in FIG. 12. As shown in FIG. 13, the ROMs 121a and 121b store three patterns (pattern A, pattern B, and pattern C) of polarity data representing polarities Sa(1) to Sa(4) of the first pilot subcarriers and polarity data representing polarities Sb(1) to Sb(4) of the second pilot subcarriers. Which polarity data of the pattern A, pattern B, and pattern C is to be read out from the ROMs 121a and 121b is determined by address data given to the ROMs 121a and 121b.

In the second embodiment, the polarities of the first and second pilot subcarriers transmitted from transmission antennas 101a and 101b are not fixed but change for each wireless packet. More specifically, polarity data of different patterns are read out from the ROMs 121a and 121b for each wireless packet and multiplied, by multipliers 111a to 111d and 112a to 112d, by a PN sequence generated by a PN sequence generator 110.

Figure 3:
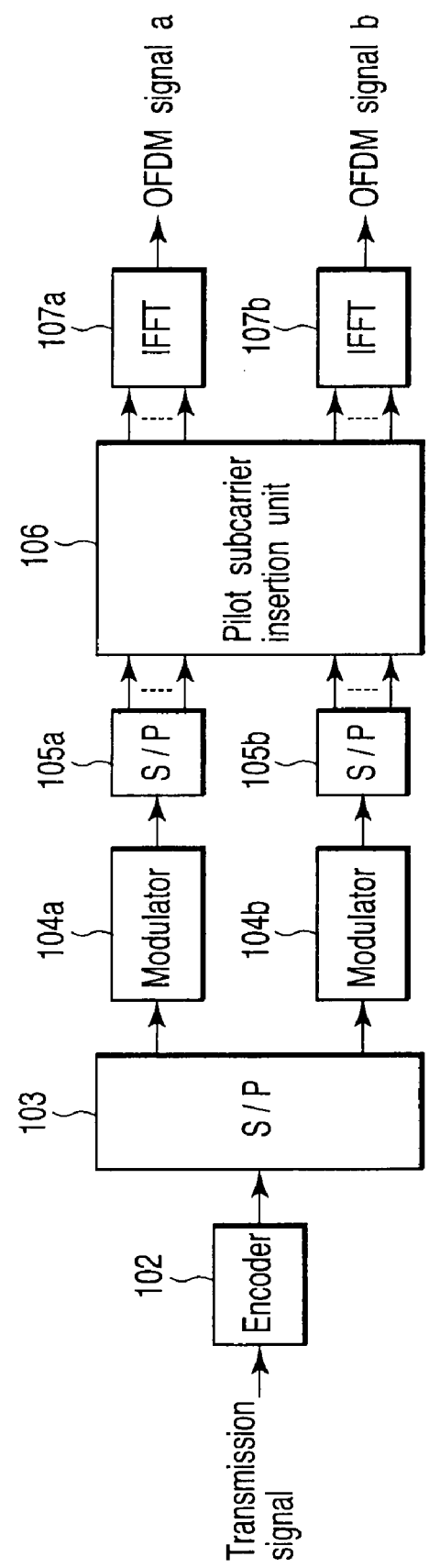
FIG. 3 is a block diagram of an OFDM signal transmission apparatus shown in FIG. 1.

A wireless packet counter 123 arranged outside the pilot subcarrier insertion unit 106 shown in FIG. 12 counts the number of wireless packets in transmission data input to an encoder 102 shown in FIG. 3 and transfers the count value to the subcarrier pattern controller 122. Every time the count value of the wireless packet counter 123 is incremented by one, the subcarrier pattern controller 122 changes address data to be given to the ROMs 121a and 121b. The subcarrier pattern controller 122 thus changes the patterns of the polarity data of the first and second pilot subcarriers, which are read out from the ROMs 121a and 121b.

For example, when a wireless packet is transmitted, the polarity data of the pattern A is read out. When the next wireless packet is transmitted, the polarity data of the pattern B is read out. When the third wireless packet is transmitted, the polarity data of the pattern C is read out. As a result, the polarity pattern of pilot subcarriers is changed for each wireless packet. Polarity data pattern change by the subcarrier pattern controller 122 is done, e.g., at random for each wireless packet.

The polarity data read out from the ROMs 121a and 121b are input to the multipliers 111a to 111d and multiplied by the PN sequence generated by the PN sequence generator 110 so that first and second pilot subcarriers are generated, as in the first embodiment. The generated first and second pilot subcarriers are inserted between first data subcarriers and between second data subcarriers, respectively, so that first and second subcarriers are generated.

When the first and second subcarriers are input to IFFT units 107a and 107b shown in FIG. 3, first and second OFDM signals are generated. The first and second OFDM signals are sent to the transmission antennas 101a and 101b through radio transmission units (not shown), as shown in FIG. 3, and transmitted from the transmission antennas 101a and 101b.

According to the second embodiment, the pattern of directional beams formed by the antennas 101a and 101b changes between transmission of pilot subcarriers controlled by, e.g., the polarity data of the pattern A and transmission of pilot subcarriers controlled by, e.g., the polarity data of the pattern B.

In an OFDM signal reception apparatus which is placed in a zone where the received power is low for the pilot subcarriers of, e.g., the pattern A, the probability that the received power of pilot subcarriers recovers is high when pilot subcarriers of the pattern B different from the pattern A are transmitted. Hence, when the pilot subcarrier pattern is changed for each wireless packet, the dead zone can be reduced.

The pattern of polarity data of pilot subcarriers need not always be changed at random. For example, of various patterns of polarity data of pilot subcarriers, a pattern which ensures a satisfactory reception performance may be stored in correspondence with each OFDM signal reception apparatus.

In this case, pilot subcarriers can be transmitted by using the pattern stored in correspondence with the OFDM signal reception apparatus at the transmission destination.

Third Embodiment

The third embodiment of the present invention will be described next. In the third embodiment, the polarity pattern of pilot subcarriers is changed only when an error has occurred in a preceding transmitted wireless packet, and the packet is for retransmission. As shown in FIG. 14, a pilot subcarrier insertion unit 106 according to the third embodiment is the same as the pilot subcarrier insertion unit 106 shown in FIG. 12 except that the wireless packet counter 123 in FIG. 12 is replaced with a retransmission detector 124.

As shown in FIG. 15, a wireless packet contains a unique word to be used for synchronization by an OFDM signal reception apparatus, a source address field to specify the transmission source address(the address of OFDM signal transmission apparatus), a destination address field to specify the transmission destination address(the address of OFDM signal reception apparatus), a retransmission field which indicates whether the wireless packet is a retransmission packet, and an error check field to determine whether an error has occurred in each field. A plurality of data symbols follow.

A transmission signal input to an encoder 102 shown in FIG. 3 is also input to the retransmission detector 124. The retransmission detector 124 analyzes the retransmission field in the transmission signal, i.e., wireless packet. If the wireless packet is a retransmission packet, the retransmission detector 124 notifies a subcarrier pattern controller 122 of it. Upon being notified that the wireless packet is a retransmission packet, the subcarrier pattern controller 122 changes address data to be given to ROMs 121a and 121b, thereby controlling the patterns of polarity data of first and second pilot subcarriers, which are read out from the ROMs 121a and 121b. As a result, a wireless packet containing pilot subcarriers of a polarity pattern different from that of pilot subcarriers of the preceding transmitted wireless packet is transmitted to the same transmission partner.

In the third embodiment, whether the wireless packet is a retransmission packet is determined by analyzing the retransmission field. Instead, an upper-level layer (medium access control (MAC) layer in the IEEE 802.11a standard) which executes wireless access control may directly notify the subcarrier pattern controller that the wireless packet is for a retransmission.

As described above, in the third embodiment, the retransmission packet is transmitted to the same transmission partner by using a polarity pattern different from that of the pilot subcarriers of the wireless packet preceding transmitted from an OFDM signal transmission apparatus 100. As a result, the pattern of directional beams formed by the plurality of transmission antennas changes in retransmission. Hence, the OFDM signal reception apparatus can correctly receive the retransmitted packet at a high probability.

Fourth Embodiment

Figure 16:
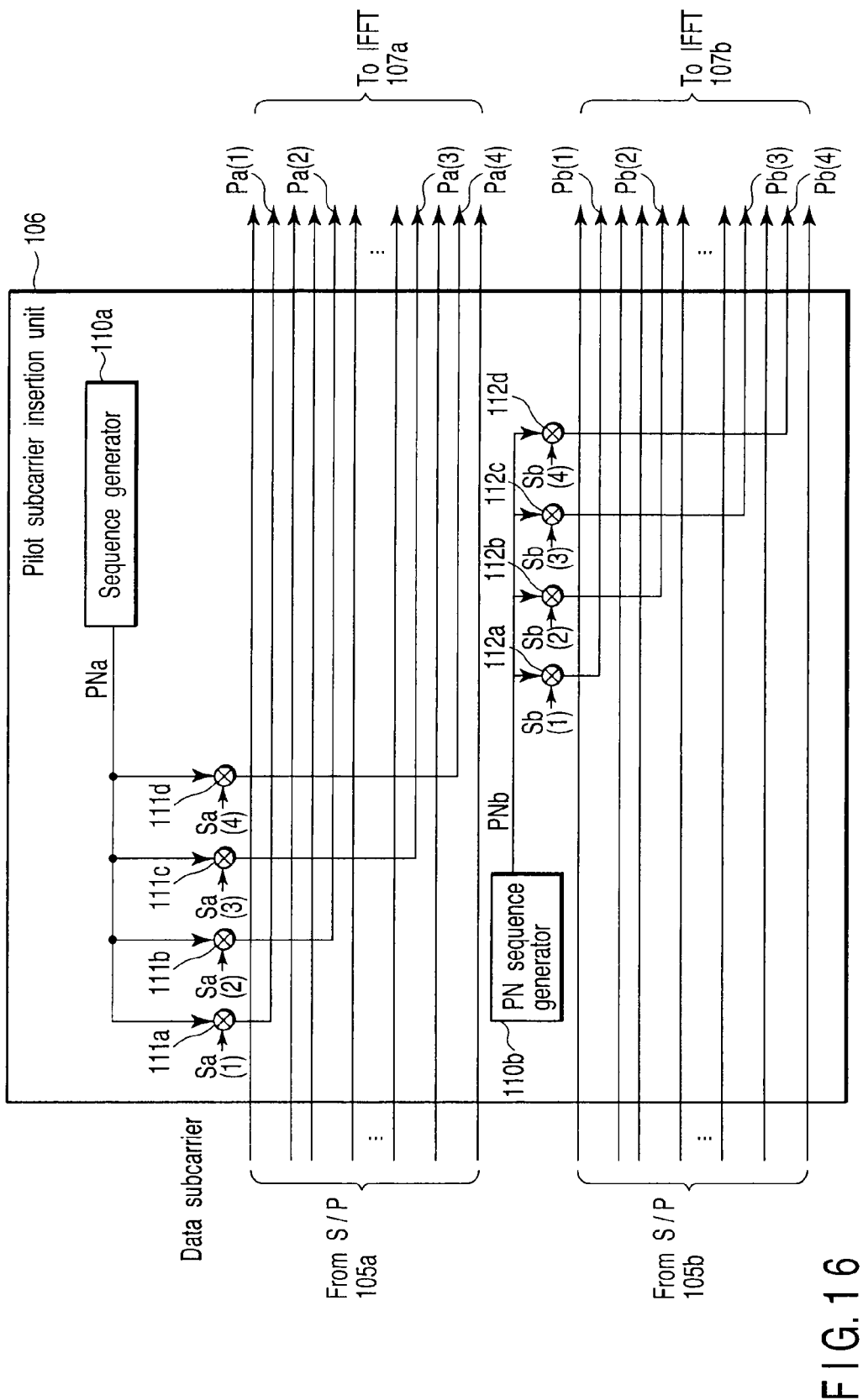
FIG. 16 is a block diagram of a pilot subcarrier insertion unit according to the fourth embodiment of the present invention.

A pilot subcarrier insertion unit 106 according the fourth embodiment of the present invention includes two PN sequence generators 110a and 110b, as shown in FIG. 16. The first PN sequence generator 110a generates a first PN sequence PNa which modulates first pilot subcarriers transmitted from a transmission antenna 101a. The second PN sequence generator 110b generates a second PN sequence PNb which modulates second pilot subcarriers transmitted from a transmission antenna 101b.

The polarity patterns of the first and second subcarriers may be either the same or different. A case in which the same polarity data S are used for the first and the second subcarriers, will be described here. The first pilot subcarriers are modulated as follows in accordance with the PN sequence PNa and pilot subcarrier polarity data S.

$$Pa(i,j)=PNa(i)\times S(j) \quad (15)$$

The second pilot subcarriers are modulated as follows in accordance with the PN sequence PNb and pilot subcarrier polarity data S.

$$Pb(i,j)=PNb(i)\times S(j) \quad (16)$$

FIGS. 17A and 17B show first and second OFDM signals containing data subcarriers and pilot subcarriers modulated in this way. The first and second OFDM signals are sent to IFFT units 107a and 107b and transmitted from the transmission antennas 101a and 101b, respectively.

Figure 5:
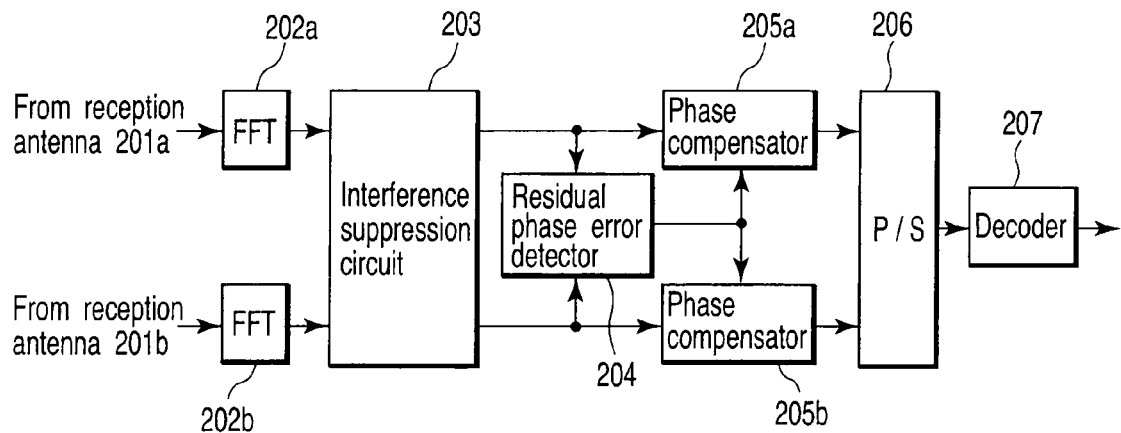
FIG. 5 is a block diagram of an OFDM signal reception apparatus shown in FIG. 1.

FIG. 18 shows the detection principle of a residual phase error detector 204 shown in FIG. 5 according to the fourth embodiment. A case in which the residual phase error is estimated before interference suppression will be described. When PN sequences of two values and pilot subcarriers of two values are transmitted from the two transmission antennas 101a and 101b, as in FIG. 6 of the first embodiment, 22=4 candidate reception signal points (1,1), (1,−1), (−1,1), and (−1,−1) are present. In the first embodiment, a combination of reception signal points (1,1) and (−1,−1), or (1,−1) and (−1,1) are present. In the fourth embodiment, all the four reception signal points can appear for each OFDM symbol because the pilot subcarriers transmitted from the transmission antennas 101a and 101b are modulated by different PN sequences.

In the fourth embodiment, for example, a case in which the combination of (1,−1) and (−1,1) is transmitted and a case in which the combination of (1,1) and (−1,−1) is transmitted can be considered. In the former combination, the phase difference between the signals from the transmission antennas 101a and 101b is 180°. In the latter combination, the phase difference is 0°. Since the directional beam of transmission changes between the transmission of the former combination and the transmission of the latter combination, the reception power changes. As described in the first embodiment, the four candidate reception signal points (1,−1), (−1,1), (1,1), and (−1,−1) can be obtained by combining the channel response from the transmission antennas to the reception antennas with the signals transmitted by the pilot subcarriers.

The residual phase error measuring method will be described next. Assume that the received symbol of a pilot subcarrier is (1,1). In this case, in the first embodiment, (1,1) is transmitted again as the next symbol, or (−1,−1) is transmitted. It looks on the receiving side as if a BPSK signal were received from a single antenna. Hence, the reception power does not change.

In the fourth embodiment, (−1,1) can also be transmitted as the next symbol. Hence, the received symbol containing a phase error can be "next symbol 1" or "next symbol 2" shown in FIG. 18. When the received signal point of the next symbol is (1,1) or (−1,−1), the residual phase error detector 204 detects a phase difference θ1 as the residual phase error. On the other hand, when the reception signal point of the next symbol is (−1,1) or (1,−1), the residual phase error detector 204 creates the replica of the reception signal (−1,1) from the current channel response value and detects a phase difference θ2 between (−1,1) and "next symbol 2" as the residual phase error.

Phase compensation units 205a and 205b multiplex the phase rotation for the reception signals in correspondence with the residual phase error, thereby compensating for the phase. The two received signals after phase compensation are converted into a serial signal by a serial-parallel converter 206 and decoded by a decoder 207 so that a reception signal corresponding to the transmission signal is obtained. In the fourth embodiment, the residual phase error is measured before interference suppression. The residual phase error can also be detected after interference suppression. In this case, a pilot subcarrier transmitted from a single antenna appears as the output after interference suppression. Hence, only two reception signal points appear.

As described above, according to the fourth embodiment, as shown in FIG. 17, the combination of (1,1) and (−1,−1) or combination of (1,−1) and (−1,1) is transmitted in each OFDM symbol. Hence, the reception power changes for each OFDM symbol. Even when the reception power of pilot subcarriers becomes low in a certain OFDM symbol, and the residual phase error cannot be detected correctly, the received power can recover in the next symbol and the phase error can be detected correctly. As a consequence, the dead zone where the received powers of all pilot subcarriers decrease can be eliminated.

Fifth Embodiment

Figure 19:
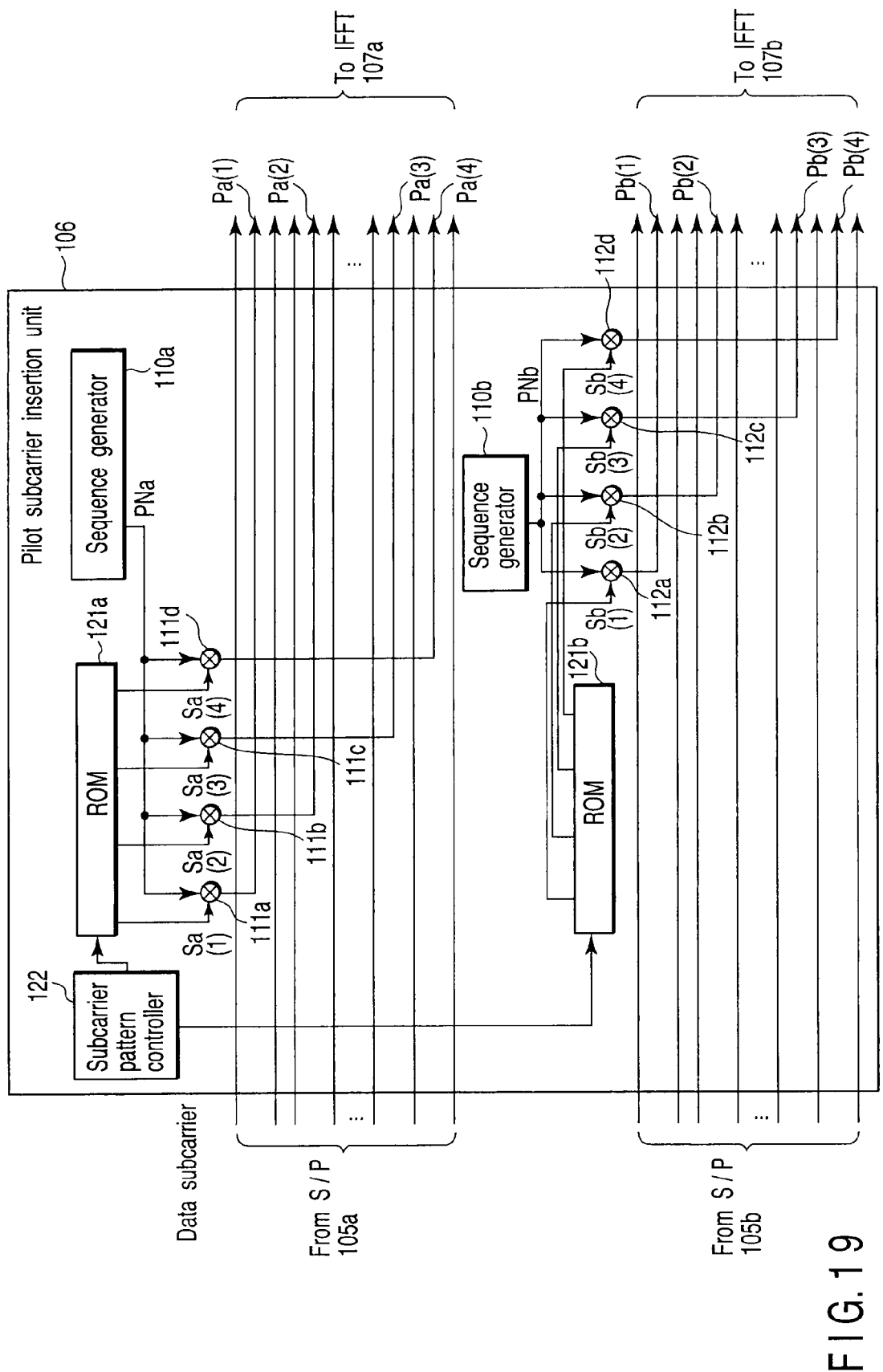
FIG. 19 is a block diagram of a pilot subcarrier insertion unit according to the fifth embodiment of the present invention.

As shown in FIG. 19, a pilot subcarrier insertion unit 106 according to the fifth embodiment of the present invention is formed by combining the second embodiment shown in FIG. 12 or the third embodiment shown in FIG. 14 and the fourth embodiment shown in FIG. 16. More specifically, in the fifth embodiment, the pilot subcarrier polarity changes between transmission antennas, and the PN sequence to modulate the pilot subcarrier changes between the transmission antennas. Hence, the baseband signals of pilot subcarriers corresponding to transmission antennas 101a and 101b are respectively given by $$Pa(i,j)=PNa(i) \times Sa(j) \quad (17)$$

$$Pb(i,j)=PNb(i) \times Sb(j) \quad (18)$$

Figure 20A:
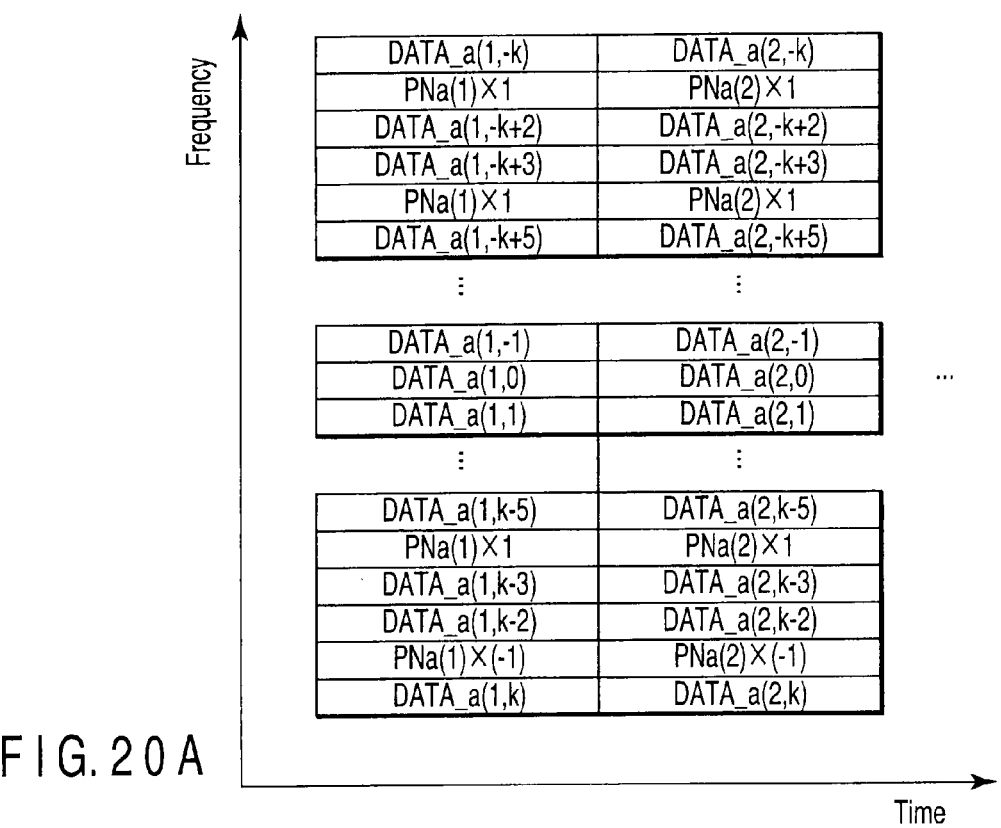
FIGS. 20A and 20B are views showing the subcarrier location in OFDM signals transmitted from two transmission antennas according to the fifth embodiment of the present invention.
Figure 20B:
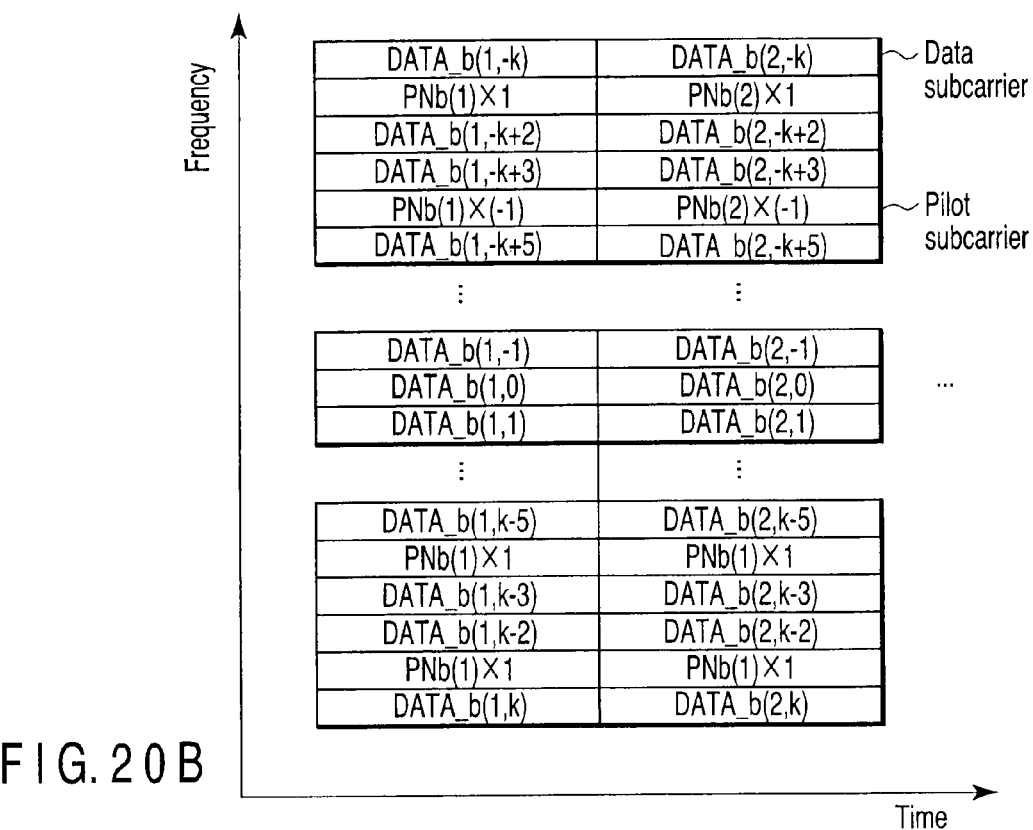

In this case, pilot subcarriers shown in FIGS. 20A and 20B are obtained. Directional beams formed by the transmission antennas 101a and 101b in correspondence with the pilot subcarriers are directed in different directions for each frequency and also in different directions along the symbol in the time domain or OFDM symbols. Hence, even when the reception level of pilot subcarriers is low at a certain frequency or time, the pilot subcarriers can be received at another frequency or OFDM symbol so that the dead zone can be reduced.

Sixth Embodiment

Figure 21:
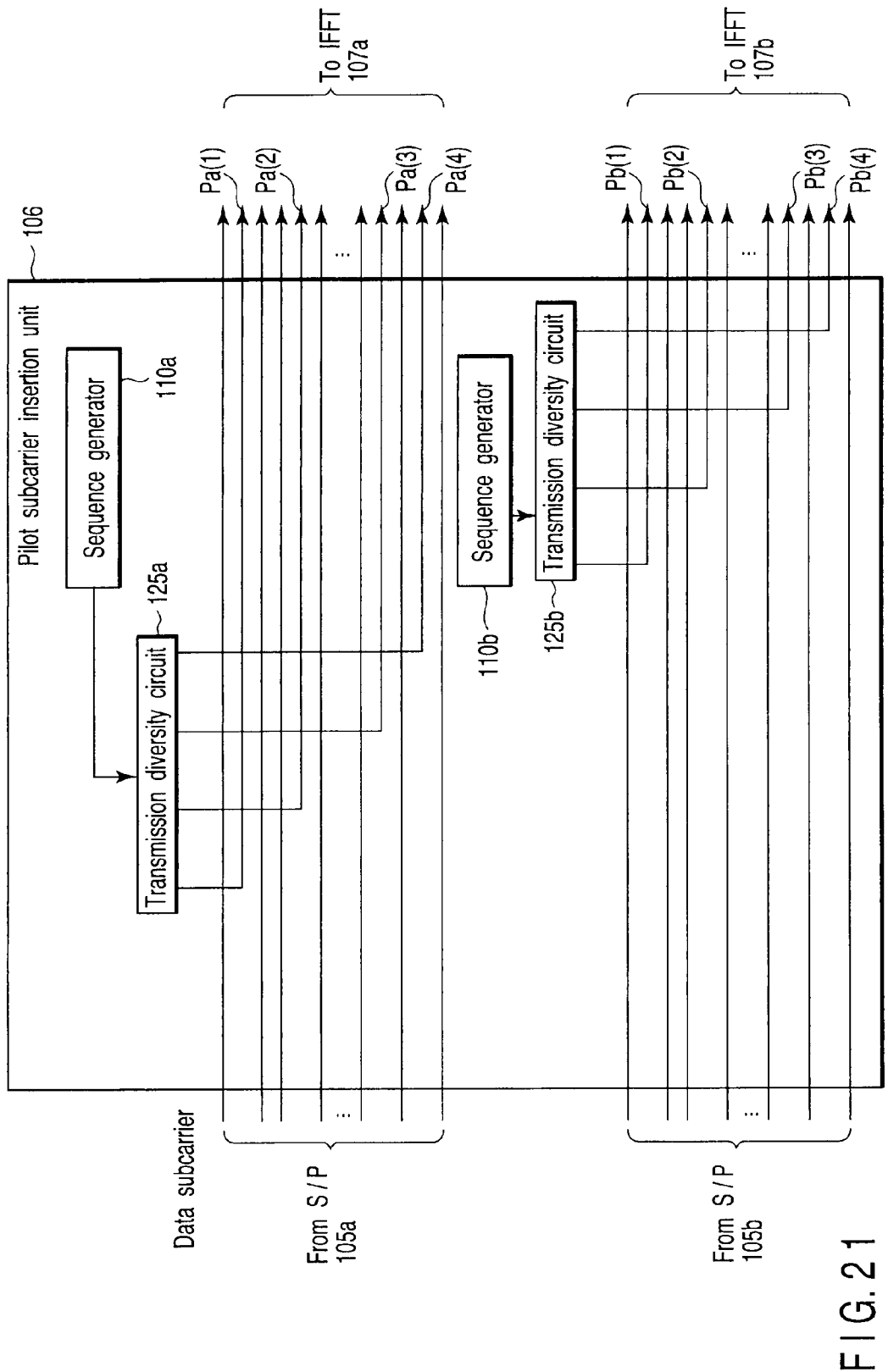
FIG. 21 is a block diagram of a pilot subcarrier insertion unit according to the sixth embodiment of the present invention.

In a pilot subcarrier insertion unit 106 according to the sixth embodiment of the present invention, as shown in FIG. 21, PN sequences from PN sequence generators 110a and 110b are input to transmission diversity circuits 125a and 125b so that pilot subcarriers are transmitted as $$Pa(2i-1,j)=PN(2i-1) \quad (19)$$

$$Pa(2i,j)=-PN(2i)^* \quad (20)$$

$$Pb(2i-1,j)=PN(2i) \quad (21)$$

$$Pb(2i,j)=-PN(2i-1) \quad (22)$$

where * is the complex conjugate. As indicated by equations (19) to (22), the PN sequences are transmitted by using transmission diversity using two transmission antennas 101a and 101b and two symbols. The transmission diversity method represented by equations (19) to (22) is the same as that disclosed in U.S. Pat. No. 6,185,258B1.

Figure 22A:
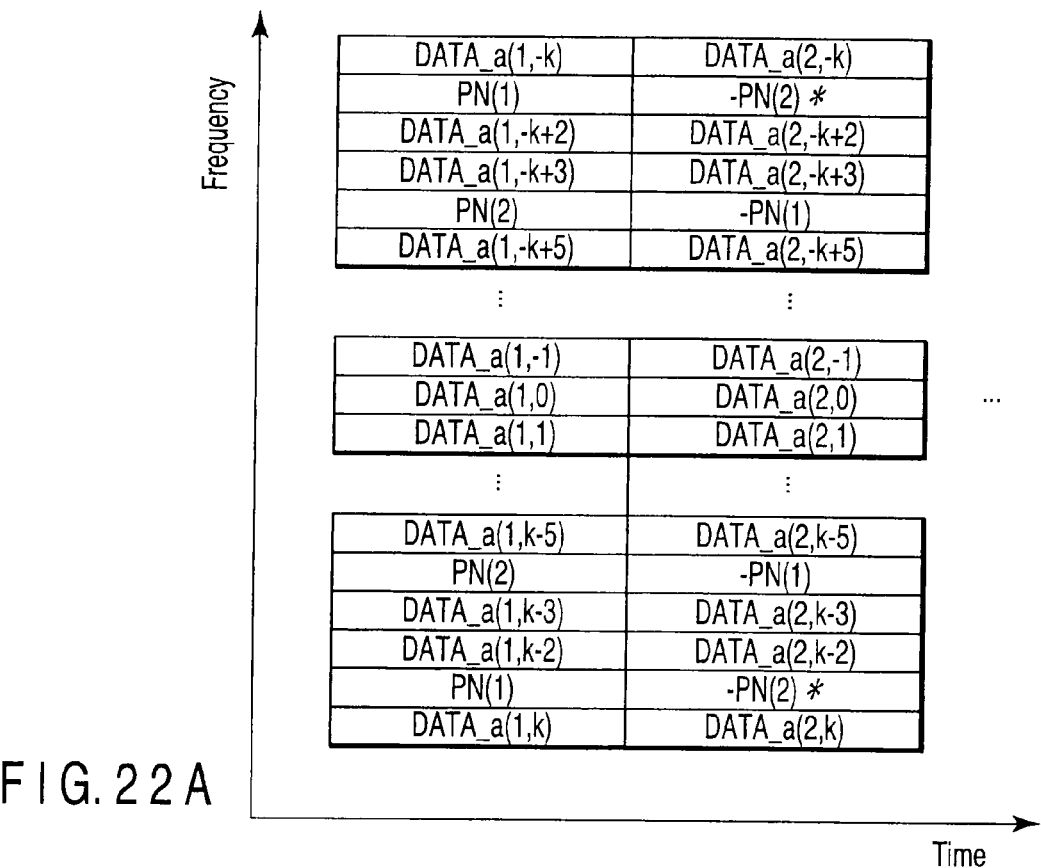
FIGS. 22A and 22B are views showing the subcarrier location in OFDM signals transmitted from two transmission antennas according to the sixth embodiment of the present invention.
Figure 22B:
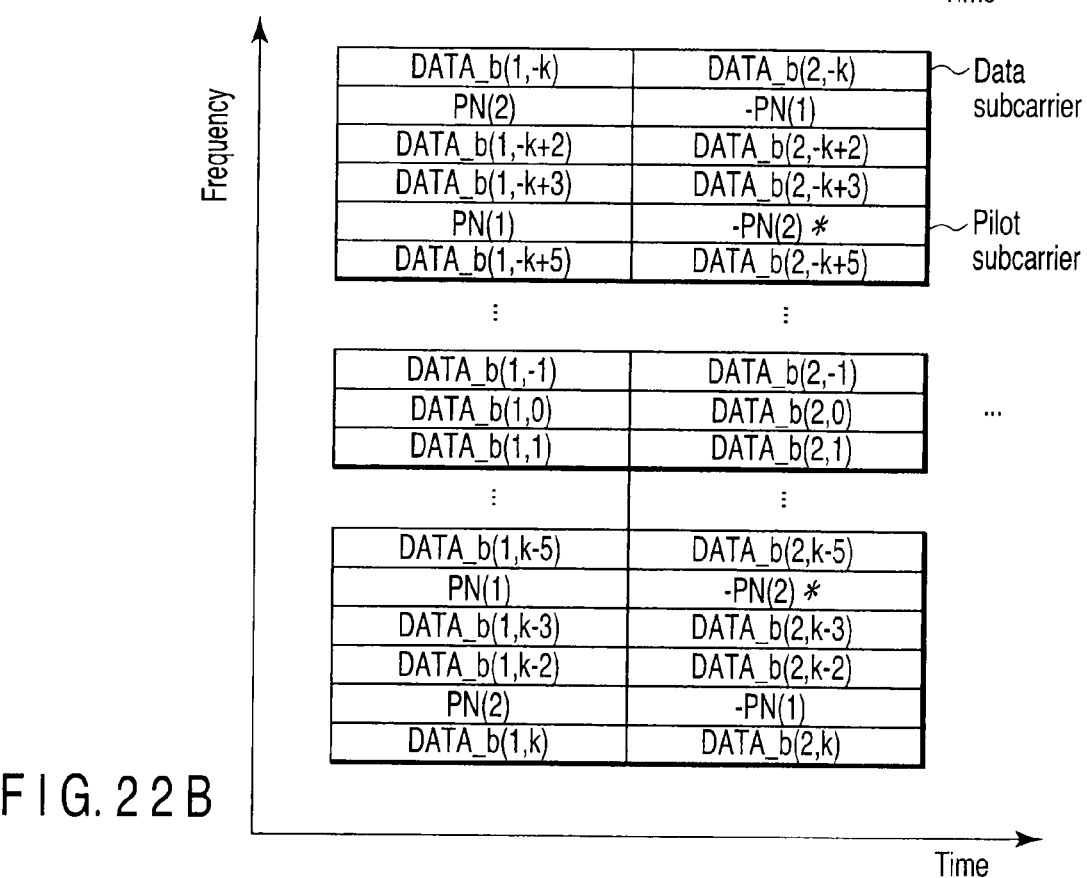

The detailed pilot subcarrier signals given by equations (19) to (22) are applied to the (−k+1)th subcarrier and (k−4)th subcarrier shown in FIGS. 22A and 22B. Equations (19) to (22) indicate the jth pilot subcarrier. For another subcarrier, the transmission method can be changed. More specifically, this can be expressed by $$Pa(2i-1,j)=PN(2i) \quad (23)$$

$$Pa(2i,j)=-PN(2i-1) \quad (24)$$

$$Pb(2i-1,j)=PN(2i-1) \quad (25)$$

$$Pb(2i,j)=-PN(2i)^* \quad (26)$$

The detailed pilot subcarriers given by equations (23) to (26) are applied to the (−k+4)th subcarrier and (k−1)th subcarrier shown in FIGS. 22A and 22B. In a residual phase error detector 204 in an OFDM signal reception apparatus shown in FIG. 5, for example, when decoding corresponding to transmission diversity is executed by using a decoding method disclosed in U.S. Pat. No. 6,185,258B1, the Signal to Noise ratio of the pilot subcarriers can be maximized.

Figure 23A:
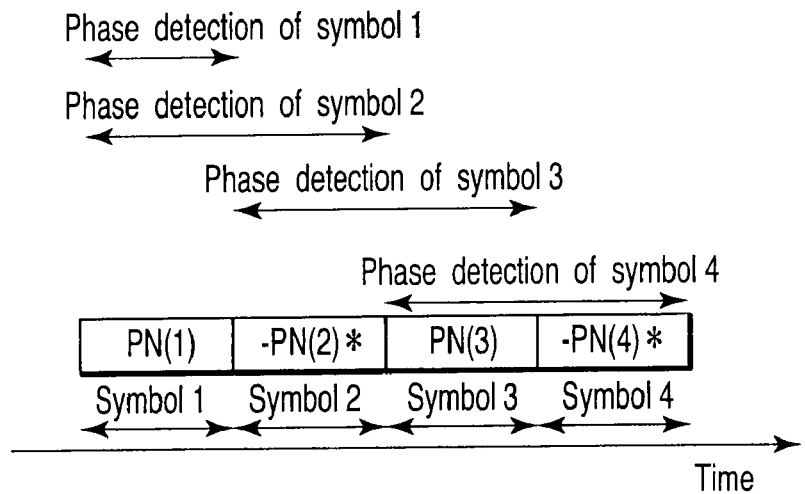
FIGS. 23A and 23B are views for explaining the residual phase error detection principle according to the sixth embodiment of the present invention.
Figure 23B:
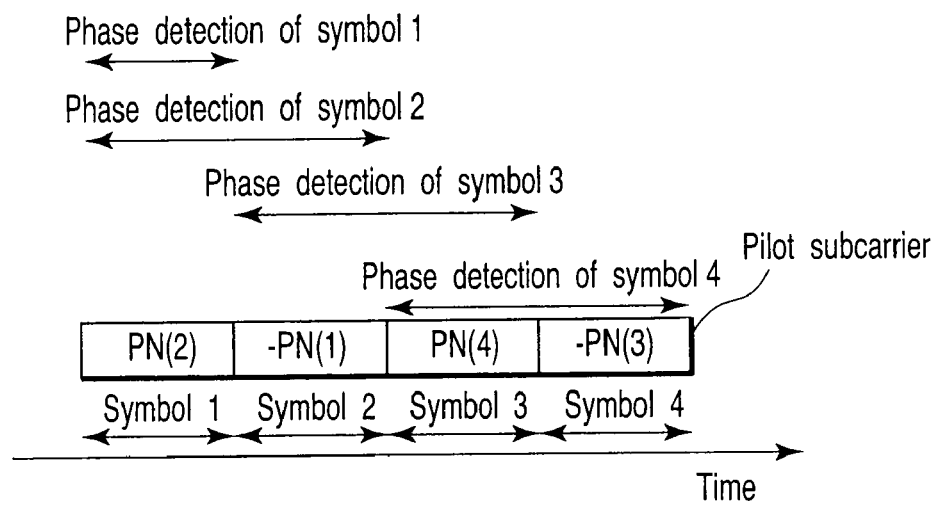

As is apparent from equations (19) to (26), in this embodiment, transmission diversity is executed by using a two-OFDM symbol duration. No diversity gain is obtained when only one symbol is received. FIGS. 23A and 23B show signals obtained by modulating the (−k+4)th subcarrier by using equations (23) to (26). As shown in FIGS. 23A and 23B, in symbol 1, the residual phase error is detected by the received signal of only one symbol. From the second symbol, since the preceding received symbol can be used, the residual phase error of symbol 2 can be detected by using the received signals of symbols 1 and 2. Similarly, the residual phase error of symbol 3 can be detected by using the received signals of symbols 2 and 3. That is, the phase error can be detected by making two consecutive symbols. All residual phase errors can also be detected by using only a single symbol which is currently received.

As described above, according to the sixth embodiment, pilot subcarriers are transmitted by using transmission diversity. Hence, the residual phase error can accurately be detected, and the performance at the receiver can be improved.

Seventh Embodiment

Figure 24:
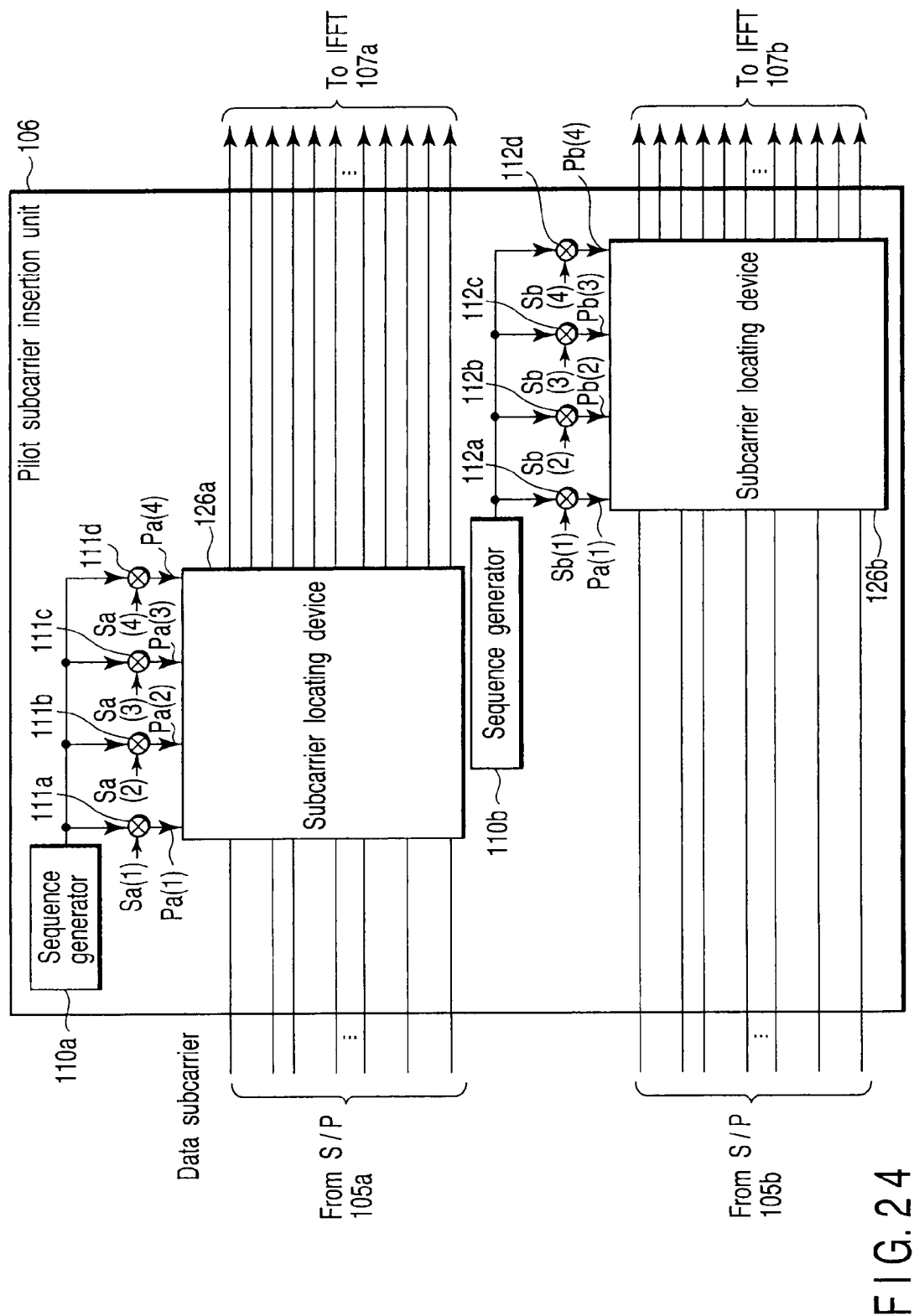
FIG. 24 is a block diagram of a pilot subcarrier insertion unit according to the seventh embodiment of the present invention.

A pilot subcarrier insertion unit 106 according to the seventh embodiment of the present invention includes subcarrier locating devices 126a and 126b to make the locations of pilot subcarriers and data subcarriers change between transmission antennas 101a and 101b, as shown in FIG. 24. The subcarrier locating devices 126a and 126b make the locations of pilot subcarriers and data subcarriers change between the transmission antennas. The pilot subcarrier insertion unit 106 will be described next in detail with reference to FIG. 24.

Modulated signals for the transmission antenna 101a, which are obtained by multiplying a PN sequence by polarities Sa(1) to Sa(4), are input to the subcarrier locating device 126a as pilot subcarriers Pa(1) to Pa(4). The subcarrier locating device 126a rearranges the data subcarriers and pilot subcarriers and inputs them to an IFFT unit 107a. The processing of signals for the transmission antenna 101b is also the same, and a description thereof will be omitted.

Figure 25A:
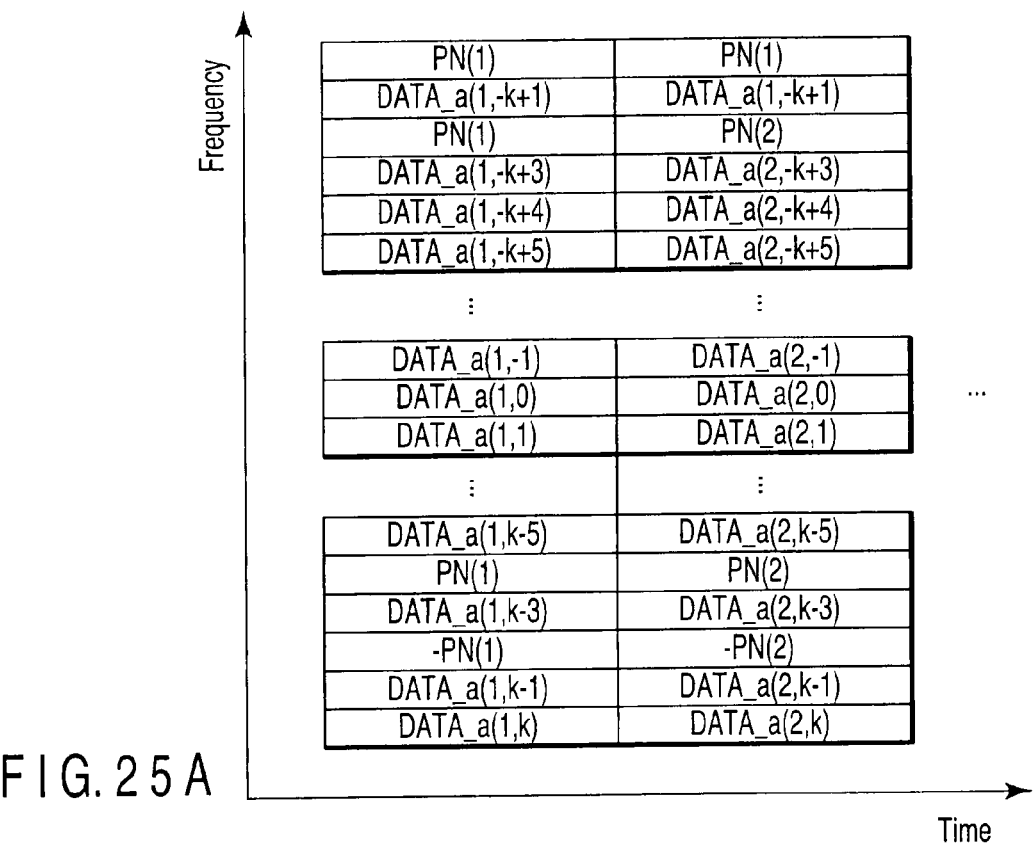
FIGS. 25A and 25B are views showing the subcarrier location in OFDM signals transmitted from two transmission antennas according to the seventh embodiment of the present invention.
Figure 25B:
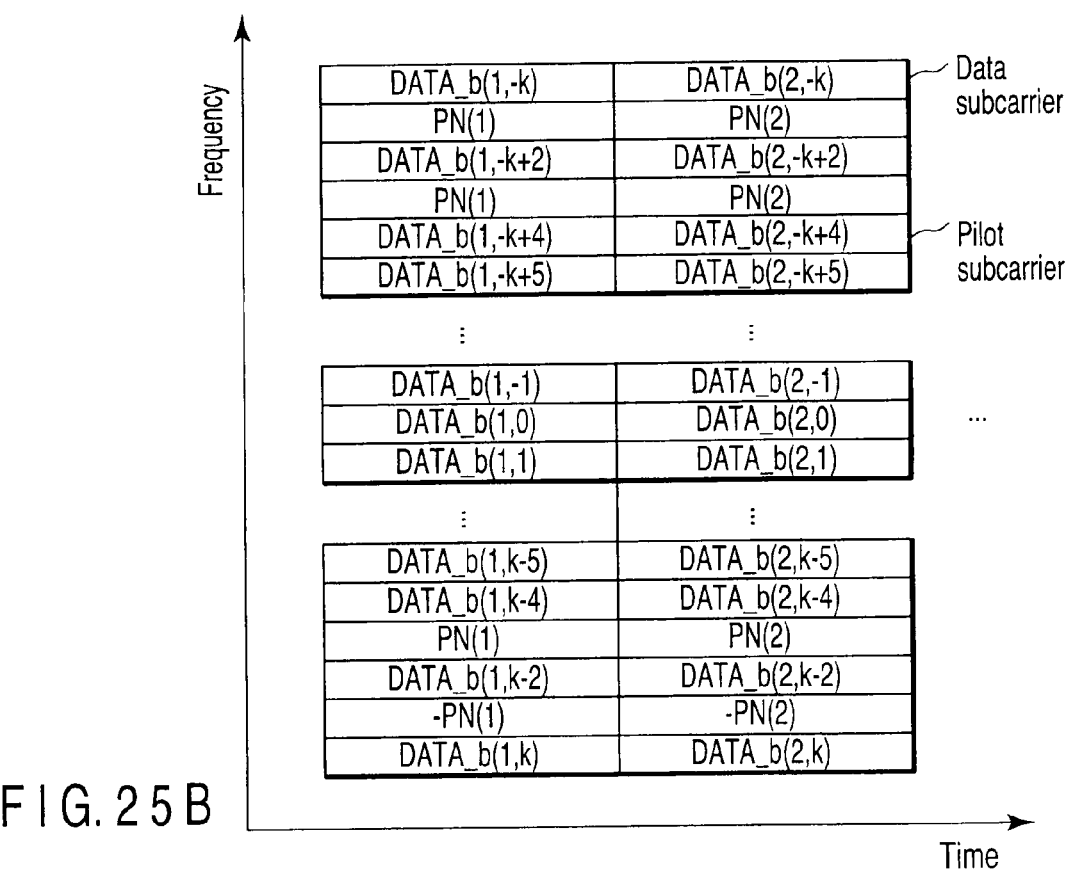

FIGS. 25A and 25B show the subcarrier location in the seventh embodiment. As shown in FIGS. 25A and 25B, of the subcarriers, the pilot subcarriers are transmitted from only a single transmission antenna. Pilot subcarriers PN(1) modulated by the PN sequence are transmitted from the transmission antenna 101a as the −kth subcarriers. Data subcarriers (DATA) are transmitted from the transmission antenna 101b. For the (−k+2)th subcarrier as well, pilot subcarriers are transmitted from the transmission antenna 101a, and the data subcarriers (DATA) are transmitted from the transmission antenna 101b.

Since data signals can be assumed to be random, the correlation between the first data subcarriers transmitted from the transmission antenna 101a and the second data subcarriers transmitted from the transmission antenna 101b is generally low. For this reason, the phase difference between the subcarriers transmitted from the transmission antenna 101a and those transmitted from the transmission antenna 101b changes between the −kth subcarrier and the (−k+2)th subcarrier. Hence, the directional beam of the pilot subcarrier transmitted by the kth subcarrier is different from the directional beam of the pilot subcarrier transmitted by the (−k+2)th subcarrier at a high probability.

According to the seventh embodiment, since the probability that the reception powers of all the pilot subcarriers decrease simultaneously due to the influence of null points is very low, no dead zone is formed. In addition, even when the power of pilot subcarriers happens to be low in one symbol interval, the data signal changes at a high probability between the current symbol and the next symbol. Hence, the reception power of the pilot subcarriers can recover in the next symbol at a high probability. As described above, according to the seventh embodiment, the pilot subcarrier reception probability can be increased, and the dead zone can be reduced.

The pilot subcarrier location can also be changed in wireless packets. In, e.g., the IEEE 802.11a standard, a pilot signal to estimate the channel response of all subcarriers is inserted in the unique word shown in FIG. 15. On the basis of the pilot signal, the channel response represented by equation (1) can be obtained. In the data symbol, the pilot signal is transmitted by using only the pilot subcarrier. For this reason, if the temporal variation in the channel is fast, tracking of the channel response is difficult. However, when the pilot subcarrier location is changed between wireless packets, and the pilot signal is also transmitted from other subcarriers, tracking of the channel responses of other subcarriers can be executed. Hence, when this system is used, accurate reception is possible. In the seventh embodiment, the polarities of pilot subcarriers are the same. However, the same setting as in the first to sixth embodiment can also be employed.

Eighth Embodiment

Figure 26:
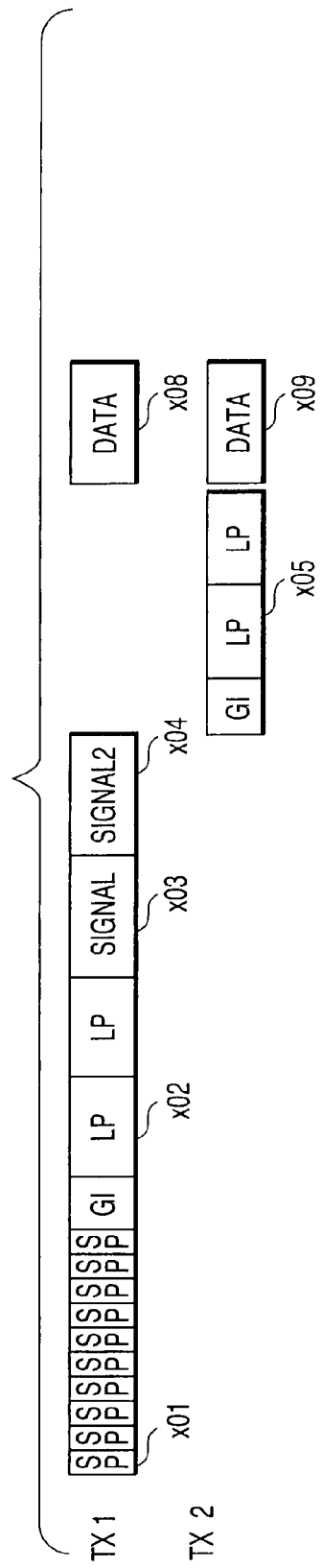
FIG. 26 is a view showing an example of a wireless communication preamble signal.

According to the present invention, compensation of the residual phase error can accurately be executed even when a wireless packet containing both a portion to transmit data from a single antenna and a portion to transmit data from a plurality of antennas is received. According to a wireless communication preamble signal system proposed in Jan Boer et al, "Backwards Compatibility", IEEE 802.11-03/714r0, as shown in FIG. 26, short preamble sequences x01 to be used for time synchronization, frequency synchronization, and AGC, long preamble sequences x02 for channel response estimation, and a first signal field x03 including fields representing the modulation method and length of the wireless packet are transmitted from one transmission antenna 101a. Subsequently, a second signal field x04 to be used in IEEE 802.11n is transmitted. The number of transmission antennas to be multiplexed and the multiplexing method are described in the second signal field. Next, long preamble sequences x05 for channel response estimation are sequentially transmitted from a transmission antenna 101b. After the preamble signals are transmitted, transmission data x08 and x09 are transmitted simultaneously from the plurality of transmission antennas 101a and 101b.

Figure 27:
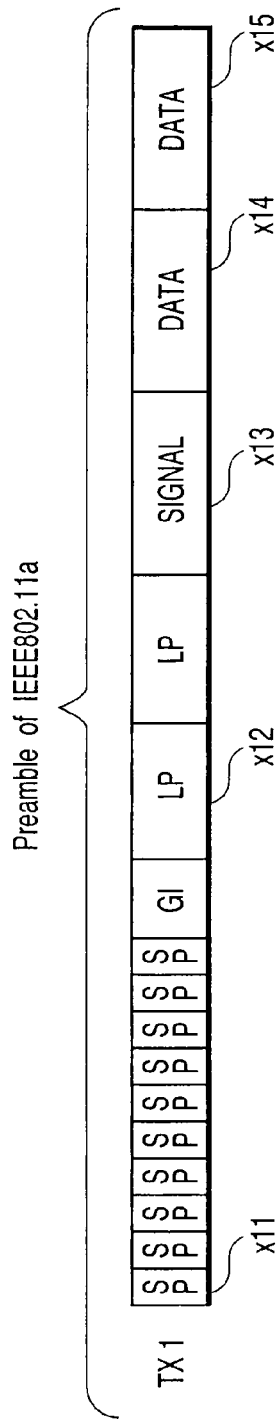
FIG. 27 is a view showing a wireless communication preamble signal based on the IEEE 802.11a standard.

The wireless communication preamble signal shown in FIG. 26 is the same as a wireless communication preamble signal based on the IEEE 802.11a standard shown in FIG. 27, which is based on transmission from the transmission antenna 101a from the short preamble x01 to the first signal field x03. With this arrangement, wireless reception apparatus based on the IEEE 802.11a standard, which has received the preamble signal shown in FIG. 26, can recognize the received packet as a wireless packet based on the IEEE 802.11a standard. Hence, the preamble signal shown in FIG. 26 allows IEEE 802.11n which simultaneously transmits different data from a plurality of antennas on one radio device to coexist with the IEEE 802.11a standard which transmits data from a single antenna.

In the IEEE 802.11a wireless packet shown in FIG. 27, pilot subcarriers are inserted from the SIGNAL field. On the basis of the pilot subcarriers, compensation of the residual phase error can be executed. When the present invention is applied to the wireless packet shown in FIG. 26, pilot subcarriers are inserted in the SIGNAL field and SIGNAL2 field. Pilot subcarriers are also located in the DATA portions x08 and x09. From the transmission data x08 and x09, the pilot subcarriers described in the first to seventh embodiments of the present invention are located. In the eighth embodiment, a case in which the pilot subcarriers are transmitted by using the first embodiment will be described.

Figure 28:
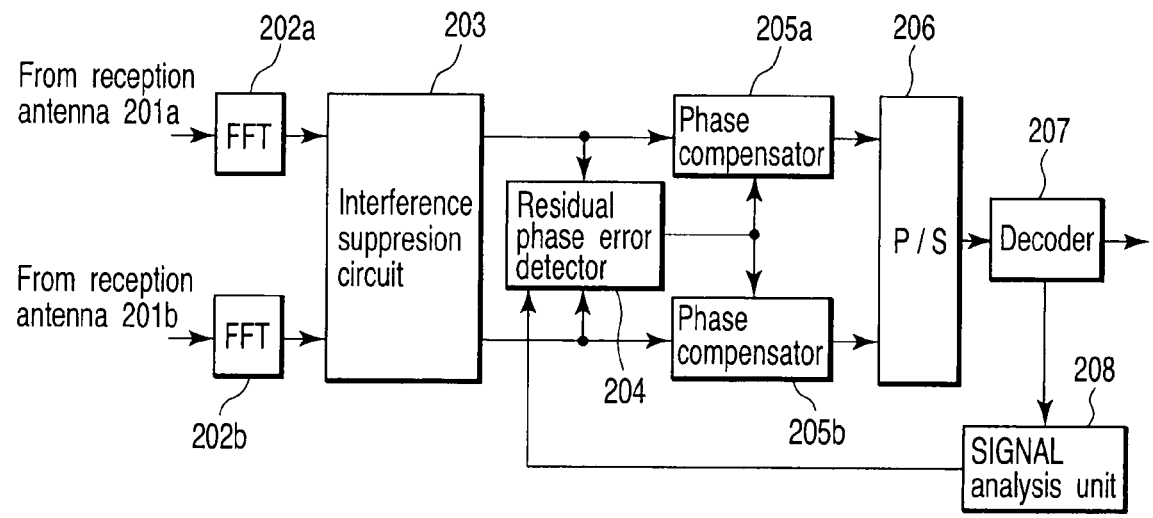
FIG. 28 is a block diagram of an OFDM signal reception apparatus which receives the wireless packet shown in FIG. 26.

Detailed control in receiving the wireless packet shown in FIG. 26 will be described with reference to FIG. 28. FIG. 28 shows a reception apparatus which receives the wireless packet shown in FIG. 26. FIG. 28 is different from FIG. 5 in that the output from a decoder 207 is input to a SIGNAL analysis unit 208, and a residual phase error detector 204 is controlled on the basis of the result from the SIGNAL analysis unit 208.

The receiver which has received the short preamble x01 detects the start of the long preamble sequence x02 by using an AGC and time synchronization means (not shown) to detect an FFT window Simultaneously, estimation and compensation of the frequency offset are done. The receiver which has received the long preamble sequence x02 measures the channel responses of all subcarriers by using known pilot subcarriers. Especially, the channel response of a pilot subcarrier is transferred to the residual phase error detector 204. The above processing can be implemented by a known technique, and a description thereof will be omitted.

Next, the SIGNAL field x03 is received. The SIGNAL field is subjected to FFT by FFT units 202a and 202b. The FFT output is input to an interference suppression circuit. However, since the SIGNAL field is output from a single antenna, interference suppression need not be performed. Hence, the processing executed by the interference suppression circuit is processing for multiplying a unit matrix or processing for weighting and combining the outputs from the FFT units 202a and 202b to increase the Signal to Noise ratio. The output from the interference suppression circuit is input to the residual phase error detector 204.

Figure 29:
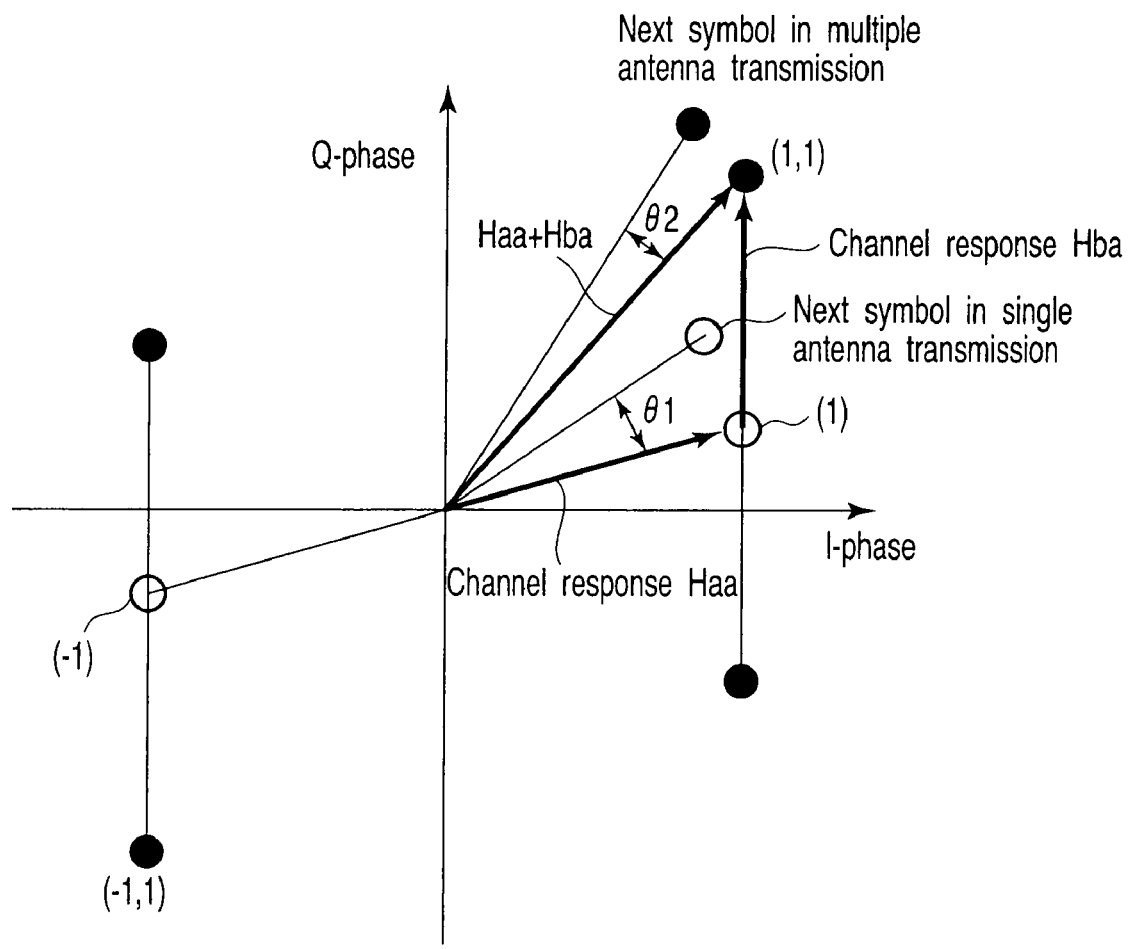
FIG. 29 is a view for explaining processing executed by a residual phase error detector according to the eighth embodiment of the present invention.

FIG. 29 is a view showing the concept of processing executed by the residual phase error detector according to the eighth embodiment. Assume that the channel response when a long preamble which is transmitted from the transmission antenna 101*a* and received by a reception antenna 201*a* is received is Haa shown in FIG. 29. When a pilot subcarrier is transmitted by BPSK, the received signal point of the pilot subcarrier received by the data portion can take is a point (1) or (−1) shown in FIG. 29. On the basis of this point as a reference, a residual phase error is detected.

When the received point of the pilot subcarrier of the SIGNAL portion is "next symbol in single antenna transmission" shown in FIG. 29, the residual phase error detector measures, as the residual phase error, a phase difference θ1 between the point (1) and the point of "next symbol in single antenna transmission". The phase compensator corrects the residual phase error. In receiving the SIGNAL2 portion, the residual phase error can be detected in the same way.

The demodulator 207 demodulates the SIGNAL2 portion and transfers the decoding result to the SIGNAL analysis unit 208. The SIGNAL analysis unit 208 analyzes the second signal field, analyzes the number of multiplexed transmission antennas, and the information that there will be a transmission from plurality of antennas after the long preamble. The SIGNAL analysis unit 208 transfers the analyzed result to the residual phase error detector 204.

Next, the receiver receives the long preamble from the transmission antenna 101*b* and measures the channel response from the transmission antenna 101*b*. A case in which the DATA portions x08 and x09 are received will be described next. In the following description, signals from the two transmission antennas 101*a* and 101*b* are multiplexed in the DATA portions, and the multiplexed pilot subcarriers have polarities represented by equations (4) and (5). As described above, the number of multiplexed transmission antennas can be recognized by the signal from the SIGNAL analysis unit 208.

Of the four pilot subcarriers, pilot subcarriers having the leftmost polarities in equations (4) and (5) will be focused. The polarities of pilot subcarriers transmitted by this frequency are Sa(1)=1 and Sb(1)=1. When the channel response from the transmission antenna 101*a* to the reception antenna 201*a* is Haa, and the channel response from the transmission antenna 101*b* to the reception antenna 201*a* is Hba, the channel response value of a pilot subcarrier received by the DATA portion is Haa+Hba shown in FIG. 29. The residual phase error detector obtains a reference point by using the combined channel response value Haa+Hba on the basis of the measured channel response value Haa+Hba and the information from the SIGNAL analysis unit 208 and detects a shift from the reference point.

More specifically, since the pilot subcarriers are transmitted by BPSK signals modulated by a PN sequence, the points (1,1) and (−1,−1) shown in FIG. 29 are received. That is, when a single antenna is received, the residual phase error can be detected on the basis of the points (1) and (−1) in FIG. 29. When the operation switches to transmission from the plurality of antennas, i.e., transmission of x08 or x09, the residual phase error must be detected on the basis of the points (1,1) and (−1,−1).

As described above, the operation of the residual phase error detector 204 must be switched between single antenna transmission and multiple antenna transmission. In the eighth embodiment, this operation is implemented by analyzing the second signal field x04 (SIGNAL2) shown in FIG. 26. In the second signal field, the number of signals multiplexed on the transmitting side or the multiplexing method is described. Hence, when the second signal field is analyzed the reference point of the channel response value can be obtained. In addition, switching between the reference point when a transmission signal from a single antenna is received and that when signals transmitted from a plurality of antennas are received can be done. For this reason, the reference signal point can appropriately be switched according to the case whether a signal from a single antenna is received or signals from a plurality of antennas are received. In either case, the residual phase error can appropriately be detected and compensated when the wireless packet both contains the pilot subcarriers from a single antenna and the pilot subcarriers from a polarity of antennas, i.e., the wireless packet both contains the packet based on IEEE 802.11a and IEEE 802.11n. In this embodiment, x01, x02, x03, x04 are assumed to be transmitted from single antenna, it can be transmitted from a plurality of antenna by using cyclic delayed transmission diversity. The procedure of the phase compensation is the same as written in this embodiment and it works.

Ninth Embodiment

In the above embodiments, OFDM signal transmission apparatuses which transmit different signals in correspondence with transmission antennas. However, the present invention can also be applied to an OFDM signal transmission apparatus using a transmission method of transmitting different signals in correspondence with a plurality of transmission beams.

Figure 31:
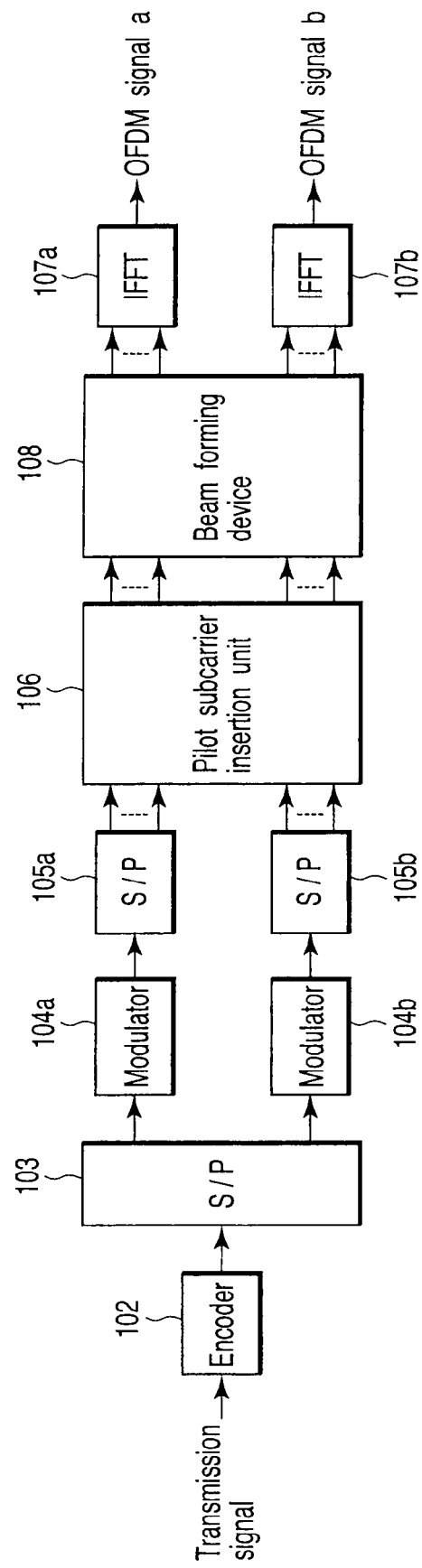
FIG. 31 is a block diagram of an OFDM signal transmission apparatus according to the ninth embodiment of the present invention.

FIG. 31 shows an OFDM transmission apparatus according to the ninth embodiment of the present invention, which transmits different signals in correspondence with a plurality of transmission beams. Referring to FIG. 31, an encoder 102, serial-parallel converter 103, modulators 104*a* and 104*b*, serial-parallel converters 105*a* and 105*b*, and pilot subcarrier insertion unit 106 are the same as in the first to eighth embodiments, and a description thereof will be omitted.

According to the ninth embodiment, subcarriers obtained by inserting pilot subcarriers between data subcarriers by the pilot subcarrier insertion unit 106 are input to a beam forming device 108. The beam forming device 108 weights and combines the outputs from the serial-parallel converter 105*a* and the outputs from the serial-parallel converter 105*b* and outputs the signals to IFFT units 107*a* and 107*b*. The outputs after IFFT are output from transmission antennas 101*a* and 101*b*.

The beam forming device 108 is a device which executes processing for forming (beam forming) a plurality of transmission beams. The beam forming device 108 can be implemented by using a known technique. Referring to FIG. 31, the beam forming device 108 is inserted before the IFFT units 107*a* and 107*b*. The beam forming device 108 may be inserted after the IFFT units 107*a* and 107*b*.

Known beam forming schemes are roughly classified into two shames. In the first beam forming mode, the channel response between a radio transmission apparatus and a radio reception apparatus is completely known. A beam forming weight is calculated in accordance with the channel response in order to steer the beam toward the reception apparatus. In the second beam forming mode, the channel response is not completely known and a predetermined beam forming weight is used. Therefore, the beam may not be steered toward the reception apparatus. John Ketchum et al have described the Eigenvector steering (ES) scheme as one of the first beam forming schemes and the Spatial spreading (SS) scheme as one of the second beam forming schemes in reference "ftp://ieee:wireless@ftp.802wirelessworld.com/11/04/11-04-0870-00-000n-802-11-ht-system-description-and-operating-principles.doc." According to a description in the reference by John Ketchum et al, the diversity effect can be obtained by using beam forming.

The beam forming device 108 has, e.g., the ES scheme and SS scheme to cope with the first beam forming scheme and second beam forming scheme. For data subcarriers, beam forming can effectively be done by using either the ES scheme or SS scheme, as described by John Ketchum et al. On the other hand, for pilot subcarriers, beam forming by the method instructed by John Ketchum et al is not preferable. This is because the pilot subcarriers are known information on the receiving side and must always correctly be received on the receiving side.

Pilot subcarrier forming methods using the ES scheme and SS scheme will be described next.

In the ES scheme, the channel response between a radio transmission apparatus and a radio reception apparatus is measured, and the transmission beam is directed in the direction of the radio reception apparatus, as described in p. 10 of the reference by John Ketchum et al. Since the pilot signal arrives at the radio reception apparatus regardless of pilot subcarriers generated by the pilot subcarrier insertion unit 106, no dead zone is formed. Hence when a beam should be formed by using the ES scheme, the same setting as in the first to eighth embodiment is done for the polarities of pilot subcarriers. On the other hand, the SS scheme is a beam forming scheme when the channel response is not completely known and the predetermined value is used as a beam forming weight. Hence, it cannot guarantee that the pilot subcarriers should always arrive at the radio reception apparatus.

Pilot subcarriers when the number of transmission antennas is 4 is represented by a matrix P.

$$P = \begin{bmatrix} 1 & 1 & 1 & -1 \\ 1 & -j & -1 & -j \\ 1 & -1 & 1 & 1 \\ 1 & j & -1 & j \end{bmatrix}$$

The number of columns of the matrix P equals the number of pilot subcarriers on the frequency axis. The first row of the matrix P represents the polarity of the first pilot subcarrier transmitted from each antenna. The number of rows of the matrix P equals the number of input ports of the beam forming device 108. That is, the matrix P represents FIG. 11B. A beam forming matrix Q using a Walsh matrix described in the reference by John Ketchum et al is given by $$Q = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

The number of columns of the matrix Q equals the number of input ports of the beam forming device 108, i.e., the number of transmission beams. The number of rows of the matrix P equals the number of transmission antennas. The i-th row of the matrix Q represents the weight corresponding to the i-th transmission beam (in this case, i=1, 2, 3, 4). The beam forming device 108 multiplies the matrix P by the matrix Q to obtain a matrix QP given by $$QP = \begin{bmatrix} 4 & 0 & 0 & 0 \\ 0 & 0 & 4 & 0 \\ 0 & 2-2j & 0 & -2-2j \\ 0 & 2+2j & 0 & -2+2j \end{bmatrix}$$

The number of columns of the matrix QP equals the number of pilot subcarriers on the frequency axis. The number of rows of the matrix QP equals the number of transmission antennas. For example, the first column of the matrix QP will be focused. This corresponds to transmitting a pilot with a power of "16" (i.e., amplitude is 4) from only the first transmission antenna. The second column of the matrix QP will be focused. This corresponds to transmitting pilot signals with a power of "8" (i.e., amplitude is root 8) from only the third and fourth transmission antennas. As described above, especially for the first pilot subcarrier, it will be transmitted with high power only from the first transmission antenna. Regarding the second pilot subcarrier, a pilot signal is transmitted only from the third and fourth transmission antennas. As a result, the transmission power varies in the frequency band of the OFDM signal. As a result, the problems pointed out in the prior art, i.e., composite triple beat and an increase in dynamic range of the transmission signal occur.

More specifically, when beam forming based on the SS scheme is applied to pilot subcarriers, the orthogonality of the pilot subcarriers is damaged. For certain pilot subcarriers, some transmission antennas transmit no pilot signals. Hence, the space diversity effect decreases.

In the ninth embodiment, when the beam forming device 108 uses beam forming based on the SS scheme, the SS scheme is used for data subcarriers, as described in the reference by John Ketchum et al. However, no beam forming is executed for pilot subcarriers. More specifically, for pilot subcarriers, the matrix Q should be the identify matrix Q' as follows.

$$Q' = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

The first row of the matrix Q' represents the weight corresponding to the i-th transmission beam (in this case, i=1, 2, 3, 4). In this case, since the matrix P directly appears in the matrix Q'P, pilot signals are transmitted by pilot subcarriers which are orthogonal to each other on the frequency axis and spatial axis.

When SS scheme is used, cyclic delayed diversity (CDD) is applied to the transmission signal from each antenna, respectively. Specifically, the transmission signal from the first transmission antenna is generated to the transmission signal from the second transmission antenna by 50 nsec cyclic shifting. Since the CDD scheme is described in the reference by John Ketchum et al, explanation is omitted.

As described above, in the ninth embodiment, when beam forming is executed in accordance with the second beam forming mode and, for example, the SS scheme without using channel response information, pilot signals are transmitted without applying beam forming to pilot subcarriers. As a result, pilot signal transmission from only a single antenna can be prevented, and any increase in dynamic range of the transmission signal can be prevented. In addition, any dead zone on the receiving side can be prevented by the space diversity effect.

In the above-mentioned description, beam forming not applied to the pilot subcarrier in the second beam formation mode (multiplied by the identify matrix). However, for example, when beam forming matrix Q' which multiplied to matrix P with the beam formation device 107 is assumed given by $$Q' = \begin{bmatrix} 4 & 0 & 0 & 0 \\ 0 & 0 & 2+2j & -2+2j \\ 0 & 4 & 0 & 0 \\ 0 & 0 & -2+2j & 2+2j \end{bmatrix}$$

Matrix Q'P given by $$Q = \begin{bmatrix} 1 & 1 & 1 & -1 \\ 1 & -1 & 1 & 1 \\ 1 & 1 & -1 & 1 \\ 1 & -1 & -1 & 1 \end{bmatrix}$$

From each antenna, the pilot subcarrier which orthogonal to each other on the frequency axis and the space axis is transmitted so that matrix Q'P may show. This is a polarity pattern of the pilot subcarrier shown in FIG. 11A. As a result, it is avoided that the pilot signal is transmitted only from single antenna and the dynamic range of a transmission signal is expanded.

Thus, in the second mode that is the mode which is not based on the channel response but forms the transmission beam, by making the wait of the transmission beam to the data subcarrier, and the wait of the transmission beam to the pilot subcarrier into a different value. It is avoided that a pilot signal inclines and is transmitted from single antenna, and since the pilot subcarrier which are orthogonal to each other on the frequency axis and the space axis is transmitted from each antenna, it is avoidable that the dead zone is generated in the receiving side.

In this embodiment, the polarity pattern of pilot subcarriers is fixed in a wireless packet for the descriptive convenience. Even when the polarity pattern is changed in a wireless packet, i.e., for each OFDM symbol, the effect of the present invention can be obtained. As shown in FIG. 12, the radio transmitter stores a plurality of polarity patterns in the ROM. A counter which counts the number of OFDM symbols is arranged in place of the radio packet counter. The polarity pattern of pilot subcarriers may be changed by selecting one of the plurality of polarity patterns for each antenna in accordance with the counter.

10th Embodiment

The 10th embodiment of the present invention will be described next. This embodiment is different from the first to ninth embodiments in that the polarity of a pilot subcarrier changes for each OFDM symbol, and the frequency of the pilot subcarrier, i.e., the position of the pilot subcarrier periodically changes. When the position of a pilot subcarrier periodically changes, the channels of all subcarriers can be estimated during the data portions.

Figure 32:
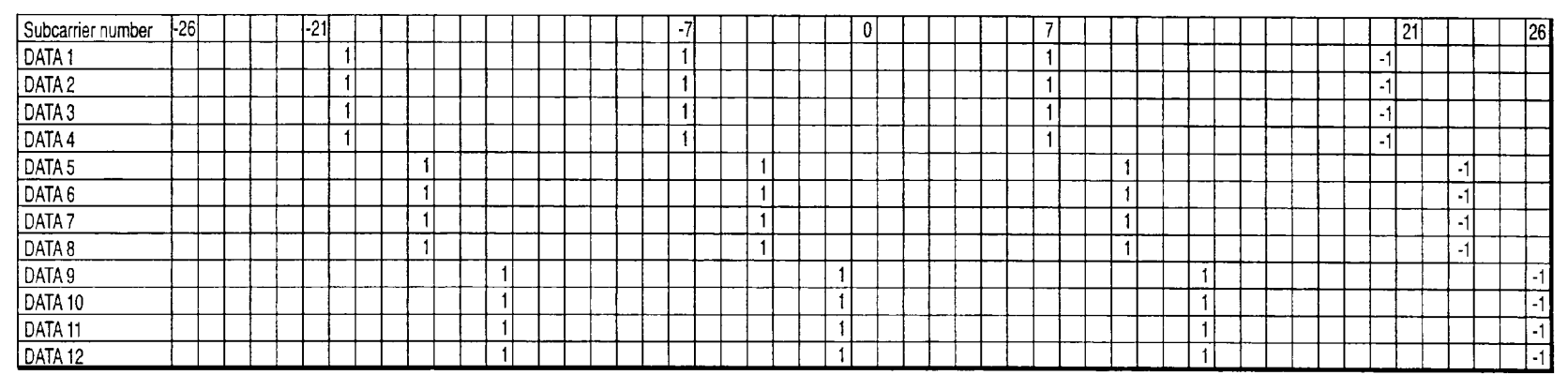
Figure 33:
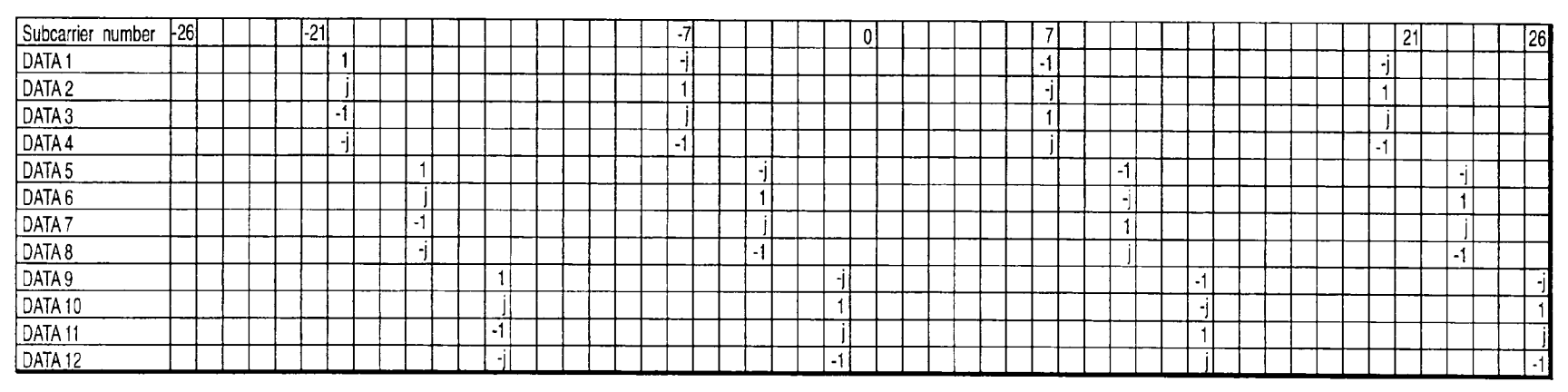
Figure 35:
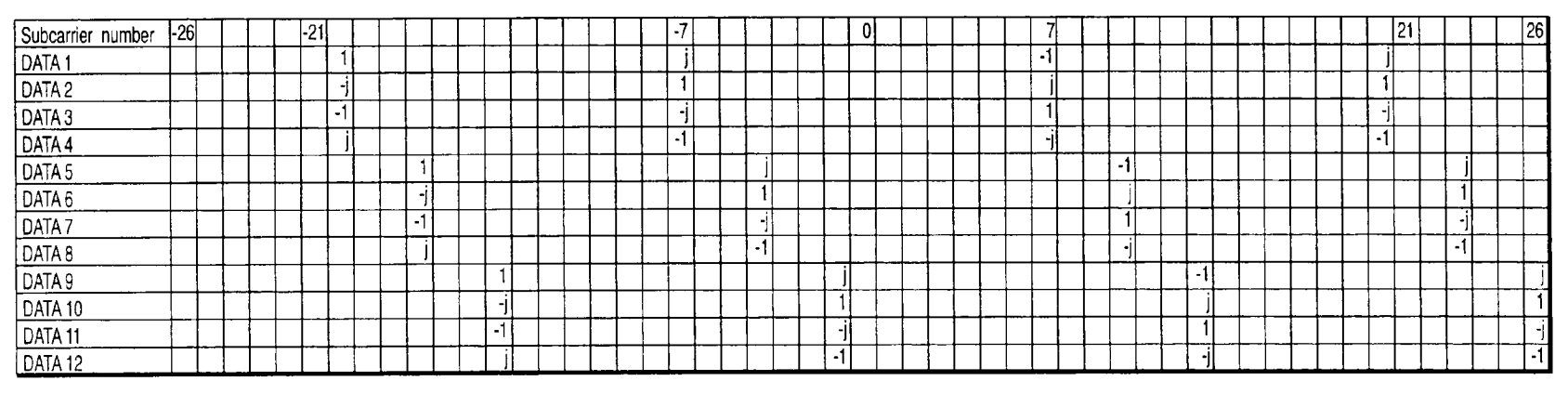

FIGS. 32 to 35 show a pilot subcarrier location according to this embodiment when the number of transmission antennas is four. FIG. 32 shows the pilot subcarrier location in an OFDM signal transmitted from the first transmission antenna. Similarly, FIGS. 33, 34, and 35 shows the pilot subcarrier locations in OFDM signals transmitted from the second, third, and fourth transmission antennas, respectively. Referring to FIGS. 32 to 35, the abscissa represents subcarrier numbers (−26 to 26 in this example), i.e., the frequencies (positions) of subcarriers. The ordinate represents OFDM symbol numbers (DATA1 to DATA12 in this example). Pilot subcarriers are located in cells except blank cells. Symbols in cells indicate the polarities of the pilot subcarriers. No PN sequence is illustrated in FIGS. 32 to 35. A description of data subcarriers is not illustrated, either.

In this embodiment, the pilot subcarriers are orthogonal to each other in a plurality of unit times between transmission antennas. In the example shown in FIGS. 32 to 35, one OFDM symbol time is defined as a unit time. The pilot subcarriers are orthogonal to each other between the four transmission antennas in a 4-OFDM-symbol interval. The frequencies (positions) of pilot subcarriers change at a period corresponding to an integer multiple of the plurality of unit times and, for example, at a period corresponding to four OFDM symbols.

By using the same description as in equation (9), the polarity of each pilot subcarrier shown in FIGS. 32 to 35 is given by $$Sp_{pos(i,t),k,t} = \exp\left(\frac{j\pi}{2}(k-1)i\right) \times P_{rot}(i,t) \quad (27)$$

where $Sp_{pos(i,t),k,t}$ indicates that the $(Sp_{pos(i,t)})$th subcarrier is used as a pilot subcarrier, k is the transmission antenna number, and t is the OFDM symbol number. In equation (27), the right-hand member of equation (9) is multiplied by polarity data $P_{rot}(i,t)$ given by $$P_{rot}(i,t) = \exp\left(\frac{j\pi}{2}(t-1)i\right) \quad (28)$$

where $P_{pos}(i,t)$ is a conversion function to convert the subcarrier number from the pilot subcarrier number i and OFDM symbol number t. More specifically, $P_{pos}(i,t)$ can be expressed by $$P_{pos}(i,t) = \begin{cases} -20 & \text{for } i=0 \\ -7 & \text{for } i=1 \\ +7 & \text{for } i=2 \\ +20 & \text{for } i=3 \end{cases} \quad 1 \leq t \leq 4 \quad (29)$$

$$P_{pos}(i,t) = \begin{cases} -17 & \text{for } i=0 \\ -4 & \text{for } i=1 \\ +10 & \text{for } i=2 \\ +23 & \text{for } i=3 \end{cases} \quad 5 \leq t \leq 8$$

$$P_{pos}(i,t) = \begin{cases} -14 & \text{for } i=0 \\ -1 & \text{for } i=1 \\ +13 & \text{for } i=2 \\ +26 & \text{for } i=3 \end{cases} \quad 9 \leq t \leq 12$$

FIG. 36 shows the value of the polarity data $P_{rot}(i,t)$ obtained by substituting the transmission antenna number k and OFDM symbol number t into equation (28). As is apparent from FIG. 36, equation (28) has a periodicity for the OFDM symbol number t. In this embodiment, the period is 4-OFDM-symbol interval. More specifically, the polarity data $P_{rot}(i,t)$ has the same values when t=1 and t=5.

As is apparent from equation (29), the position (frequency) of the pilot subcarrier changes in accordance with the period of equation (28). For example, in subcarriers transmitted from the first to fourth transmission antennas, first, pilot subcarriers are located at positions corresponding to the subcarrier numbers of −20, −7, +7, and +20 in the first 4-OFDM-symbol interval (interval from DATA1 to DATA4) where t=1 to 4.

For example, the pilot subcarriers located at the subcarrier number of −20 will be focused. The polarities of pilot subcarriers transmitted from the first transmission antenna are "1, 1, 1, 1". The polarities of pilot subcarriers transmitted from the second transmission antenna are "1, j, −1, j". The polarities of pilot subcarriers transmitted from the third transmission antenna are "1, −1, 1, −1". The polarities of pilot subcarriers transmitted from the fourth transmission antenna are "1, j, −1, j". The pilot subcarriers transmitted from the first to fourth transmission antennas are orthogonal to each other in the 4-OFDM-symbol interval. This also applies to the pilot subcarriers located at the remaining subcarrier numbers of −7, +7, and +20. The pilot subcarriers are orthogonal to each other in the 4-OFDM-symbol interval.

In the next 4-OFDM-symbol interval (interval from DATA5 to DATA8) where t=5 to 8, the pilot subcarriers at the subcarrier numbers of −17, −4, +10, and +23 are transmitted. The polarities of the pilot subcarriers transmitted from the first to fourth transmission antennas are the same as in the first 4-OFDM-symbol interval where t=1 to 4 so that the pilot subcarriers are orthogonal to each other.

As shown in FIGS. 32 to 35 and equation (27), the pilot subcarriers are orthogonal to each other even on the frequency axis. For example, the pilot subcarriers shown in FIG. 33, which are transmitted from the second transmission antenna, will be focused. In the first 4-OFDM-symbol interval (interval from DATA1 to DATA4) where t=1 to 4, the polarities of the pilot subcarriers located at the subcarrier number −20 are "1, j, −1, −j". The polarities of the pilot subcarriers located at the subcarrier number −7 are "−j, 1, j, −1". The polarities of the pilot subcarriers located at the subcarrier number +7 are "−1, −j, 1, j". The polarities of the pilot subcarriers located at the subcarrier number +20 are "−j, 1, j, −1". The pilot subcarriers are orthogonal to each other.

The period of equation (28) need not always equal the change period of the pilot subcarrier position indicated by equation (29). The period of equation (29) only needs to be an integer multiple of the period of equation (28). Equation (29) is generated from Fourier coefficients. They only need to be sequences orthogonal with respect to the time axis t. FIG. 37 shows another example of polarity data $P_{pos}(k)$ when real numbers are used.

A pilot subcarrier insertion unit 106 according to this embodiment will be described next with reference to FIG. 38. The overall arrangement of the OFDM signal transmission apparatus including the pilot subcarrier insertion unit 106 is the same as in FIG. 3, and a description thereof will be omitted. In the pilot subcarrier insertion unit 106 shown in FIG. 38, transmission data from serial-parallel converters 105a and 105b in FIG. 3 are input to subcarrier locating devices 126a and 126b, respectively.

First pilot subcarriers generated by causing multiplying units 111a to 111d to obtain the products between a PN sequence from a PN sequence generator 110 and polarity data Sa(j) of the first pilot subcarriers, which are stored in a ROM 121a, are input to the subcarrier locating device 126a. Similarly, second pilot subcarriers generated by causing multiplying units 112a to 112d to obtain the products between the PN sequence from the PN sequence generator 110 and polarity data Sb(j) of the second pilot subcarriers, which are stored in a ROM 121b, are input to the subcarrier locating device 126b. $P_{rot}(i,t)$ represented by equations (27) to (29) are stored in the ROMs 121a and 121b as the polarity data Sa(j) and Sb(j).

The processing for changing the polarities or positions of pilot subcarriers for each OFDM symbol is executed in the following manner. In transmitting DATA1, a counter 131 counts a clock signal 130 of the OFDM symbol period and recognizes that it is time to transmit DATA1. The counter 131 outputs, to a subcarrier locating controller 132 and pilot pattern controller 133, instructions to control the subcarrier locating and pilot pattern for DATA1. In transmitting DATA2, the counter 131 recognizes by the clock signal 130 that it is time to transmit DATA2. The counter 131 outputs, to the subcarrier locating controller 132 and pilot pattern controller 133, instructions to control the subcarrier locating and pilot pattern for DATA2. More specifically, the pilot pattern controller 133 reads out values according to equations (27) and (28) from the ROMs 121a and 121b. The subcarrier locating controller 132 inserts pilot subcarriers at positions according to equation (29). In this way, the pilot subcarriers shown in FIGS. 32 to 35 are formed.

Figure 39:
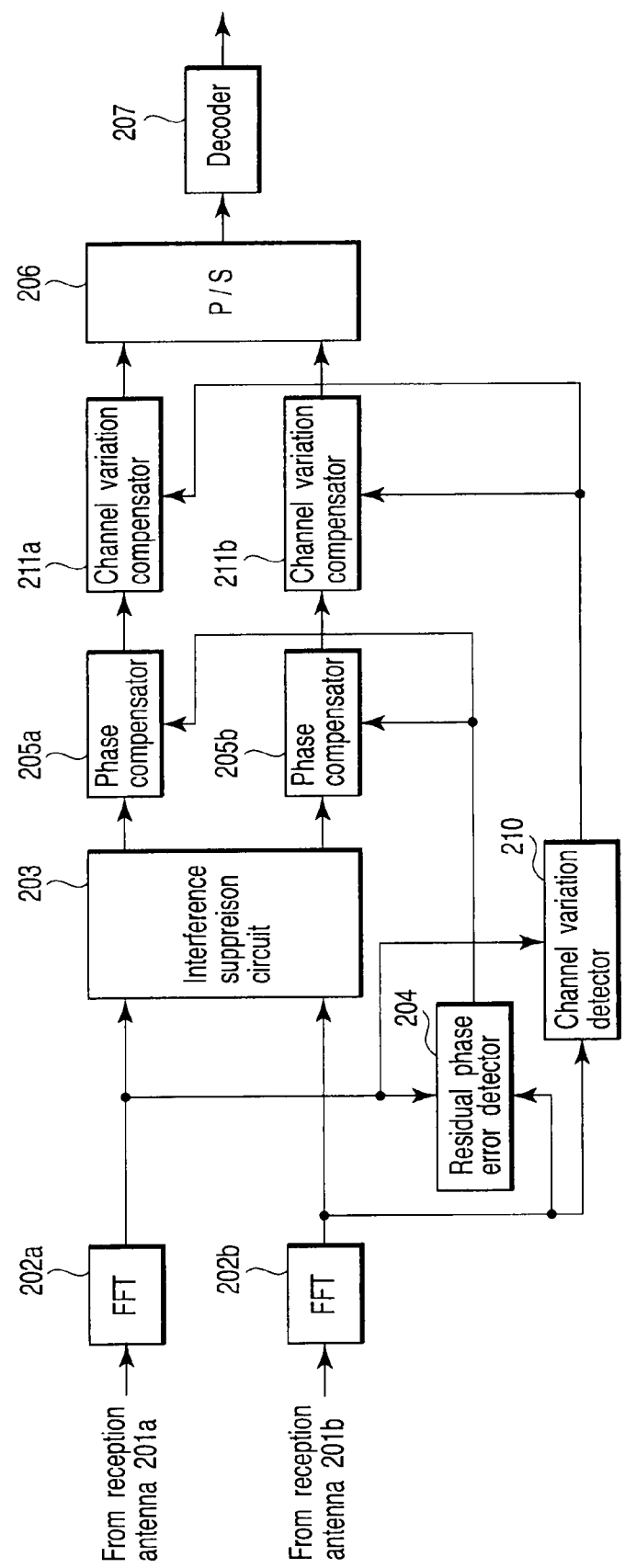
FIG. 39 is a block diagram of an OFDM signal reception apparatus according to the 10th embodiment of the present invention.

An OFDM signal reception apparatus having a function of receiving the pilot subcarriers indicated by equation (27) and detecting a residual phase error will be described next with reference to FIG. 39.

An OFDM signal received by a reception antenna 201a is input to an FFT unit 202a through a radio reception unit (not shown) and divided into subcarrier signals by Fourier transform. An OFDM signal received by a reception antenna 201b is also subjected to Fourier transform by an FFT unit 202b and divided into subcarrier signals by Fourier transform.

Of the subcarriers output from the FFT units 202a and 202b, data subcarriers are input to an interference suppression circuit 203, and pilot subcarriers are input to a residual phase error detector 204 and channel variation detector 210. The residual phase error detected by the residual phase error detector 204 is compensated by phase compensators 205a and 205b. The channel variation detected by the channel variation detector 210 is compensated by channel variation compensators 211a and 211b. Elements except the residual phase error detector 204, channel variation detector 210, and channel variation compensators 211a and 211b are the same as in the OFDM reception apparatus shown in FIG. 5, and a description thereof will be omitted.

In this embodiment, the phase compensator 204 and channel compensators 211a and 211b are independently arranged. These devices can be regarded as devices to compensate the distortion of the signals. Hence, the phase compensator 204 and channel compensators 211a and 211b can be implemented by a single compensator. In this embodiment, the phase compensator 204 and channel compensators 211a and 211b are arranged on the output side of the interference suppression circuit 203. Instead, they can also be arranged on the input side.

The residual phase error detector 204 detects the residual phase error by using pilot subcarriers. The polarity data of pilot subcarriers in each OFDM symbol and the PN sequence to be multiplied by the polarity data are known in the OFDM signal reception apparatus. Hence, the residual phase error detector 204 can detect the residual phase error by using one of the detection principle shown in FIG. 6 described in the first embodiment, the detection principle shown in FIG. 18 described in the fourth embodiment, the detection principle shown in FIGS. 23A and 23B described in the sixth embodiment, and the detection principle shown in FIG. 29 described in the eighth embodiment.

Propagation path estimation using pilot subcarriers will be described next. For example, the 20th pilot subcarrier will be described. Let Haa be the channel response value from the transmission antenna 101a to the reception antenna 201a, Hba be the channel response value from the transmission antenna 101b to the reception antenna 201a, Hca be the channel response value from a transmission antenna 101c (not shown) to the reception antenna 201a, and Hda be the channel response value from a transmission antenna 101d (not shown) to the reception antenna 201a.

In this case, when noise components are moved, signals receives in the intervals of DATA1, DATA2, DATA3, and DATA4 can be given by $$r_{DATA1} = H_{aa} + H_{ba} + H_{ca} + H_{da} \quad (30)$$

$$r_{DATA2} = (H_{aa} + jH_{ba} - H_{ca} - jH_{da})\exp(j\theta) \quad (31)$$

$$r_{DATA3} = (H_{aa} - H_{ba} + H_{ca} - H_{da})\exp(j2\theta) \quad (32)$$

$$r_{DATA4} = (H_{aa} - jH_{ba} - H_{ca} + jH_{da})\exp(j3\theta) \quad (33)$$

These are signals before the residual phase error is removed, and $\exp(jn\theta)(n=1, 2, 3)$ represents the residual phase error. The channel estimation value of Haa can be obtained by executing processing given by $$\begin{aligned}\hat{H}_{aa} &= r_{DATA1} + r_{DATA2} + r_{DATA3} + r_{DATA4} \quad (34)\\ &= H_{aa}(1 + \exp(j\theta) + \exp(j2\theta) + \exp(j3\theta)) + \\ &\quad H_{ba}(1 + j\exp(j\theta) - \exp(j2\theta) - j\exp(j3\theta)) + \\ &\quad H_{ca}(1 - \exp(j\theta) + \exp(j2\theta) + \exp(j3\theta)) + \\ &\quad H_{da}(1 - j\exp(j\theta) - \exp(j2\theta) + j\exp(j3\theta))\end{aligned}$$

Since the phase difference between several symbols represented by the residual phase error $\exp(jn\theta)(n=1, 2, 3)$ can be assumed to be sufficiently close to 1, the estimation value of Haa can be obtained by equation (34). This is because the pilot subcarriers are transmitted at a period (4-OFDM-symbol interval in this embodiment) at which the pilot subcarriers are orthogonal to each other, as shown in FIGS. 32 to 35.

The estimation value of Hba can also be obtained by $$\hat{H}_{ba} = r_{DATA1} - jr_{DATA2} - r_{DATA3} + jr_{DATA4} \quad (35)$$

Generally, when calculation using the complex conjugate of the sequences shown in FIGS. 32 to 35 as a coefficient is executed, the channel response value corresponding to each transmission antenna can be obtained. For example, as described in the eighth embodiment, when a wireless packet structure as shown in FIG. 26 is used, the channel responses of all subcarriers can be estimated by the long preamble portion at the start of the packet. However, the channel response can vary in the packet in accordance with the ambient variation. Especially, when the length of the wireless packet is more than the variation of the channel, the channel estimation value obtained by the long preamble portion may be different from that estimated by the DATA1 to DATA4 portions. Even in this case, the channel variation compensators 211a and 211b can compensate for the variation by making the pilot subcarriers be orthogonal to each other in a plurality of unit times between the plurality of transmission antennas and changing the frequencies (positions) of the pilot subcarriers at a period corresponding to an integer multiple of the unit time.

In the above description, the channel variation value is estimated by using signals before residual phase error compensation. The channel variation can also be estimated by using signals after residual phase error compensation. In this case, since the residual phase error components in equations (30) to (33) can be neglected, the channel variation value can accurately be obtained.

FIG. 40 shows the arrangement of an OFDM reception apparatus which estimates the channel variation by using signals after residual phase error compensation. Referring to FIG. 40, the outputs from the FFT units 202a and 202b are transferred to the residual phase error detector 204 and phase compensators 205a and 205b. By using the signals which have undergone phase compensation by the phase compensators 205a and 205b, the channel variation detector 210 detects the variation in channel response.

As described above, in this embodiment, the positions of pilot subcarriers are changed for each orthogonal interval of the pilot subcarriers. The orthogonal interval indicates an interval where the pilot subcarriers are orthogonal to each other between the transmission antennas and 4-OFDM-symbol interval in the example shown in FIGS. 32 to 35. When the processing expressed by equation (34) is executed by using the reception signals in this orthogonal interval the channel estimation values from the transmission antennas can be obtained. After pilot subcarriers are transmitted in one orthogonal interval, other subcarriers are used as pilot subcarriers. Accordingly, the channel estimation values corresponding to all subcarriers can be obtained.

In the above description, since the number of transmission antennas is four, sequences (e.g., FIGS. 32 to 35) in which the orthogonal period of pilot subcarriers is 4-OFDM-symbol interval are used. When the number of transmission antennas is three or two, sequences with a shorter orthogonal period can be used. In this embodiment, orthogonalization is implemented by changing the polarities of pilot subcarriers. Instead, channel estimation can also be done by implementing orthogonalization by changing the type of PN sequence for each transmission antenna. More specifically, as described in the fourth embodiment, a PN sequence is prepared for each transmission antenna to make pilot subcarriers orthogonal to each other on the time axis, thereby executing channel estimation of the 10th embodiment.

Figure 41:
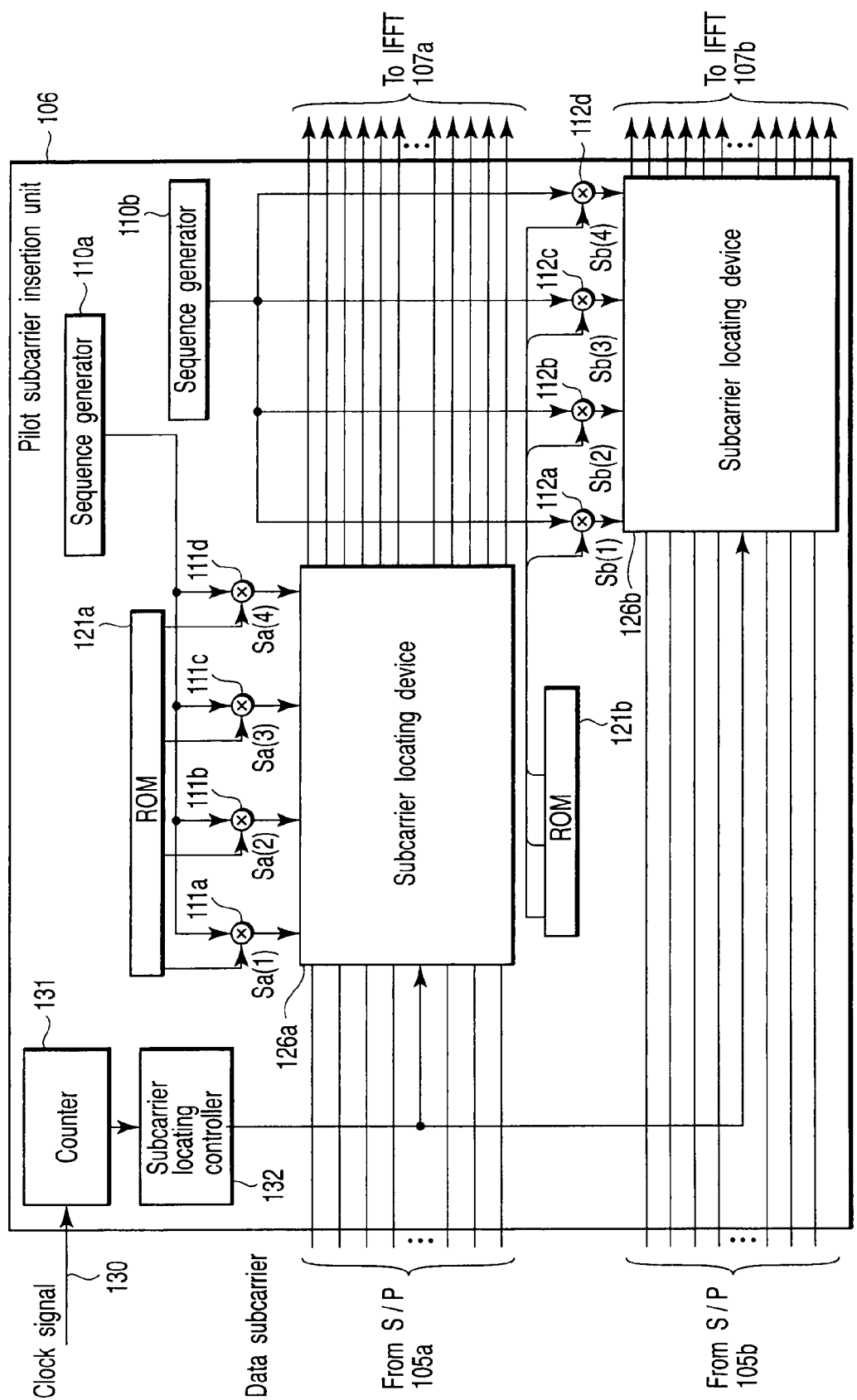
FIG. 41 is a block diagram of a modification of the pilot subcarrier insertion unit according to the 10th embodiment of the present invention.

FIG. 41 shows the arrangement of the pilot subcarrier insertion unit 106 when pilot subcarriers are made orthogonal on the time axis by changing the PN sequence. This pilot subcarrier insertion unit is different from that shown in FIG. 38 in the following point. In the pilot subcarrier insertion unit shown in FIG. 38, the polarities of pilot subcarriers are changed for each OFDM symbol, i.e., each DATA. In the pilot subcarrier insertion unit shown in FIG. 41, PN sequence generators 110a and 110b are prepared for the respective transmission antennas.

As described above, according to the 10th embodiment, pilot subcarriers are orthogonal to each other in a plurality of unit times between a plurality of transmission antennas. In addition, the frequencies (positions) of the pilot subcarriers are changed at a period corresponding to an integer multiple of the unit time. Furthermore, the pilot subcarriers are orthogonal to each other even on the frequency axis. Hence, directional patterns formed by the transmission antennas in transmitting pilot subcarriers can variously be changed.

As in the first to ninth embodiments, the dead zone where the received powers of all four pilot subcarriers decrease at the same time, can be reduced. The area where high-quality reception is possible can be widened. Simultaneously, any composite triple beat at the transmitter can be prevented. On the receiving side, the channel estimation value corresponding to each transmission antenna can easily be obtained during the data portions.

In this embodiment, subcarriers to transmit pilot signals change for each time. Even when the subcarriers to transmit pilot signals decrease due to fading to make it difficult to measure the residual phase error, pilot signals are transmitted from other subcarriers in the next OFDM symbol. Hence, the pilot signals can accurately be received at a high probability during the data portions.

According to the present invention, even when the received power of a pilot subcarrier is low, the received power of another pilot subcarrier becomes high at a high probability. Hence, the dead zone where the reception powers of all pilot subcarriers decrease simultaneously can be reduced, and the area where high-quality reception is possible widens. In addition, since the transmission powers of pilot subcarriers from the transmission antennas are the same as those of data subcarrier, any composite triple beat can be avoided. In addition, the input dynamic range of the D/A converter need not particularly be wide.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An orthogonal frequency division multiplexing (OFDM) signal transmission apparatus which transmits OFDM signals by using a plurality of transmission antennas, comprising:
a subcarrier setting device configured to set some of subcarriers of the OFDM signals to pilot subcarriers for transmitting pilot signals, and remaining subcarriers thereof to data subcarriers for transmitting a data signal, polarities of the pilot subcarriers differing among the transmission antennas,
the pilot subcarriers each having a polarity given by $$s_k(i) = \exp\left(\frac{j\pi}{2}(k-1)i\right) \tag{I}$$

where $s_k(i)$ represents the polarity of each of the pilot subcarriers, j represents an imaginary unit, i represents number of each of the pilot subcarriers, and k represents antenna number of each of the transmission antennas,
wherein each of the pilot subcarriers is expressed by a product of a sequence and data representing a corresponding one of the polarities.

2. An orthogonal frequency division multiplexing (OFDM) signal transmission method of transmitting OFDM signals having a plurality of subcarriers orthogonal to each other by using a plurality of transmission antennas, comprising:
processing for transmitting the OFDM signals by using some of the plurality of subcarriers as pilot subcarriers for transmitting pilot signals and remaining subcarriers of the plurality of subcarriers as data subcarriers for transmitting a data signal, the pilot subcarriers each having a polarity given by $$s_k(i) = \exp\left(\frac{j\pi}{2}(k-1)i\right) \tag{I}$$

where $s_k(i)$ represents the polarity of each of the pilot subcarriers, j represents an imaginary unit, i represents a number of each of the pilot subcarriers, and k represents an antenna number of each of the transmission antennas,
wherein each of the pilot subcarriers is expressed by a product of a sequence and one of the polarities of the pilot subcarriers.

3. An orthogonal frequency division multiplexing (OFDM) signal transmission method of transmitting OFDM signals having a plurality of subcarriers orthogonal to each other by using a plurality of transmission antennas, comprising:
processing for transmitting the OFDM signals by using some of the plurality of subcarriers as pilot subcarriers for transmitting pilot signals and remaining subcarriers of the plurality of subcarriers as data subcarriers for transmitting data signals, the pilot subcarrier having a polarity given by $$s_k(i) = \exp\left(\frac{j\pi}{2}(k-1)i\right) \tag{I}$$

or $$s_k(i) = -\exp\left(\frac{j\pi}{2}(k-1)i\right) \tag{II}$$

where $s_k(i)$ represents each of the pilot subcarriers, j is an imaginary unit, i represents a number of each of the pilot subcarriers, and k is an antenna number of each of the transmission antennas,
wherein each of the pilot subcarriers is expressed by a product of a sequence and one of the polarities of the equations (I) and (II).

4. A method according to claim 3 wherein, a pilot subcarrier of the pilot subcarriers that has a highest frequency has the polarity given by the equation (II), and the remaining pilot subcarriers have the polarity given by the equation (I).

5. A method according to claim 3, wherein each of the pilot subcarriers is expressed by a product of a pseudorandom noise sequence and data representing the polarity given by one of the equations (I) and (II).

6. An OFDM signal transmission method of transmitting orthogonal frequency division multiplexing (OFDM) signals having a plurality of subcarriers orthogonal to each other by using a plurality of transmission antennas, comprising:
processing for generating the OFDM signals by using some of the plurality of subcarriers as pilot subcarriers for transmitting pilot signals and remaining subcarriers of the plurality of subcarriers as data subcarriers for transmitting a data signal and by executing inverse Fourier transform for the pilot subcarriers and data subcarriers, the pilot subcarrier having a polarity given by $$s_k(i) = \exp\left(\frac{2j\pi(k-1)i}{N}\right) \tag{III}$$

where Sk(i) represents the polarity of each of the pilot subcarriers, j represents an imaginary unit, i represents a frequency of each of the pilot subcarriers, k represents an antenna number of each of the transmission antennas, and N represents an integer, wherein each of the pilot subcarriers is expressed by a product of a sequence and data representing the polarity given equation (III).

7. An orthogonal frequency division multiplexing (OFDM) signal transmission apparatus which transmits OFDM signals having a plurality of subcarriers orthogonal to each other by using a plurality of transmission antennas, comprising:

a device which executes processing for transmitting the OFDM signals by using some of the plurality of subcarriers as pilot subcarriers for transmitting pilot signals and remaining subcarriers of the plurality of subcarriers as data subcarriers for transmitting a data signal, the pilot subcarrier having a polarity given by $$s_k(i) = \exp\left(\frac{j\pi}{2}(k-1)i\right) \quad (I)$$

where $s_k(i)$ represents the polarity of each of the pilot subcarriers, j represents an imaginary unit, i represents a number of each of the pilot subcarriers, and k represents an antenna number of each of the transmission antennas, wherein each of the pilot subcarriers is expressed by a product of a sequence and one of the polarities of the pilot subcarriers.

8. An orthogonal frequency division multiplexing (OFDM) signal transmission method of transmitting OFDM signals having a plurality of subcarriers orthogonal to each other by using a plurality of transmission antennas, comprising:

generating data subcarriers for transmitting data signals;

generating pilot subcarriers for transmitting pilot signals, which are orthogonal to each other in a plurality of unit times between the plurality of transmission antennas and whose frequencies change at a period corresponding to an integer multiple of each of the unit times;

generating the OFDM signals from the data subcarriers and the pilot subcarriers; and the pilot subcarriers each having a polarity given by $$s_k(i) = \exp\left(\frac{j\pi}{2}(k-1)i\right)$$

where $s_k(i)$ represents the polarity of each of the pilot subcarriers, j represents an imaginary unit, i represents number of each of the pilot subcarriers, and k represents antenna number of each of the transmission antennas, wherein each of the pilot subcarriers is expressed by a product of a sequence and one of the polarities of the pilot subcarriers.

9. A method according to claim 8, wherein the pilot subcarriers are orthogonal to each other even on a frequency axis.

10. An orthogonal frequency division multiplexing (OFDM) signal transmission apparatus which transmits OFDM signals via a plurality of transmission antennas, comprising:

a subcarrier setting device configured to set some of subcarriers of the OFDM signals to pilot subcarriers for transmitting pilot signals, and remaining subcarriers thereof to data subcarriers for transmitting data signals, wherein the subcarrier setting device causes a first vector formed by a first pilot signal in a first frequency transmitted from a first transmission antenna and a second pilot signal in the first frequency transmitted from a second transmission antenna, to differ from a second vector formed by a third pilot signal in a second frequency transmitted from the first transmission antenna and a fourth pilot signal in the second frequency transmitted from the second transmission antenna, and wherein each of pilot signals to be transmitted is generated by using a product of a sequence and one of polarity data of the pilot signals.

11. An orthogonal frequency division multiplexing (OFDM) signal transmission apparatus which transmits OFDM signals via a plurality of transmission antennas, comprising:

a subcarrier setting device configured to set some of subcarriers of the OFDM signals to pilot subcarriers for transmitting pilot signals, and remaining subcarriers thereof to data subcarriers for transmitting data signals, wherein the subcarrier setting device causes a direction of a first directional beam formed by a first pilot signal in a first frequency transmitted from a first transmission antenna and a second pilot signal in the first frequency transmitted from a second transmission antenna, to differ from a direction of a second directional beam formed by a third pilot signal in a second frequency transmitted from the first transmission antenna and a fourth pilot signal in the second frequency transmitted from the second transmission antenna, and wherein each of pilot signals to be transmitted is generated by using a product of a sequence and one of polarity data of the pilot signals.

12. An orthogonal frequency division multiplexing (OFDM) signal transmission apparatus which transmits OFDM signals via a first transmission antenna and a second transmission antenna, comprising:

a subcarrier setting device configured to set some of subcarriers of the OFDM signals to pilot subcarriers for transmitting pilot signals, and remaining subcarriers thereof to data subcarriers for transmitting data signals, wherein the subcarrier setting device causes a first vector formed by a first pilot signal in a first frequency transmitted from a first transmission antenna and a second pilot signal in the first frequency transmitted from a second transmission antenna, to be orthogonal with respect to a second vector formed by a third pilot signal in a second frequency transmitted from the first transmission antenna and a fourth pilot signal in the second frequency transmitted from the second transmission antenna, and wherein each of pilot signals to be transmitted is generated by using a product of a sequence and one of polarity data of the pilot signals.

13. An orthogonal frequency division multiplexing (OFDM) signal transmission method of transmitting OFDM signals having a plurality of subcarriers orthogonal to each other by using a plurality of transmission antennas, comprising:

processing for transmitting the OFDM signals by using some of the plurality of subcarriers as pilot subcarriers for transmitting pilot signals and remaining subcarriers of the plurality of subcarriers as data subcarriers for transmitting a data signal, the pilot subcarriers each having a polarity given by $$s_k(i) = \exp\left(\frac{j\pi}{2}(k-1)i\right) \quad (I)$$

where $s_k(i)$ represents the polarity of each of the pilot subcarriers, j represents an imaginary unit, i represents a number of each of the pilot subcarriers, and k represents an antenna number of each of the transmission antennas, wherein each of the pilot subcarriers is expressed by a product of a sequence and data representing the polarity given by the equation (I).

14. An orthogonal frequency division multiplexing (OFDM) signal transmission apparatus comprising:
a generator which generates data signals and pilot signals to be transmitted using at least one of a plurality of subcarriers,
the plurality of subcarriers including data subcarriers and pilot subcarriers,
the generator generating first to fourth pilot signals, using a result of multiplication of first to fourth data by a sequence,
a combination of the first and second data being made different from a combination of the third and fourth data,
the first data indicating a polarity of a first pilot signal transmitted from a first antenna using a first pilot subcarrier, the second data indicating a polarity of a second pilot signal transmitted from a second antenna using the first pilot subcarrier, the third data indicating a polarity of a third pilot signal transmitted from the first antenna using a second pilot subcarrier, the fourth data indicating a polarity of a fourth pilot signal transmitted from the second antenna using the second pilot subcarrier.

15. An apparatus according to claim 14, wherein:
the first data indicating the polarity of the first pilot signal and the second data indicating the polarity of the second pilot signal provide a first vector;
the third data indicating the polarity of the third pilot signal and the fourth data indicating the polarity of the fourth pilot signal provide a second vector; and
the first vector and the second vector are orthogonal.

16. An apparatus according to claim 14, wherein:
the first data indicating the polarity of the first pilot signal and the third data indicating the polarity of the third pilot signal provide a first vector;
the second data indicating the polarity of the second pilot signal and the fourth data indicating the polarity of the fourth pilot signal provide a second vector; and
the first vector and the second vector are orthogonal to each other.

17. An apparatus according to claim 14, wherein:
the first data indicating the polarity of the first pilot signal is made equal to the second data indicating the polarity of the second pilot signal;
the third data indicating the polarity of the third pilot signal is made different from the fourth data indicating the polarity of the fourth pilot signal;
a fifth data indicating a polarity of a fifth pilot signal transmitted from the first antenna using a third pilot subcarrier is made equal to a sixth data indicating a polarity of a sixth pilot signal transmitted from the second antenna using the third pilot subcarrier; and
a seventh data indicating a polarity of a seventh pilot signal transmitted from the first antenna using a fourth pilot subcarrier is made different from an eighth data indicating a polarity of an eighth pilot signal transmitted from the second antenna using the fourth pilot subcarrier.

18. An apparatus according to claim 14, wherein:
the first data indicating the polarity of the first pilot signal is made equal to the second data indicating the polarity of the second pilot signal;
the second data indicating the polarity of the second pilot signal is made different from a fifth data indicating a polarity of a fifth pilot signal transmitted from a third antenna using the first pilot subcarrier;
the third data indicating the polarity of the third pilot signal is made different from the fourth data indicating the polarity of the fourth pilot signal;
the fourth data indicating the polarity of the fourth pilot signal is made different from a sixth data indicating a polarity of a sixth pilot signal transmitted from the third antenna using the second pilot subcarrier;
a seventh data indicating a polarity of a seventh pilot signal transmitted from the first antenna using the third pilot subcarrier is made different from an eighth data indicating a polarity of an eighth pilot signal transmitted from the second antenna using the third pilot subcarrier;
the eighth data indicating the polarity of the eighth pilot signal is made equal to a ninth data indicating a polarity of a ninth pilot signal transmitted from the third antenna using the third pilot subcarrier;
a tenth data indicating a polarity of a tenth pilot signal transmitted from the first antenna using a fourth pilot subcarrier is made equal to an eleventh data indicating a polarity of an eleventh pilot signal transmitted from the second antenna using the fourth pilot subcarrier; and
the eleventh data indicating the polarity of the eleventh pilot signal is made equal to a twelfth data indicating a polarity of a twelfth pilot signal transmitted from the third antenna using the third pilot subcarrier.

19. An orthogonal frequency division multiplexing (OFDM) signal transmission apparatus comprising:
a generator which generates data signals and pilot signals to be transmitted using at least one of a plurality of subcarriers,
the plurality of subcarriers including data subcarriers and pilot subcarriers,
the generator generating first to fourth pilot signals, using a result of multiplication of first to fourth data by a sequence,
a combination of the first and second data being made different from a combination of the third and fourth data,
the first data indicating a polarity of a first pilot signal transmitted using a first pilot subcarrier, the second data indicating a polarity of a second pilot signal transmitted using the first pilot subcarrier, the third data indicating a polarity of a third pilot signal transmitted using a second pilot subcarrier, the fourth data indicating a polarity of a fourth pilot signal transmitted using the second pilot subcarrier.

20. An apparatus according to claim 19, wherein:
the first data indicating the polarity of the first pilot signal and the second data indicating the polarity of the second pilot signal provide a first vector;
the third data indicating the polarity of the third pilot signal and the fourth data indicating the polarity of the fourth pilot signal provide a second vector; and
the first vector and the second vector are orthogonal.

21. An apparatus according to claim 19, wherein:
the first data indicating the polarity of the first pilot signal and the third data indicating the polarity of the third pilot signal provide a first vector;
the second data indicating the polarity of the second pilot signal and the fourth data indicating the polarity of the fourth pilot signal provide a second vector; and
the first vector and the second vector are orthogonal.

22. An apparatus according to claim 19, wherein:
the first data indicating the polarity of the first pilot signal is made equal to the second data indicating the polarity of the second pilot signal;
the third data indicating the polarity of the third pilot signal is made different from the fourth data indicating the polarity of the fourth pilot signal;
a fifth data indicating a polarity of a fifth pilot signal transmitted using a third pilot subcarrier is made equal to a sixth data indicating a polarity of a sixth pilot signal transmitted using the third pilot subcarrier; and
a seventh data indicating a polarity of a seventh pilot signal transmitted using a fourth pilot subcarrier is made different from an eighth data indicating a polarity of an eighth pilot signal transmitted using the fourth pilot subcarrier.

23. An apparatus according to claim 19, wherein:
the first data indicating the polarity of the first pilot signal is made equal to the second data indicating the polarity of the second pilot signal;
the second data indicating the polarity of the second pilot signal is made different from a fifth data indicating a polarity of a fifth pilot signal transmitted using the first pilot subcarrier;
the third data indicating the polarity of the third pilot signal is made different from the fourth data indicating the polarity of the fourth pilot signal;
the fourth data indicating the polarity of the fourth pilot signal is made different from a sixth data indicating a polarity of a sixth pilot signal transmitted using the second pilot subcarrier;
a seventh data indicating a polarity of a seventh pilot signal transmitted using the third pilot subcarrier is made different from an eighth data indicating a polarity of an eighth pilot signal transmitted using the third pilot subcarrier;
the eighth data indicating the polarity of the eighth pilot signal is made equal to a ninth data indicating a polarity of a ninth pilot signal transmitted using the third pilot subcarrier;
a tenth data indicating a polarity of a tenth pilot signal transmitted using a fourth pilot subcarrier is made equal to an eleventh data indicating a polarity of an eleventh pilot signal transmitted using the fourth pilot subcarrier; and
the eleventh data indicating the polarity of the eleventh pilot signal is made equal to a twelfth data indicating a polarity of a twelfth pilot signal transmitted using the third pilot subcarrier.

24. An orthogonal frequency division multiplexing (OFDM) signal transmission method comprising:
generating data signals and pilot signals to be transmitted using at least one of a plurality of subcarriers,
the plurality of subcarriers including data subcarriers and pilot subcarriers,
generating the data signals and pilot signals including generating first to fourth pilot signals, using a result of multiplication of first to fourth data by a sequence,
a combination of the first and second data being made different from a combination of the third and fourth data,
the first data indicating a polarity of a first pilot signal transmitted from a first antenna using a first pilot subcarrier, the second data indicating a polarity of a second pilot signal transmitted from a second antenna using the first pilot subcarrier, the third data indicating a polarity of a third pilot signal transmitted from the first antenna using a second pilot subcarrier, the fourth data indicating a polarity of a fourth pilot signal transmitted from the second antenna using the second pilot subcarrier.

25. An orthogonal frequency division multiplexing (OFDM) signal transmission method comprising:
generating data signals and pilot signals to be transmitted using at least one of a plurality of subcarriers,
the plurality of subcarriers including data subcarriers and pilot subcarriers,
generating the data signals and pilot signals including generating first to fourth pilot signals, using a result of multiplication of first to fourth data by a sequence,
a combination of the first and second data being made different from a combination of the third and fourth data,
the first data indicating a polarity of a first pilot signal transmitted using a first pilot subcarrier, the second data indicating a polarity of a second pilot signal transmitted using the first pilot subcarrier, the third data indicating a polarity of a third pilot signal transmitted using a second pilot subcarrier, the fourth data indicating a polarity of a fourth pilot signal transmitted using the second pilot subcarrier.

* * * * *